(12) United States Patent
Fujii et al.

(10) Patent No.: US 8,400,698 B2
(45) Date of Patent: Mar. 19, 2013

(54) OSCILLATOR DEVICE, OPTICAL DEFLECTING DEVICE AND METHOD OF CONTROLLING THE SAME

(75) Inventors: Kazunari Fujii, Kawasaki (JP); Yukio Furukawa, Palo Alto, CA (US); Takahiro Akiyama, Kawasaki (JP); Ryuhei Shoji, Suntou-gun (JP); Soichiro Suzuki, Suntou-gun (JP); Shimpei Matsuo, Tokyo (JP); Tatsuya Hotogi, Suntou-gun (JP); Shinichiro Iimura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 12/160,209

(22) PCT Filed: Feb. 13, 2007

(86) PCT No.: PCT/JP2007/052909
§ 371 (c)(1),
(2), (4) Date: Jul. 7, 2008

(87) PCT Pub. No.: WO2007/094489
PCT Pub. Date: Aug. 23, 2007

(65) Prior Publication Data
US 2009/0051992 A1    Feb. 26, 2009

(30) Foreign Application Priority Data

Feb. 13, 2006  (JP) .................. 2006-035491
Jul. 11, 2006  (JP) .................. 2006-189947
Feb. 2, 2007  (JP) .................. 2007-023881

(51) Int. Cl.
*G02B 26/08* (2006.01)

(52) U.S. Cl. ............... 359/199.1; 359/199.4; 359/214.1; 359/221.1; 347/247; 347/260

(58) Field of Classification Search ............... 359/199.1, 359/199.4, 213.1, 214.1, 221.1; 250/234, 250/235; 347/247, 248, 250, 256, 260
See application file for complete search history.

(56) References Cited

U.S. PATENT DOCUMENTS

| 4,859,846 A | 8/1989 | Burrer ........................ 250/234 |
| 5,373,518 A | 12/1994 | Uchiyama et al. ............ 372/38 |

(Continued)

FOREIGN PATENT DOCUMENTS

WO    2005/063613    7/2005

OTHER PUBLICATIONS

Korean Office Action dated Dec. 22, 2010 from corresponding Korean Application No. 10-2008-7019740, and English language translation thereof.

(Continued)

*Primary Examiner* — Frank Font
(74) *Attorney, Agent, or Firm* — Fitzpatrick, Cella, Harper & Scinto

(57) ABSTRACT

Disclosed is an oscillator device that includes an oscillating system having a first oscillator, a second oscillator, a first torsion spring for connecting the first and second oscillators each other, and a second torsion spring being connected to the second oscillator and having a common torsional axis with the first torsion spring; a supporting system for supporting the oscillating system; a driving system for driving the oscillating system so that at least one of the first and second oscillators produces oscillation as can be expressed by an equation that contains a sum of a plurality of time functions; a signal producing system for producing an output signal corresponding to displacement of at least one of the first and second oscillators; and a drive control system for controlling the driving system on the basis of the output signal of the signal producing system so that at least one of amplitude and phase of the time function takes a predetermined value.

18 Claims, 27 Drawing Sheets

U.S. PATENT DOCUMENTS

| | | | | |
|---|---|---|---|---|
| 5,463,410 | A | 10/1995 | Uchiyama et al. | 347/133 |
| 5,943,082 | A | 8/1999 | Uchiyama et al. | 347/156 |
| 7,009,748 | B2* | 3/2006 | Turner et al. | 359/224.1 |
| 7,129,964 | B2 | 10/2006 | Akiyama et al. | 347/235 |
| 7,376,161 | B2 | 5/2008 | Fujii et al. | 372/21 |
| 7,436,566 | B2 | 10/2008 | Kato et al. | 359/224 |
| 8,270,057 | B2* | 9/2012 | Fujii et al. | 359/224.1 |
| 2005/0078169 | A1* | 4/2005 | Turner | 347/260 |
| 2005/0088715 | A1 | 4/2005 | Yoda | 359/196 |
| 2006/0152785 | A1 | 7/2006 | Yasuda et al. | 359/199 |
| 2007/0052797 | A1 | 3/2007 | Fujii et al. | 348/102 |
| 2007/0115072 | A1 | 5/2007 | Kato et al. | 331/176 |
| 2007/0139750 | A1* | 6/2007 | Velger et al. | 359/223 |
| 2010/0085618 | A1* | 4/2010 | Fujii et al. | 359/199.1 |

OTHER PUBLICATIONS

U.S. Appl. No. 12/198,848, filed Aug. 26, 2008 by Takahisa Kato, Takahiro Akiyama, Kazutoshi Torashima, Suguru Miyagawa, Kazunari Fuji and Shinichiro Watanabe.

Chinese Office Action dated Mar. 15, 2010 from corresponding Chinese Application No. 200780005355.8, and English language translation thereof.

* cited by examiner

OSCILLATOR DEVICE, OPTICAL DEFLECTING DEVICE AND METHOD OF CONTROLLING THE SAME

TECHNICAL FIELD

This invention relates to an oscillator device having a plurality of oscillators and, more particularly, to an oscillator device suitably usable in an optical deflecting device. In another aspects the present invention concerns a scan type display or an image forming apparatus such as a laser beam printer or a digital copying machine, having such optical deflecting device.

BACKGROUND ART

As compared with traditional scanning optical systems having a rotary polygonal mirror (polygon mirror), recently proposed resonance type optical deflecting devices have advantageous features that the optical deflecting device can be made quite small in size; slow power consumption; and theoretically no surface tilt of the mirror surface.

On the other hand, in the resonance type optical deflecting devices since, in principle, the deflecting angle (displacement angle) of the mirror changes sinusoidally, the angular speed is not constant. U.S. Pat. No. 4,859,846 and U.S. Patent Application, Publication No. 2006/152785 have proposed a method for correcting this.

In U.S. Pat. No. 4,859,846, a resonance type deflector having oscillation modes of a fundamental frequency and a frequency threefold the fundamental frequency is used to accomplish triangular-wave drive. FIG. 35 shows a micromirror that accomplishes approximately triangular-wave drive. Here, the optical deflecting device 12 comprises oscillators 14 and 16, torsion springs 18 and 20, driving systems 23 and 50, detecting systems 15 and 32, and a control circuit 30. This micromirror has a fundamental resonance frequency and a resonance frequency approximately threefold the fundamental resonance frequency, and it is driven at a combined frequency of the fundamental frequency and the threefold frequency. As a result of this, the oscillator 14 having a mirror surface is driven in accordance with triangular-wave drive, whereby optical deflection having an angular speed of deflection angle less changing as compared with sinusoidal drive is accomplished. Here, the detecting systems 15 and 32 detect oscillation of the oscillator 14, and the control circuit 30 produces a driving signal necessary for accomplishing the triangular-wave drive. The micromirror is then driven through the driving systems 23 and 50.

DISCLOSURE OF THE INVENTION

Although triangular-wave drive of an oscillator of the deflector may be provided by the structures disclosed in the aforementioned patent documents, further improvements are still necessary with regard to the deflection angle controllability of the oscillator. The present invention enables high precision control of the deflection angle (displacement angle) of an oscillator of an oscillator device.

In accordance with an aspect of the present invention, there is provided an oscillator device, comprising: an oscillating system having a first oscillator, a second oscillator, a first torsion spring for connecting said first and second oscillators each other, and a second torsion spring being connected to said second oscillator and having a common torsional axis with said first torsion spring; a supporting system for supporting said oscillating system; a driving system for driving said oscillating system so that at least one of said first and second oscillators produces oscillation as can be expressed by an equation that contains a sum of a plurality of time functions; a signal producing system for producing an output signal corresponding to displacement of at least one of said first and second oscillators; and a drive control system for controlling said driving system on the basis of the output signal of said signal producing system so that at least one of amplitude and phase of the time function takes a predetermined value.

In accordance with another aspect of the present invention, there is provided an oscillator device, comprising: an oscillating system having a first oscillator, a second oscillator, a first torsion spring for connecting said first and second oscillators each other, and a second torsion spring being connected to said second oscillator and having a common torsional axis with said first torsion spring; a supporting system for supporting said oscillating system; a driving system for driving said oscillating system so that at least one of said first and second oscillators produces oscillation as can be expressed by an equation that contains at least a term $$A_1 \sin \omega t + A_2 \sin(n\omega t + \varphi)$$

where n is an integer not less than 2; a signal producing system for producing an output signal corresponding to displacement of at least one of said first and second oscillators; and a drive control system for controlling said driving system on the basis of the output signal of said signal producing system so that at least one of $A_1$, $A_2$ and $\varphi$ in the aforementioned equation takes a predetermined value.

In accordance with a further aspect of the present invention, there is provided an oscillator device, comprising: an oscillating system having a first oscillator, a second oscillator, a first torsion spring for connecting said first and second oscillators each other, and a second torsion spring being connected to said second oscillator and having a common torsional axis with said first torsion spring; a supporting system for supporting said oscillating system; a driving system for driving said oscillating system so that at least one of said first and second oscillators produces oscillation as can be expressed, in regard to displacement $\theta(t)$ thereof, by an equation $$\theta(t) = A_1 \sin \omega t + \Sigma A_n \sin(n\omega t + \varphi_{n-1})$$

where n is an integer not less than 2; a signal producing system for producing an output signal corresponding to displacement of at least one of said first and second oscillators; and a drive control system for controlling said driving system on the basis of the output signal of said signal producing system so that at least one of $A_1$, $A_2$, ... and $A_n$ and $\varphi_1$, $\varphi_2$, ... and $\varphi_{n-1}$ in the aforementioned equation takes a predetermined value.

In accordance with a yet further aspect of the present invention, there is provided an oscillator device, comprising: a supporting system; an oscillating system having a first oscillator, a second oscillator, a first torsion spring for connecting said first and second oscillators each other, and a second torsion spring for connecting said supporting system and said second oscillator each other and having a common torsional axis with said first torsion spring; a driving system for driving said oscillating system so that one of said first and second oscillators produces oscillation as can be expressed, in regard to displacement $\theta(t)$ thereof, by an equation $$\theta(t) = A_1 \sin \omega t + A_2 \sin(2\omega t + \varphi);$$

a signal producing system for producing first and second time moment information as one of said first and second oscillators provides a first displacement angle, and for producing third and fourth time moment information as the one oscillator provides a second displacement angle different from the first displacement angle; and a drive control system for controlling said driving system on the basis of the first to fourth time moment information so that at least one of $A_1$, $A_2$ and ø in the aforementioned equation takes a predetermined value.

Briefly, in accordance with an oscillator device of the present invention, the deflection angle of an oscillator can be controlled very precisely.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are block diagrams of an optical deflecting device having an oscillator device according to a first embodiment of the of the present invention and examples based on it, wherein FIG. 1A shows a case wherein a light receiving element is used in a displacement angle gauge, and FIG. 1B shows a case wherein a piezoelectric device is used in the displacement angle gauge.

FIGS. 2A and 2B are block diagrams of an optical deflecting device having an oscillator device according to a second embodiment of the of the present invention and examples based on it, wherein FIG. 2A shows a case wherein a light receiving element is used in a displacement angle gauge, and FIG. 2B shows a case wherein a piezoelectric device is used in the displacement angle gauge.

FIGS. 4A through 4C show an optical deflecting device to which an oscillator device according to an embodiment of the of the present invention is applied, wherein FIG. 4A is a plan view of an oscillating system, FIG. 4B is a sectional view of a driving system, and FIG. 4C is a block diagram of a drive control system.

FIGS. 5A and 5B illustrate deflection angle transmission characteristics of the optical deflecting device of FIG. 1, wherein FIG. 5A is a graph showing the relationship between the gain and the driving frequency, and FIG. 5B is a graph showing the relationship between the phase difference and the driving frequency.

FIGS. 22A through 22C illustrate an optical deflecting device having an oscillating device according to a fifth embodiment of the present invention and examples based on it, wherein FIG. 22A is a block diagram of the optical deflecting device, FIG. 22B is a-graph for explaining an example of a change in deflection angle of the optical deflecting device driven in a first oscillation mode with respect to time, and FIG. 22C is a graph for explaining an example of a change in deflection angle of the optical deflecting device driven in a second oscillation mode with respect to time.

BEST MODE FOR PRACTICING THE INVENTION

First Embodiment

An oscillator device according to a first embodiment of the present invention will now be described.

Figure 1A:
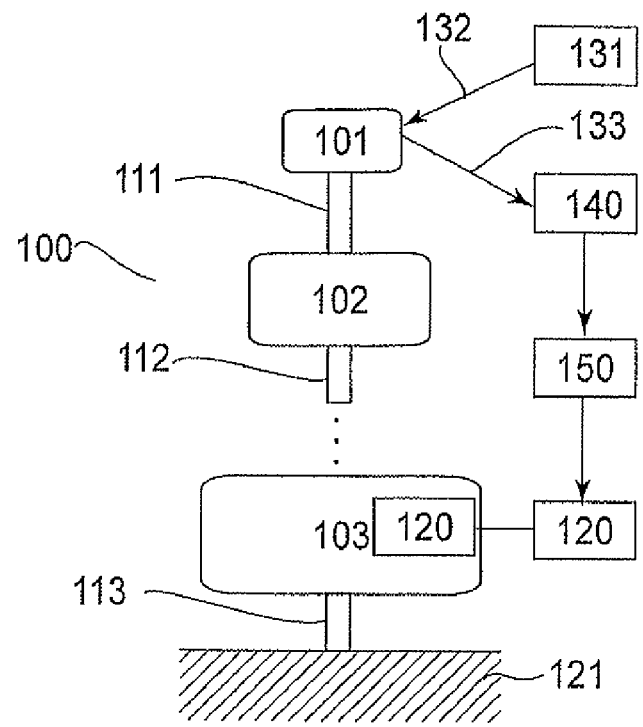
Figure 1B:
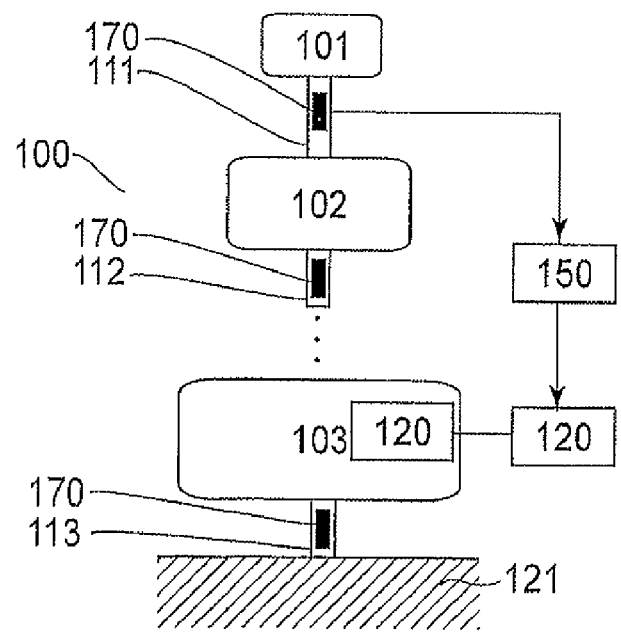

The oscillator device of this embodiment may comprise, as shown in FIGS. 1A and 1B, an oscillating system that includes, at least, a first oscillator 101, a second oscillator 102, a first torsion spring 111 and a second torsion spring 112, as well as a supporting system 121 for supporting the oscillating system. The first torsion spring may connect the first and second oscillators each other. The second torsion spring may be connected to the second oscillator so that it has a common torsional axis with respect to the first torsion spring. The oscillating system of this embodiment may have at least two oscillators and at least two torsion springs. Hence, it may include three or more oscillators and three or more torsion springs as shown in FIGS. 1A and 1B.

The oscillator device may further comprise a driving system 120 for applying a driving force to the oscillating system, and a drive control system 150 for adjusting the driving system 120. The driving system 120 may drive the oscillating system so that at least one of the oscillators produces oscillation as can be expressed by an equation that contains the sum of a plurality of time functions. The drive control system 150 may supply, to the driving system 120, a driving signal effective to cause such oscillation.

Where an oscillator device according to this embodiment is used in an optical deflecting device, at least one oscillator may be provided with a reflection mirror. The reflection mirror may be a light reflection film formed on the surface of the oscillator. If the oscillator surface is sufficiently smooth, it may be used as a reflection mirror without a light reflection film. The optical deflecting device may further include a light source 131 for emitting a light beam. The light beam 132 may be projected on the reflection mirror of the oscillator, whereby the light beam is scanned.

The operational principle of the oscillator device according to this embodiment will be explained. Generally, the free oscillation of an oscillating system that includes oscillators of a number n and torsion springs of a number n is expressed by the following equation.

$$M\ddot{\theta} + K\theta = 0 \quad (1)$$

$$\theta = \begin{pmatrix} \theta_1 \\ \theta_2 \\ \vdots \\ \theta_n \end{pmatrix}, M = \begin{pmatrix} I_1 & & & \\ & I_2 & & \\ & & \ddots & \\ & & & I_n \end{pmatrix},$$

-continued $$K = \begin{pmatrix} k_1 & -k_1 & & \\ -k_1 & k_1+k_2 & -k_2 & \\ & & \ddots & \\ & & -k_{n-1} & k_{n-1}+k_n \end{pmatrix}$$

where $I_k$ is the moment of inertia of the oscillator, $k_k$ is the spring constant of the torsion spring, and $\theta_k$ is the angle of torsion of the oscillator (k=1, ..., n).

If the eigen value of $M^{-1}K$ of this system is denoted by $\lambda_k$ (k=1 to n), the angular oscillation frequency (angular frequency) $\omega_k$ in the natural oscillation mode is given by $\phi_k=\sqrt{(\lambda_k)}$ (square root of $\lambda_k$). In the oscillator device according to this embodiment, the oscillating system may have oscillators of a number n and torsion springs of a number n, and it may be arranged so that $\omega_k$ includes a fundamental frequency as well as frequencies of a number n−1, which frequencies are integer-fold the fundamental frequency. This enables various motions of the oscillator. Here, the term "integer-fold" means "N-fold" where N is an integral number. However, the "integral number" here may include a case of an approximately integral number. Such "approximately-integral-number-fold" may be chosen from the numerical range of about 0.98n to 1.02n times the fundamental frequency (n is an arbitrary integer).

Specifically, the oscillator device of this embodiment may have two oscillators and two torsion springs and it may be arranged so that $\omega_k$ includes a fundamental frequency and frequencies approximately-even-number-fold the fundamental frequency. With this arrangement, approximately constant angular speed drive is accomplished while, in a predetermined range, variation in angular speed of the oscillator is well suppressed.

Figure 33:
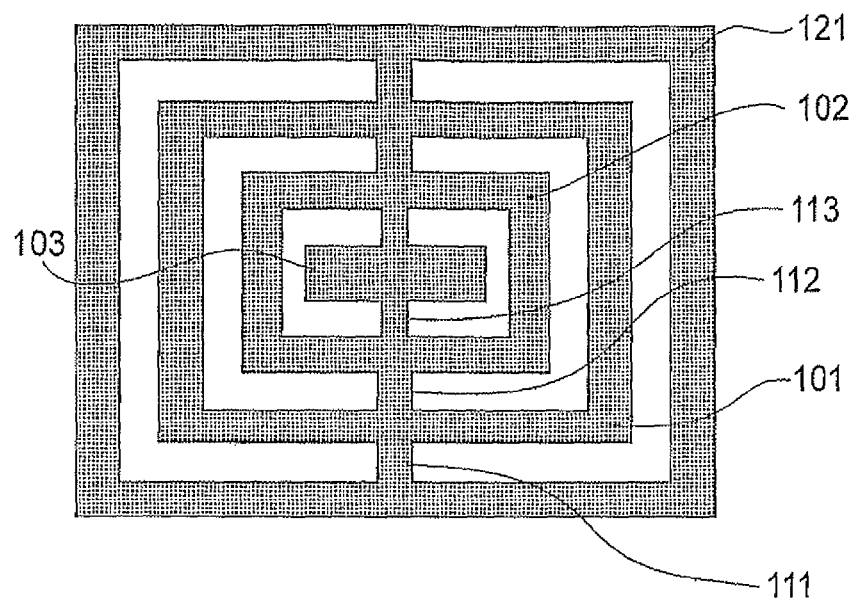
FIG. 33 is a schematic view for explaining an oscillation system having three oscillation modes.
Figure 34:
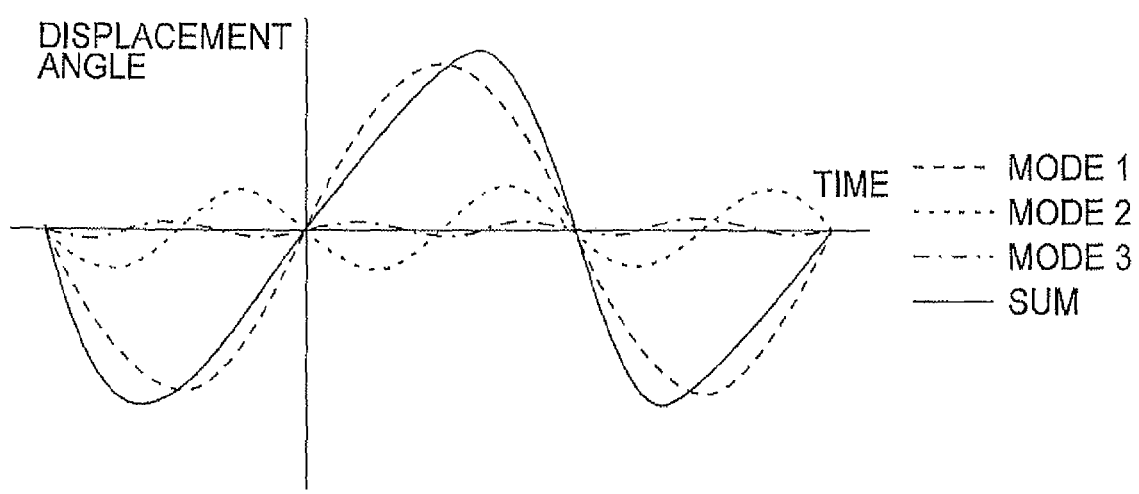
FIG. 34 is a graph for explaining the relationship between the displacement angle and the time when an oscillating system having three oscillation modes oscillates.
Figure 35:
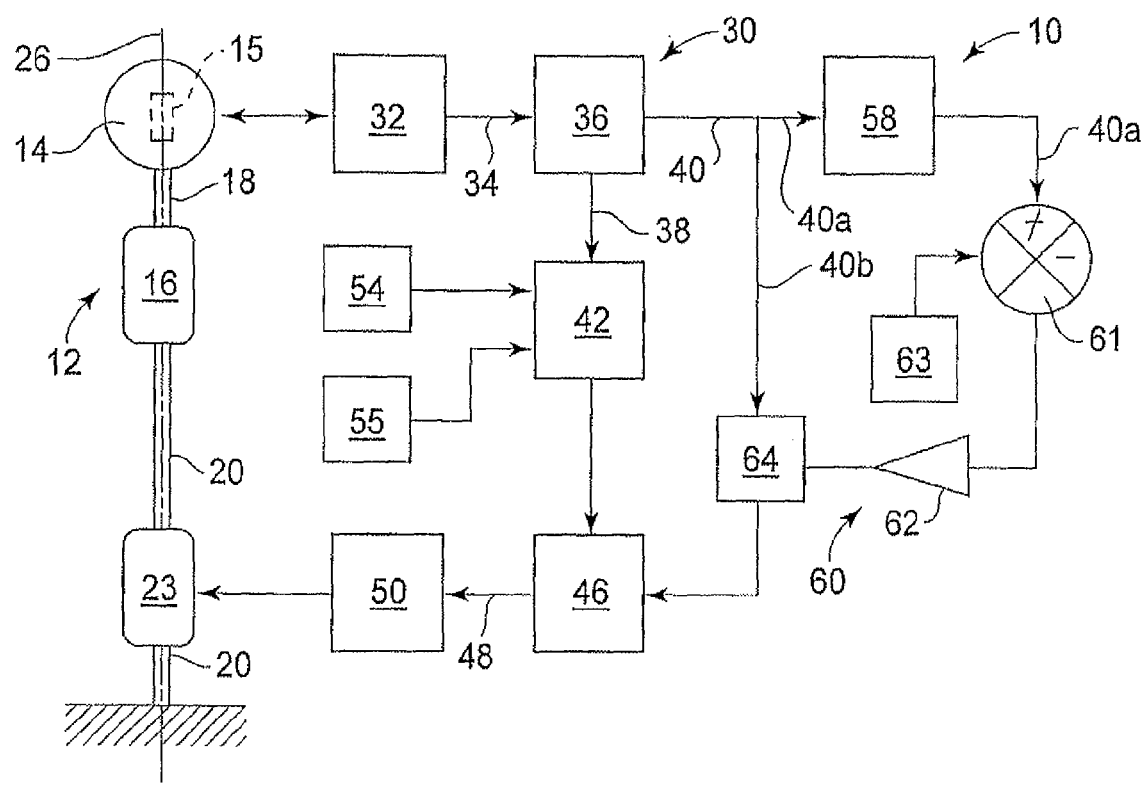
FIG. 35 is a block diagram for explaining the structure of a conventional optical deflecting device.

If n=3, an oscillating system having three oscillators 101, 102 and 103 and three torsion springs 111, 112 and 113 such as shown in FIG. 33, for example, may be arranged so that the frequencies of three oscillation modes have a ratio of 1:2:3. By energizing this oscillation system in accordance with these oscillation modes 1, 2 and 3 simultaneously, driving with smaller angular speed variation, than in the case where n=2, is accomplished. FIG. 34 shows the relationship between the displacement angle of the oscillator and the time in a case where the oscillating system is driven in accordance with oscillation modes having a frequency ratio of 1:2:3 and an amplitude ratio of 24:−6:1. Here, the negative value in the amplitude ratio means that, as shown at mode 2 in FIG. 34, the displacement from the origin to a half period is negative.

As described above, by increasing the number of oscillation mode, fluctuation of angular speed of the oscillator in a predetermined range can be reduced.

The oscillator device of this embodiment may have two oscillators and two torsion springs, and it may be arranged so that a fundamental frequency and a frequency or frequencies approximately three-fold the fundamental frequency may be included in $\omega_k$. This enables approximately triangular-wave drive of the oscillators.

Next, oscillation of an oscillating system having oscillators of a number n and torsion springs of a number n, such as shown in FIGS. 1A and 1B, will be explained.

This oscillating system simultaneously produces oscillation motion moving in accordance with a fundamental frequency and oscillation motion moving with frequencies approximately-integral-number-fold the fundamental frequency and having a number n−1.

Hence, in a first example according to this embodiment, at least one of plural oscillators may be arranged to provide oscillation as can be expressed by an equation that contains the sum of plural time functions. The equation containing the sum of plural time functions may include an equation having a constant term. An example of such equation with a constant term may be a case wherein a constant DC bias is applied to the driving system to shift the displacement angle origin (the position where displacement angle is zero) of the oscillator.

In a second example according to this embodiment, the deflection angle θ of the optical deflecting device (here, it is measured with reference to the position of the scan center as shown in FIG. 3) may be as follows. Now, the amplitude and angular frequency of the first oscillation motion are denoted by $A_1$ and ω, respectively, and the amplitude and angular frequency of the second oscillation motion are denoted by $A_2$ and nω (n is an integer not less than 2). Also, the relative phase difference between the first and second oscillation motions is denoted by ø. The motion of the oscillator is therefore the oscillation that can be expressed by an equation containing at least a term $A_1 \sin \omega t + A_2 \sin(n\omega t + ø)$. Particularly, in the case of n=2, the equation contains at least a term $A_1 \sin \omega t + A_2 \sin(2\omega t + ø)$. Hence, within a predetermined range, approximately constant angular speed drive is accomplished, while fluctuation in angular speed of the oscillator is well suppressed. If n=3, the equation contains at least a term $A_1 \sin \omega t + A_2 \sin(3\omega t + ø)$, and the oscillator can be driven in accordance with approximately triangular-wave drive. In this case as well, the equation that contains at least a term $A_1 \sin \omega t + A_2 \sin(n\omega t + ø)$ may include an equation having a constant term.

In a third example according to this embodiment, if the amplitude and angular frequency of the first oscillation motion are denoted by $A_1$ and ω, respectively, the amplitude and angular frequency of the n-th oscillation motion are denoted by $A_n$ and nω, and the relative phase difference between the first and n-th oscillation motions is denoted by $ø_{n-1}$, then the motion of the oscillator can be expressed by the following equation.

$$\theta(t) = A_1 \sin \omega t + \Sigma A_n \sin(n\omega t + ø_{n-1}) \quad (2)$$

wherein n is an integer not less than 2. The value of n can be enlarged as desired as long as the number of the oscillators that constitute the oscillator device can be increased. In practical production of oscillator devices, however, the largest number of n may preferably be 3 to 5. The driving system 120 may have a structure for applying a driving force to the driving system in accordance with any of electromagnetic process, electrostatic process, piezoelectric process, and so on. If the electromagnetic drive is used, at least one oscillator may be provided with a permanent magnet, and a coil for applying a magnetic field to this permanent magnet may be disposed near the oscillator. Disposition of the permanent magnet and the coil may be reversed. If the electrostatic drive is used, at least one oscillator may be provided with an electrode, and another electrode for applying an electrostatic force to between these electrodes may be disposed close to the oscillator. If the piezoelectric drive is used, the oscillating system or the supporting system may be provided with a piezoelectric device to apply a driving force.

The drive control system 150 may be arranged to produce a driving signal with which the oscillating system can produce oscillation motion in accordance with any one of the first to third examples, described above. The driving signal may be applied to the driving system.

Figure 6A:
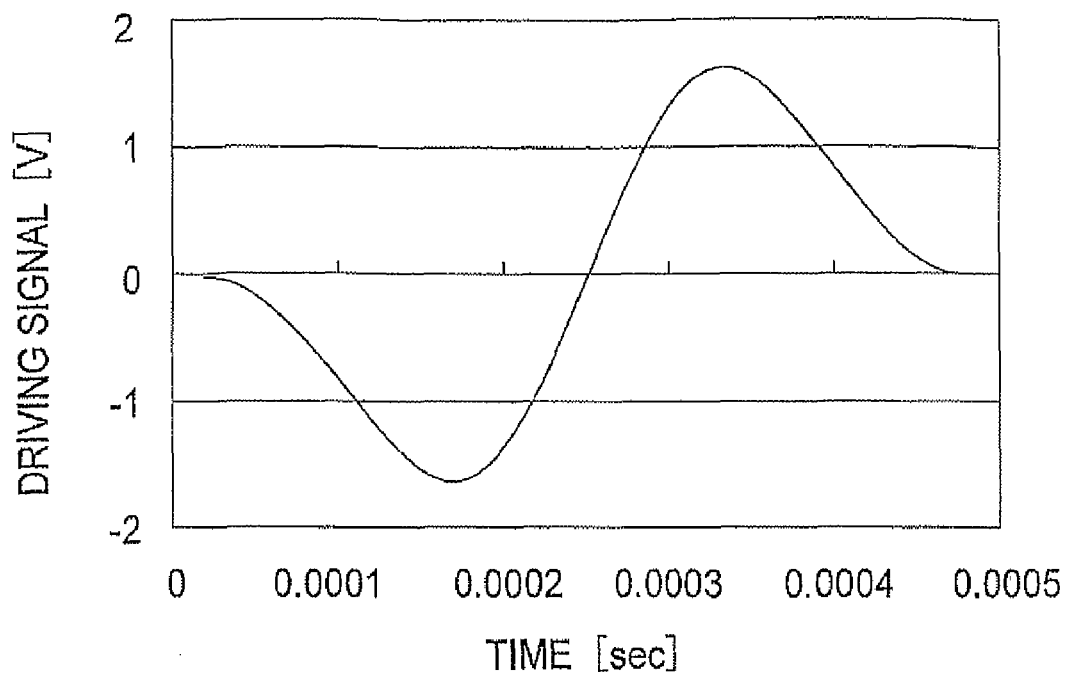
FIGS. 6A and 6B are graphs showing examples of the driving signal for driving the optical deflecting device of FIG. 1.
Figure 6B:
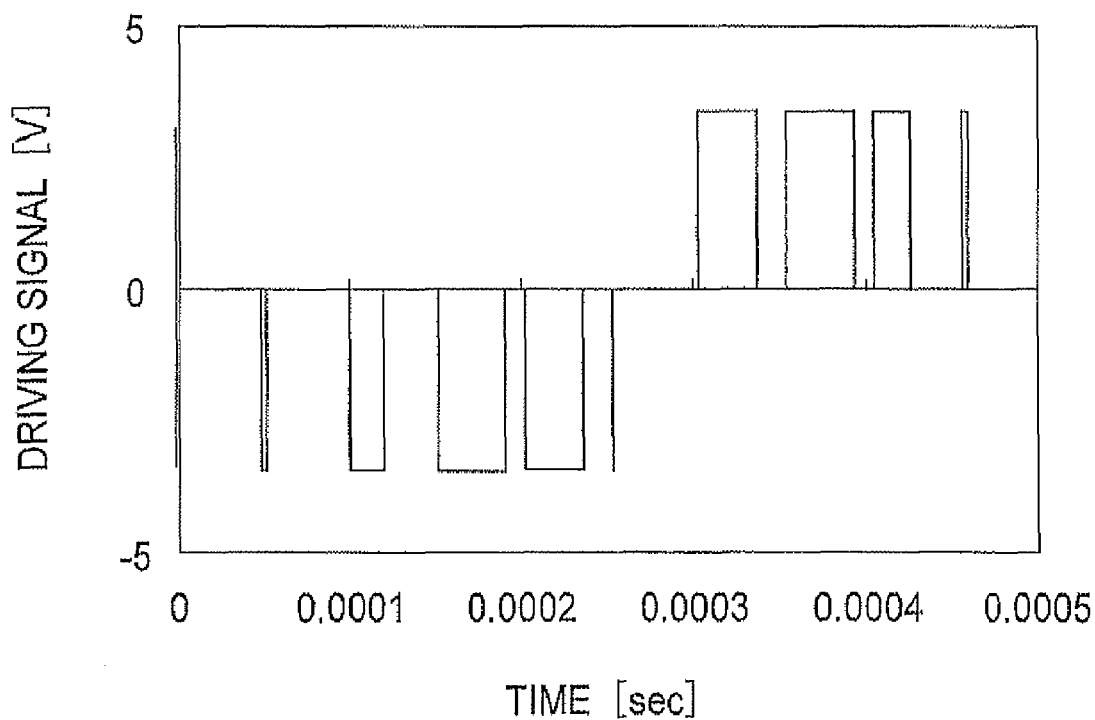

The driving signal may be one based on combined sinusoidal waves (FIG. 6A), or it may be a pulse-like driving signal (FIG. 6B). In the case of a driving signal based on combined sinusoidal waves, a desired driving signal is obtainable by adjusting the amplitude and phase of each sinusoidal wave. Where a pulse-like driving signal is used, a desired driving signal is obtainable by changing the pulse number, pulse interval, pulse width, and so on, with respect to time. Any other driving signal may be used, provided that the oscillator can be driven so as to control the deflection angle of the optical deflecting device to a desired angle.

The oscillator device of this embodiment may include a signal producing device for producing an output signal corresponding to displacement of at least one oscillator. In FIG. 1A, this signal producing device comprises a light receiving element 140, and in FIG. 1B, it comprises a piezoelectric resistor 170. Such signal producing device can be used also as a displacement angle gauge. Hence, in this specification, the term "signal producing device" and the term "displacement angle gauge" will be used equivalently.

Where a piezoelectric resistor 170 is to be used to detect the displacement angle of the oscillator, as an example the piezoelectric resistor 170 may be provided on a torsion spring, and the moment of time whereat the oscillator defines a certain displacement angle may be detected on the basis of an output signal from the piezoelectric resistor 170. The piezoelectric resistor 170 may be made by diffusing phosphorus into p-type monocrystal silicon, for example. The piezoelectric resistor 170 produces an output signal corresponding to the torsional angle of the torsion spring. Hence, for measurement of the displacement angle of the oscillator, a plurality of piezoelectric resistors 170 may be provided in relation to a plurality of torsion springs such that the displacement angle of the oscillator can be measured on the basis of torsional angle information from these torsion springs. This ensures higher precision measurement.

Where a light receiving element 140 is going to be used to detect the displacement angle of the oscillator, the structure may be made as follows.

Namely, a first light receiving element may be disposed at a position to be irradiated with scanning light as the oscillator takes a first displacement angler and a second light receiving element may be disposed at a position to be irradiated with scanning light as the oscillator takes a second displacement angle. The first and second light receiving elements may be provided by different elements, or they may be provided by one and the same element. The scanning light may be incident directly on the light receiving element, or it may be incident thereon via at least one reflection member. In summary, at least one light receiving element should be provided to receive and detect the scanning light at first and second scan angles. The signal producing device used in this embodiment may be one arranged to produce a signal intermittently with respect to a time axis, at the moment as a predetermined displacement angle is defined. Alternatively, it may be one arranged to produce a signal corresponding to the displacement, continuously with respect to the time axis.

Since the deflection angle of a mirror and the scan angle of scanning light scanningly deflected by that mirror are in constant relationship with each other, and they can be treated equivalently. Hence, in this specification, the term "deflection angle" (displacement angle) and the term "scan angle" are used equivalently.

Figure 3A:
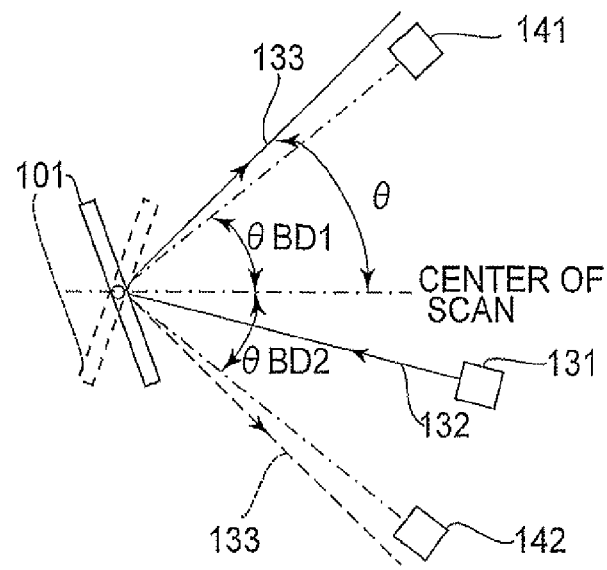
FIGS. 3A through 3C are schematic plane views for explaining the deflection angle, etc. of the optical deflecting device in FIG. 1 or 2.
Figure 3B:
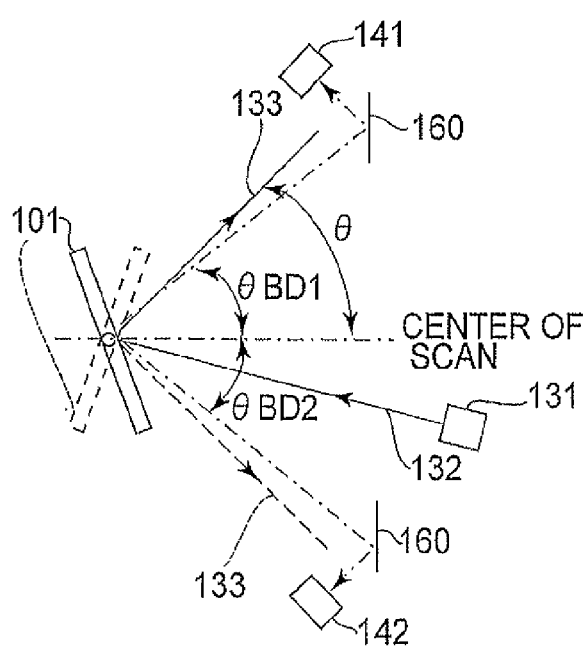
Figure 3C:
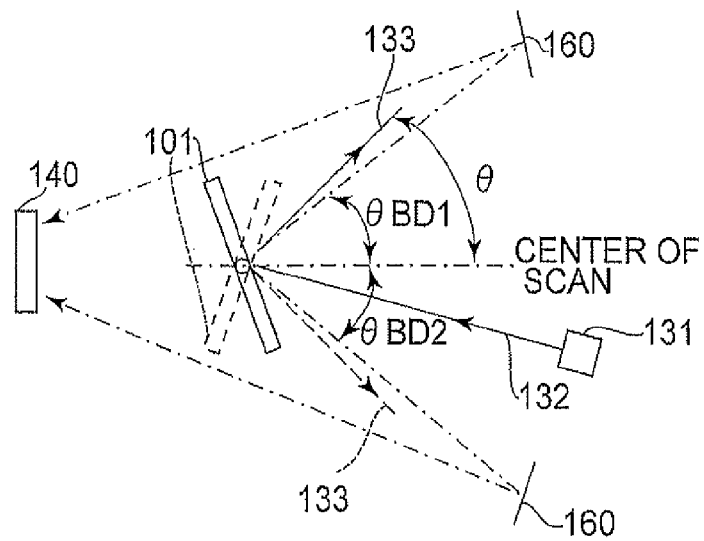
Figure 15:
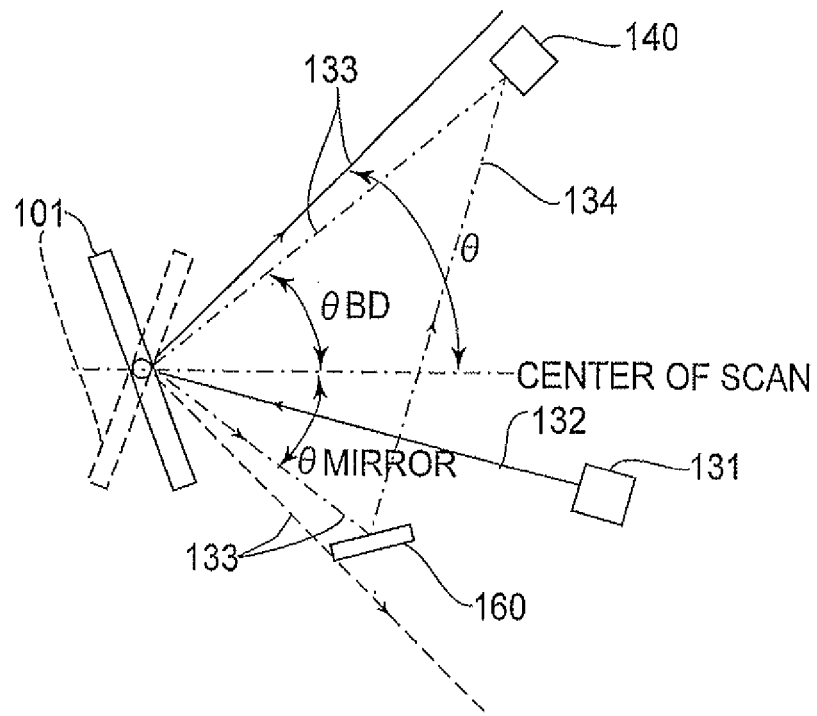
FIG. 15 is a schematic plan view for explaining the deflection angle, etc. of the optical deflecting device of FIG. 14.

As shown in FIG. 3A, for example, first and second light receiving elements may be provided at positions corresponding to first and second displacement angles, respectively. Alternatively, as shown in FIG. 3B, reflection members 160 may be provided at positions corresponding to the first and second displacement angles, such that light beams reflected by these reflection members are received by first and second light receiving elements 141 and 142. As a further alternative, as shown in FIG. 15, a light receiving element 140 and a reflection member 160 may be provided at positions corresponding to the first and second displacement angles. In such case, the scanning light of the first displacement angle can be detected by the light receiving element 140, while the scan light of the second displacement angle can be reflected by the reflection member 160 and then received by the light receiving element 140 which is provided at the first displacement angle position. As a further alternative, as shown in FIG. 3C, reflection members 160 may be provided at the positions of first and second displacement angles, and the light beams reflected by these reflection members 160 may be received by a single light receiving element 140.

This embodiment is not limited in regard to the structure for measuring the time moment of passage of the scanning light at first and second displacement angles, and the time moment of passage of the scanning light may be measured at more displacement angles.

In the present invention, the term "displacement angle" includes a displacement angle when the oscillator is held stationary, that is, a displacement angle which is equal to zero.

In the first example of this embodiment, the drive control system 150 may control the driving system 120 on the basis of an output signal of the signal producing device so that at least one of the amplitude and phase of a plurality of time functions that represent the oscillation motion of the oscillator takes a predetermined value.

In the second example, since the oscillation motion of the oscillator is expressed by an equation that contains at least a term $A_1 \sin \omega t + A_2 \sin(n\omega t + \emptyset)$, the driving system may be controlled as follows. That is, the driving system 120 may be controlled so that at least one of $A_1$, $A_2$ and ø in the aforementioned equation takes a predetermined value.

In the third example, on the other hand, since the oscillation motion of the oscillator is expressed by Equation (2), the driving system 120 may be controlled on the basis of an output signal of the signal producing device so that at least one of $A_1, A_2, \ldots, A_n$ and $\emptyset_1, \emptyset_2, \ldots, \emptyset_{n-1}$ takes a predetermined value.

As described above, in the oscillator device according to this embodiment of the present invention, the deflection angle of the oscillator can be controlled very precisely with a quite simple structure.

In this embodiment, the drive may be adjusted in accordance with information from the signal producing device. With regard to such information from the signal producing device, preferably, the drive may be/controlled on the basis of both of the information from the signal producing device in a case where the displacement angle of the oscillator is positive and the information from the signal producing device in a case where the displacement angle is negative. For example, if, with respect to a displacement angle θ of the oscillator, four pieces of information from the signal producing device at four time moments reflecting the displacement should be used, two of the four time moments may preferably be those concerning the time moment information when the displacement angle θ of the oscillator is positive, and the remaining two may be those concerning the time moment information when the displacement angle θ is negative.

Second Embodiment

Figure 2A:
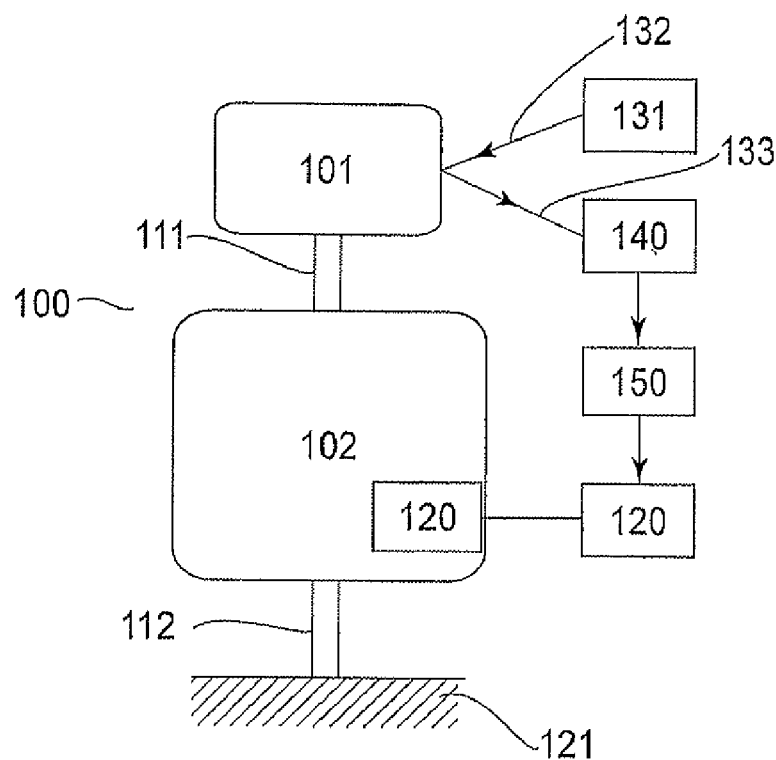
Figure 2B:
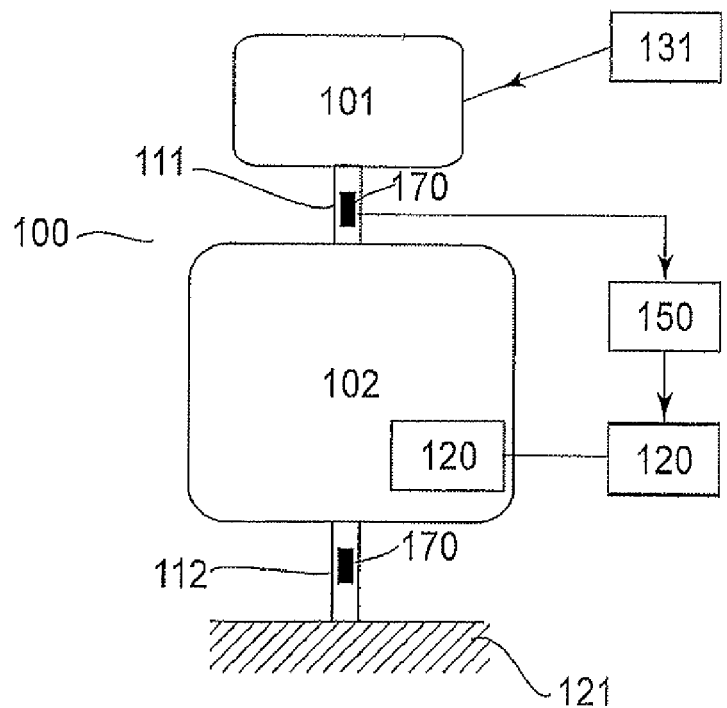

An oscillator device according to a second embodiment of the present invention will now be described. The oscillator device of this embodiment may comprise, as shown in FIGS. 2A and 2B, an oscillating system that includes a first oscillator 101, a second oscillator 102, a first torsion spring 111 and a second torsion spring 112, as well as a supporting system 121 for supporting the oscillating system. The first torsion spring may connect the first and second oscillators each other. The second torsion spring may connect the supporting system and the second oscillator 102 so that it has a common torsional axis with respect to the first torsion spring.

The oscillator device may further comprise a driving system 120 for applying a driving force to the oscillating system, a drive control system 150 for adjusting the driving system, and a signal producing device for producing time moment information related to time moment as one of the two oscillators takes first and second, different displacement angles. This signal producing device may be used as a displacement angle gauge. In FIG. 2A, this gauge comprises a light receiving element 140, and in FIG. 2B it comprises a piezoelectric resistor 170. The manner of detecting the displacement angle of the oscillator by use of the light receiving element 140 or the piezoelectric resistor 170 in this embodiment is similar to that having been described with reference to the first embodiment.

At least one oscillator may be provided with a reflection mirror. Where the oscillator device of this embodiment is used in an optical deflecting device, a light source 131 for emitting a light beam may be provided. The light beam 132 from the light source may be projected onto the reflection mirror of the oscillator, whereby the light is scanningly deflected.

The oscillating system is arranged to simultaneously produce first oscillation motion moving in accordance with a first frequency (fundamental frequency) and second oscillation motion moving with second frequency which is a frequency integral-number-fold the fundamental frequency.

Namely, the deflection angle θ of the optical deflecting device of this embodiment (here, it is measured with reference to the position of the scan center as shown in FIG. 3) may be as follows. Now, the amplitude, angular frequency and phase of the first oscillation motion are denoted by $A_1$, $\omega_1$ and $\emptyset_1$, respectively, and the amplitude, angular frequency and phase of the second oscillation motion are denoted by $A_2$, $\omega_2$ and $\emptyset_2$, respectively. If the time with respect to the origin or reference time being taken at an arbitrary time is denoted by t, then the deflection angle θ can be expressed as follows.

$$\theta(t) = A_1 \sin(\omega_1 t + \emptyset_1) + A_2 \sin(\omega_2 t + \emptyset_2) \tag{3-1}$$

Furthermore, if the amplitude and angular frequency of the first oscillation motion are denoted by $A_1$ and $\omega_1$ and the amplitude and angular frequency of the second oscillation motion are denoted by $A_2$ and $\omega_2$, the relative phase difference between the two frequencies is denoted by ø, and the time with respect to the reference time being taken at an arbitrary time is denoted by t, then the deflection angle θ of the optical deflecting device can be expressed as follows, $$\theta(t) = A_1 \sin(\omega_1 t) + A_2 \sin(\omega_2 t + \emptyset) \tag{3-2}$$

or $$\theta(t) = A_1 \sin(\omega_1 t + \emptyset) + A_2 \sin(\omega_2 t) \tag{3-3}$$

Equation (3-3) corresponds to a case wherein there is a possibility of adjusting the phase of the fundamental wave $\omega_1$ during the control. Equation (3-1), Equation (3-2) and Equation (3-3) are different only with respect to the expression concerning determination of the origin or reference point of time. These are essentially the same in that each is an equation containing four unknown values: for example, ø in Equation (3-2) and Equation (3-3) can be rewritten as $\emptyset_1 - \emptyset_2$ or $\emptyset_2 - \emptyset_1$.

The driving system 120 may be arranged to apply a driving force to the oscillating system in accordance with any of electromagnetic process, electrostatic process, piezoelectric process, and so on. It may have a similar structure as of the first embodiment.

The drive control system 150 may be arranged to produce a driving signal with which the oscillating system can provide oscillation motion, oscillating in accordance with a fundamental frequency and frequencies N-fold the fundamental frequency where N is an integer. The driving signal may be applied to the driving system.

The driving signal may be one based on combined sinusoidal waves (FIG. 6A), or it may be a pulse-like driving signal (FIG. 6B). In the case of a driving signal based on combined sinusoidal waves, a desired driving signal is obtainable by adjusting the amplitude and phase of each sinusoidal wave. Where a pulse-like driving signal is used, a desired driving signal is obtainable by changing the pulse number, pulse interval, pulse width, and so on, with respect to time. Any other driving signal may be used, provided that the oscillator can be driven so as to control the deflection angle of the optical deflecting device to a desired angle.

The displacement gauge may be arranged to measure four time moments, that is, two different time moments whereat, within one cycle of the first oscillation motion, the oscillator takes the first displacement angle, and two different time moments whereat the oscillator takes the second displacement angle.

The drive control system 150 may be arranged to produce a driving signal by combining a first signal having a first frequency and a second signal having a second frequency, and to apply the same to the driving system 120. Furthermore, the drive control system may operate to adjust the driving signal so that the four measured time moments mentioned above coincide with desired moments determined beforehand. Then, it may apply the thus adjusted driving signal to the driving system 120, whereby the oscillator device can be controlled very precisely.

The drive control system 150 may further be arranged to calculate at least one of the amplitudes and phases of the first and second oscillation motions in Equation (3-1), that is, $A_1$, $ø_1$, $A_2$ and $ø_2$ in this equation, from the four time moments described above. Then, the drive control system 150 may adjust the driving signal so that at least one of these values is made equal to a preset value.

For adjustment of the driving signal, the amplitude component and phase component of the first oscillation motion in the driving signal as well as the amplitude component and phase component of the second oscillation motion may be adjusted. Here, the amplitude component of the first oscillation motion in the driving signal, for example, refers to such component in the driving signal with which the amplitude of the first oscillation motion of the oscillator can be changed. This is also the case with the other components.

By supplying so adjusted driving signal to the driving system 120, the oscillator device can be controlled very precisely.

Although this embodiment has been described with reference to an example wherein moment of passage of the scanning light is measured on the basis of the first and second displacement angles, the present invention is not limited to it. More displacement angles may be used to measure the moment of passage of the scanning light.

Third Embodiment

An oscillator device according to a third embodiment of the present invention will be described. FIG. 2A is a block diagram of an optical deflecting device having an oscillator device according to this embodiment. The basic structure is the same as the oscillator device according to the first or second embodiment described hereinbefore. In this embodiment, as shown in FIG. 3A, for detection of scanning light 133, there are first and second light receiving elements disposed at the positions of the first and second displacement angles.

In this embodiment as well, if the amplitude, angular frequency and phase of the first oscillation motion are denoted by $A_1$, $\omega_1$ and $ø_1$, the amplitude, angular frequency and phase of the second oscillation motion are denoted by $A_2$, $\omega_2$ and $ø_2$, and the time is denoted by t, then the deflection angle θ of the optical deflecting device can be expressed by Equation (3-1) mentioned hereinbefore.

Furthermore, if the amplitude and angular frequency of the first oscillation motion are denoted by $A_1$ and $\omega_1$, the amplitude and angular frequency of the second oscillation motion are denoted by $A_2$ and $\omega_2$, the relative phase difference between the two frequencies is denoted by ø, and the time with respect to the reference time being taken at an arbitrary time is denoted by t, then the deflection angle θ can be expressed by Equation (3-2) or Equation (3-3) mentioned hereinbefore.

Here, by using the first and second light receiving elements disposed at positions of the first and second displacement angles, mutually different four desired time moments in one cycle of the first oscillating motion may be measured. Then, the drive control system 150 may adjust the driving signal so that the scanning light passes over the first and second light receiving elements at preset time moments.

Namely, the drive control system 150 may be arranged to calculate, from the four time moments mentioned hereinbefore, the amplitude and phase of the first oscillation motion as well as the amplitude and phase of the second oscillation motion in Equation (3-1), that is, the values of $A_1$, $ø_1$, $A_2$ and $ø_2$ in this equation. Based on this, an arbitrary and desired deflection angle θ of the optical deflecting device is provided. Here, with regard to the four time moments, if the deflection angles corresponding to the positions of the first and second light receiving elements are denoted by $\theta_{BD1}$ and $\theta_{BD2}$ (see FIG. 3A), respectively, these have the following relation.

At certain moments $t_1$ and $t_2$, $$\theta(t_1)=\theta(t_2)=\theta_{BD1} \quad (4)$$

At certain moments $t_3$ and $t_4$, $$\theta(t_3)=\theta(t_4)=\theta_{BD2} \quad (5)$$

Namely, by letting the four time moments coincide with the arbitrary desired moments, respectively, the drive control system 150 can definitely determine the amplitudes and phases of the first and second oscillation motions. More specifically, in order to bring the four time moments into coincidence with the preset time moments, the drive control system 150 produces a driving signal and applies the same to the driving system 120, thereby to adjust the amplitudes and phases or a relative phase difference of the first and second oscillation motions.

The driving signal may be one based on combined sinusoidal waves (FIG. 6A), or it may be a pulse-like driving signal (FIG. 6B). In the case of a driving signal based on combined sinusoidal waves, a desired driving signal is obtainable by adjusting the amplitude and phase of each sinusoidal wave. Where a pulse-like driving signal is used, a desired driving signal is obtainable by changing the pulse number, pulse interval, pulse width, and so on, with respect to time. Any other driving signal may be used, provided that the oscillator can be driven so as to control the deflection angle of the optical deflecting device to a desired angle.

Fourth Embodiment

Figure 14:
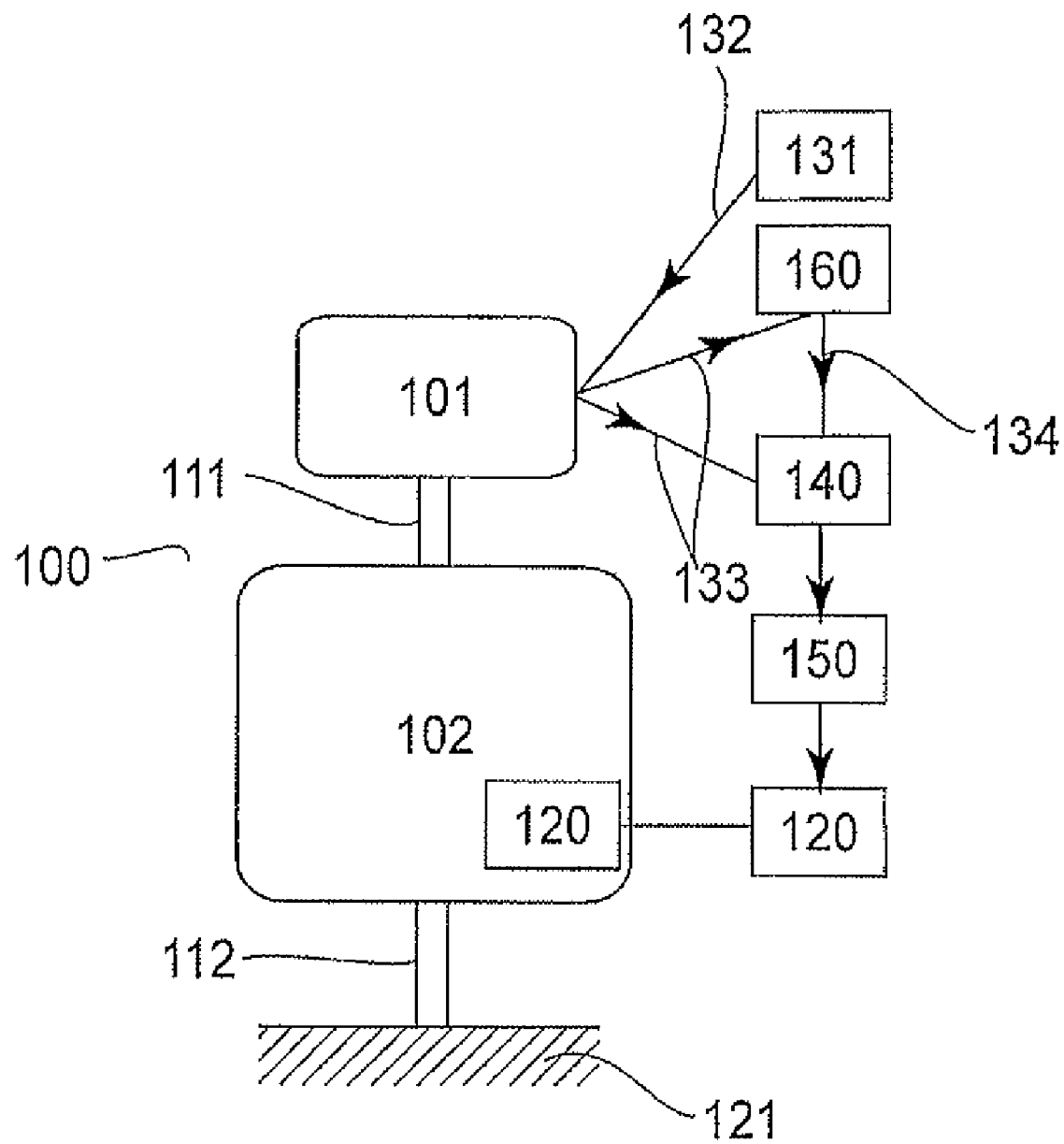
FIG. 14 is a block diagram of an optical deflecting device having an oscillator device according to a fourth embodiment of the present invention and examples based on it.

An oscillator device according to a fourth embodiment of the present invention will be described. FIG. 14 is a block diagram of an optical deflecting device having an oscillator device according to this embodiment. The basic structure is the same as the oscillator device of the first or second embodiment described hereinbefore. In this embodiment, during reciprocal scan of each cycle, scanning light 133 may directly pass across a light receiving element 140 twice, and it may be deflected twice by a reflection plate 160. Deflection light 134 deflected by the reflection plate 160 may pass across the same light receiving element 140 twice. A drive control system 150 may produce a driving signal to be applied to a driving system 120, at four time moments as the scanning light passes across the light receiving element 140.

FIG. 15 illustrates the deflection angle $\theta$ of the optical deflecting device of this embodiment. The oscillator 101 has a reflection mirror formed on the surface thereof, for scanningly deflecting a light beam 132 from a light source 131. The optical deflecting device may include a light receiving element and a reflection plate. The light receiving element 140 and the reflection plate 160 may be disposed each at the position of deflection angle which is smaller than the largest deflection angle of the optical deflecting device. In FIG. 15, the light receiving element 140 and the reflection plate 160 are disposed on a direct path of the scanning light in the optical deflecting device. However, as described hereinbefore, the light receiving element 140 and the reflection plate 160 may be disposed on a path of scanning light which path is deflected by use of a separate reflection plate or the like.

In this embodiment as well, if the amplitude, angular frequency and phase of the first oscillation motion are denoted by $A_1$, $\omega_1$ and $\varnothing_1$, the amplitude, angular frequency and phase of the second oscillation motion are denoted by $A_2$, $\omega_2$ and $\varnothing_2$, and the time is denoted by t, then the deflection angle $\theta$ of the optical deflecting device can be expressed by Equation (3-1) mentioned hereinbefore.

Furthermore, if the amplitude and angular frequency of the first oscillation motion are denoted by $A_1$ and $\omega_1$, the amplitude and angular frequency of the second oscillation motion are denoted by $A_2$ and $\omega_2$, the relative phase difference between the two frequencies is denoted by $\varnothing$, and the time with respect to the reference time being taken at an arbitrary time is denoted by t, then the deflection angle $\theta$ can be expressed by Equation (3-2) or Equation (3-3) mentioned hereinbefore.

Here, the light receiving element and the reflection plate may be disposed at positions to be irradiated by the scanning light, and mutually different four desired time moments in one cycle of the first oscillating motion may be measured. Then, the drive control system 150 may adjust the driving signal so that the scanning light passes over the light receiving element and the reflection plate at preset time moments.

Namely, the drive control system may be arranged to calculate, from the four time moments mentioned hereinbefore, the amplitude and phase of the first oscillation motion as well as the amplitude and phase of the second oscillation motion in Equation (3-1), that is, the values of $A_1$, $\varnothing_1$, $A_2$ and $\varnothing_2$ in this equation. Based on this, an arbitrary and desired deflection angle $\theta$ of the optical deflecting device is provided. Here, with regard to the four time moments, if the deflection angles corresponding to the positions of the light receiving element and the reflection plate are denoted by $\theta_{BD}$ and $\theta_{MIRROR}$ (see FIG. 15), respectively, these have the following relation. At certain moments $t_1$ and $t_2$, $$\theta(t_1)=\theta(t_2)=\theta_{BD} \quad (6)$$

At certain moments $t_3$ and $t_4$, $$\theta(t_3)=\theta(t_4)=\theta_{MIRROR} \quad (7)$$

Namely, by letting the four passage time moments ($t_1$, $t_2$, $t_3$ and $t_4$) coincide with the arbitrary desired time moments, respectively, the drive control system 150 definitely determines the amplitudes and phases of the first and second oscillation motions. More specifically, in order to bring the four time moments into coincidence with the preset moments, the drive control system 150 produces a driving signal and applies the same to the driving system 120, thereby to adjust the amplitudes and phases or a relative phase difference of the first and second oscillation motions.

The driving signal may be one based on combined sinusoidal waves (FIG. 6A), or it may be a pulse-like driving signal (FIG. 6B). In the case of a driving signal based on combined sinusoidal waves, a desired driving signal is obtainable by adjusting the amplitude and phase of each sinusoidal wave. Where a pulse-like driving signal is used, a desired driving signal is obtainable by changing the pulse number, pulse interval, pulse width, and so on, with respect to time. Any other driving signal may be used, provided that the oscillator can be driven so as to control the deflection angle of the optical deflecting device to a desired angle.

Fifth Embodiment

Figure 22A:
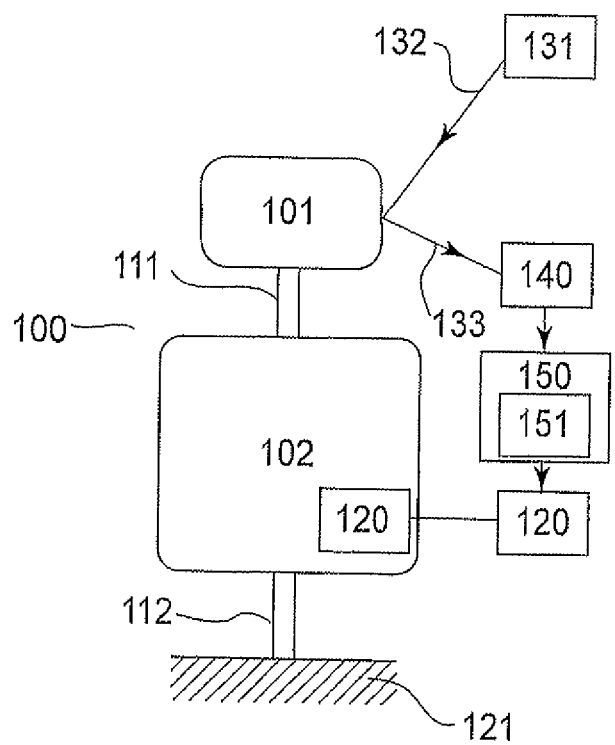
Figure 22B:
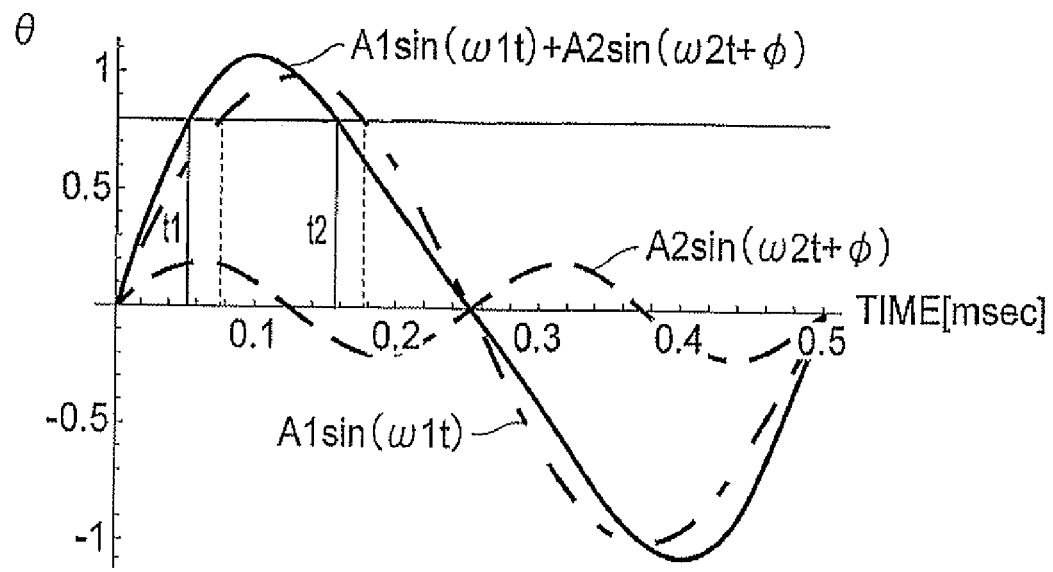
Figure 22C:
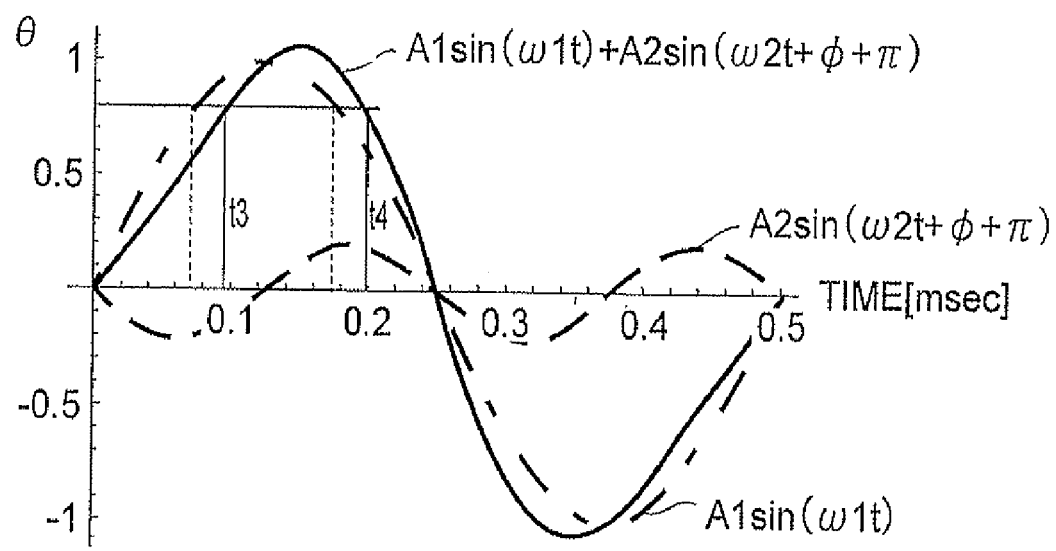

An oscillator device according to a fifth embodiment of the present invention will be described. FIG. 22 is a block diagram of an optical deflecting device having an oscillator device according to this embodiment. The basic structure is the same as the oscillator device of the first or second embodiment described hereinbefore. There is a difference in the following point. As shown in FIG. 22A which is a block diagram of an optical deflecting device according to this embodiment, the drive control system 150 may include an oscillation mode changing system 151. The oscillation mode changing system 151 may be arranged to produce a driving signal while adding a desired phase to at least one of the first and second oscillation motions. As an example, FIG. 22B shows the deflection angle $\theta$ of the oscillating system during the drive according to the first oscillation mode before a desired phase is added, and FIG. 22C shows the deflection angle $\theta$ of the oscillating system during the drive according to the second oscillation mode after a desired phase is added.

In the example illustrated, the first oscillation motion is depicted by $A_1 \sin(\omega_1 t)$ and the second oscillation motion is depicted by $A_2 \sin(\omega_2 t+\varnothing)$. A phase $\pi$ is added only to the second oscillation motion during the drive under the second oscillation mode, such that the motion is depicted by $A_2 \sin(\omega_2 t+\varnothing+\pi)$. As seen at the solid curves in FIGS. 22B and 22C, the scanning light 133 passes across the light receiving element 140 twice, each timed, that is, total four times. The drive control system 150 may be arranged to calculate, from the four time moments of passage, a driving signal necessary for making the first and second oscillation motions into a desired motion. On the basis of the thus calculated driving signal, the driving system 120 may control the oscillating system 100 so as to provide a desired oscillation motion.

Figure 23:
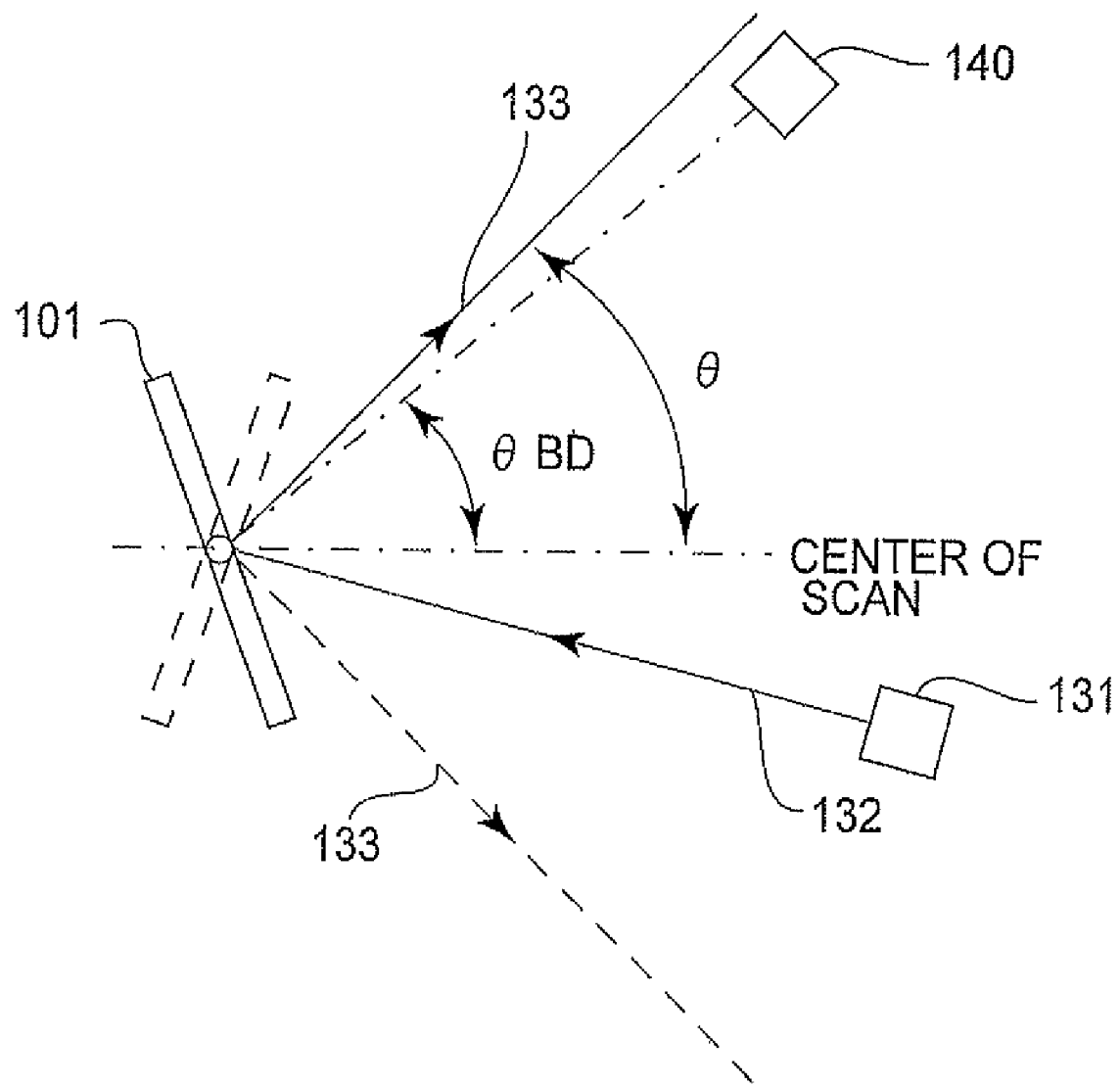
FIG. 23 is a schematic plan view for explaining the deflection angle, etc. of the optical deflecting device of FIG. 22.

FIG. 23 illustrates the deflection angle $\theta$ of the optical deflecting device of this embodiment. The oscillator 101 has a reflection mirror formed on the surface thereof, for scanningly deflecting a light beam 132 from a light source 131. The optical deflecting device may include one light receiving element 140 which may be disposed at the position of deflection angle smaller than the largest deflection angle of the optical deflecting device. In FIG. 23, the light receiving element 140 is disposed on the light path in the optical deflecting device. However, the light receiving element 140 160 may be disposed on a path of scanning light which path is deflected by use of a separate reflection plate or the like.

If the amplitude, angular frequency and phase of the first oscillation motion are denoted by $A_1$, $\omega_1$ and $\varnothing_1$, the amplitude, angular frequency and phase of the second oscillation motion are denoted by $A_2$, $\omega_2$ and $\varnothing_2$, and the time is denoted by t, then the deflection angle $\theta_a$ of the optical deflecting device in the first oscillation mode can be expressed as follows.

$$\theta_a(t)=A_1 \sin(\omega_1 t+\varnothing_1)+A_2 \sin(\omega_2 t+\varnothing_2) \quad (8)$$

Furthermore, the deflection angle $\theta_b$ of the optical deflecting device in the second oscillation mode wherein desired phases $\varnothing_1'$ and $\varnothing_2'$ are added to the phases $\varnothing_1$ and $\varnothing_2$ by the oscillation mode changing means 151, can be expressed as follows.

$$\theta_b(t)=A_1 \sin(\omega_1 t+\varnothing_1+\varnothing_1')+A_2 \sin(\omega_2 t+\varnothing_2+\varnothing_2') \quad (9)$$

The light receiving element 140 may be disposed at a desired position to be irradiated by the scanning light, and mutually different four desired time moments in the first oscillating motion, taking a certain point in the cycle as an origin, may be measured. Then, the drive control system 150 may adjust the driving signal so that the scanning light passes over the light receiving element at preset time moment.

Namely, by calculating the amplitudes, angular frequencies and phases of the first and second oscillation motions from the four time moments mentioned hereinbefore, and by adjusting the driving signal based on it, a desired deflection angle θ of the optical deflecting device is provided.

With regard to the four time moments, if the deflection angle corresponding to the position of the light receiving element 140 is denoted by $\theta_{aBD}$, with respect, to certain moments $t_1$ and $t_2$ as well as certain moments $t_3$ and $t_4$ the following relation is given.

$$\theta_a(t_1)=\theta_a(t_2)=\theta_{aBD} \quad (10)$$

$$\theta_b(t_3)=\theta_b(t_4)=\theta_{bBD} \quad (11)$$

Hence, by letting the four time moments ($t_1$, $t_2$, $t_3$ and $t_4$) coincides with the arbitrary desired moments, respectively, the drive control system 150 definitely determines the amplitudes and phases of the first and second oscillation motions. More specifically, in order to bring the four time moments into coincidence with the preset moments, the drive control system 150 produces a driving signal and applies the same to the driving system 120, thereby to adjust the amplitudes and phases of the first and second oscillation motions.

Furthermore, if the amplitude and angular frequency of the first oscillation motion are denoted by $A_1$ and $\omega_1$, the amplitude and angular frequency of the second oscillation motion are denoted by $A_2$ and $\omega_2$, the relative phase difference between these two frequencies is denoted by ø, and the time while taking an arbitrary time as zero is denoted by t, then the deflection angle $\theta_a$ of the optical deflecting device in the first oscillation mode can be expressed as follows.

$$\theta_a(t)=A_1 \sin(\omega_1 t)+A_2 \sin(\omega_2 t+\varnothing) \quad (12)$$

Furthermore, the deflection angle $\theta_b$ of the optical deflecting device in the second oscillation mode wherein desired phases $\varnothing_1'$ and $\varnothing_2'$ are added to the phases $\varnothing_1$ and $\varnothing_2$ by the oscillation mode changing means 151, can be expressed as follows.

$$\theta_b(t)=A_1 \sin(\omega_1 t+\varnothing_1')+A_2 \sin(\omega_2 t+\varnothing+\varnothing_2') \quad (13)$$

In this case as well, the light receiving element 140 may be disposed at a desired position to be irradiated by the scanning light, and mutually different four desired time moments in the first oscillating motion, taking a certain point in the cycle as an origin, may be measured. Then, the drive control system 150 may adjust the driving signal so that the scanning light passes over the light receiving element at preset time moment.

Namely, by calculating the amplitudes, angular frequencies and phases of the first and second oscillation motions from the four time moments mentioned hereinbefore, and by adjusting the driving signal based on it, a desired deflection angle θ of the optical deflecting device is provided.

With regard to the four time moments, if the deflection angle corresponding to the position of the light receiving element 140 is denoted by $\theta_{aBD}$, with respect, to certain moments $t_1$ and $t_2$ as well as certain moments $t_3$ and $t_4$ the following relation is given.

$$\theta_a(t_1)=\theta_a(t_2)=\theta_{aBD} \quad (14)$$

$$\theta_b(t_3)=\theta_b(t_4)=\theta_{aBD} \quad (15)$$

Hence, by letting the four time moments ($t_1$, $t_2$, $t_3$ and $t_4$) coincide with the arbitrary desired moments, respectively, the drive control system 150 definitely determines the amplitudes and phases of the first and second oscillation motions. More specifically, in order to bring the four time moments into coincidence with the preset moments, the drive control system 150 produces a driving signal and applies the same to the driving system 120, thereby to adjust the amplitudes $A_1$ and $A_2$ of the first and second oscillation motions, respectively, as well as the phase difference $\varnothing_2$ between them.

In this embodiment as well, the driving signal may be one based on combined sinusoidal waves (FIG. 6A), or it may be a pulse-like driving signal (FIG. 6B). In the case of a driving signal based on combined sinusoidal waves, a desired driving signal is obtainable by adjusting the amplitude and phase of each sinusoidal wave. Where a pulse-like driving signal is used, a desired driving signal is obtainable by changing the pulse number, pulse interval, pulse width, and so on, with respect to time. Any other driving signal may be used, provided that the oscillator can be driven so as to control the deflection angle of the optical deflecting device to a desired angle.

EXAMPLES

Specific examples in which the present invention is embodied in various ways will be described below, in conjunction with the drawings.

Example 1

Figure 4A:
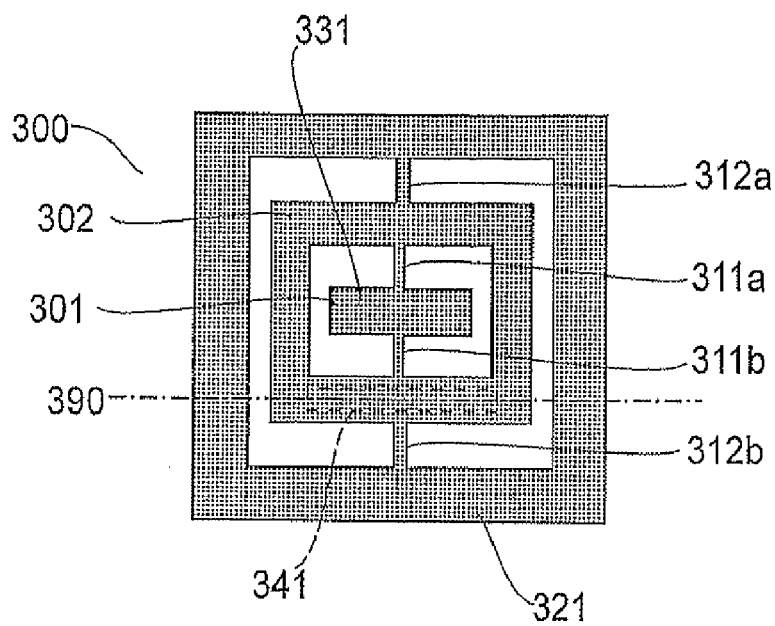
Figure 4B:
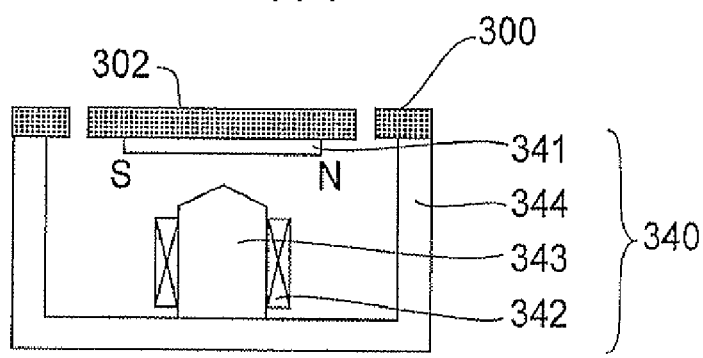
Figure 4C:
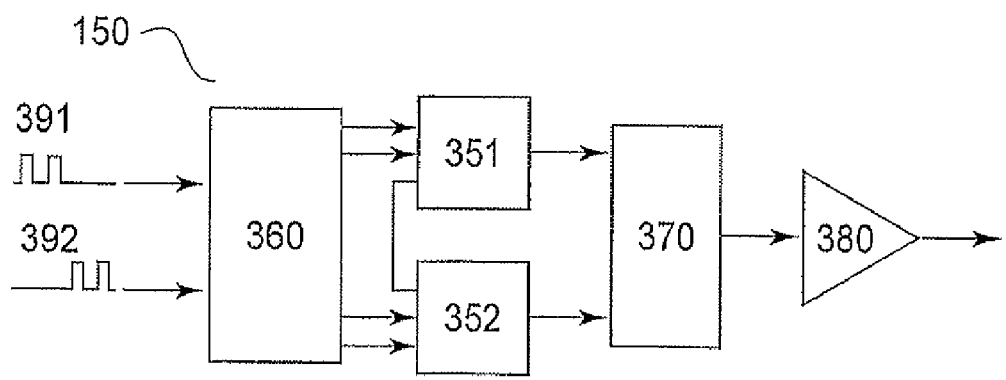

An optical deflecting device according to Example 1 of the present invention will be described. The block diagram of the optical deflecting device of Example 1 may be the same as shown in FIG. 2A. FIGS. 4A-4C illustrate detailed structure of this example, wherein FIG. 4A is a top plan view of the oscillating system of the optical deflector. There is a plate member 300 made by etching a silicon wafer. An oscillator 301 has a plate-like shape, and it is supported by two torsion springs 311a and 311b. Formed on the top surface of the oscillator 301 is a light reflection film (reflection mirror) 331.

Another oscillator 302 has a frame-like shape, and it supports torsion springs 311a 311b inside thereof. The oscillator is supported at the upper and lower portions thereby, by two torsion springs 312a and 312b. There is a support frame 321 having a frame-like shape, and it supports the torsion springs 312a and 312b inside thereof.

In this example, each of the oscillators 301 and 302 is held by two torsion springs at the upper and lower portions thereof. However, the oscillator may be supported only by one torsion spring, at one side thereof. For example, the oscillator 301 may be held by a single torsion spring 311b, while the oscillator 302 may be held by two torsion springs 312a and 312b. Inversely, the oscillator 301 may be held by two torsion springs 311a and 311b, while the oscillator 302 may be held by a single torsion spring 312b.

The oscillating system including oscillators 301 and 302 and torsion springs 311 and 312 has two oscillation modes, wherein adjustment is made so that the frequency of one mode is approximately two-fold (twice) the frequency of the other mode. For example, if the moment of inertia of the oscillators 301 and 302 is denoted by $I_1$ and $I_2$, respectively, the spring constant provided by the torsion springs 311a and 311b is denoted by $k_1$, and the spring constant provided by the torsion springs 312a and 312b is denoted by $k_2$, then two natural angular oscillation frequencies are determined definitely. In this example, the moment of inertia $I_1$ and $I_2$ and the spring constants $k_1$ and $k_2$ are adjusted to provide $\omega_1=2\pi\times 2000$ [rad/s] and $\omega_2=2\pi\times 4000$ [rad/s].

FIG. 4B is a schematic view for explaining the driving system in the optical deflecting device of this example. In the drawing, the plate member 300 is illustrated in the sectional view taken along a line 390 in FIG. 4A. A permanent magnet 341 is adhered to the bottom of the oscillator 302, and the plate member 300 is adhered to a yoke 344 made of a material having high magnetic permeability. Disposed at a position on the yoke 344 opposed to the permanent magnet 341 is a core 343 made of a material having high magnetic permeability. There is a coil 342 wound around the core 343. The permanent magnet 341, coil 342, core 343 and yoke 344 constitute an electromagnetic actuator (driving system) 340. In response to an electric current supplied to the coil 342, a torque acts on the permanent magnet 341, whereby the oscillator 302 is driven.

Figure 5A:
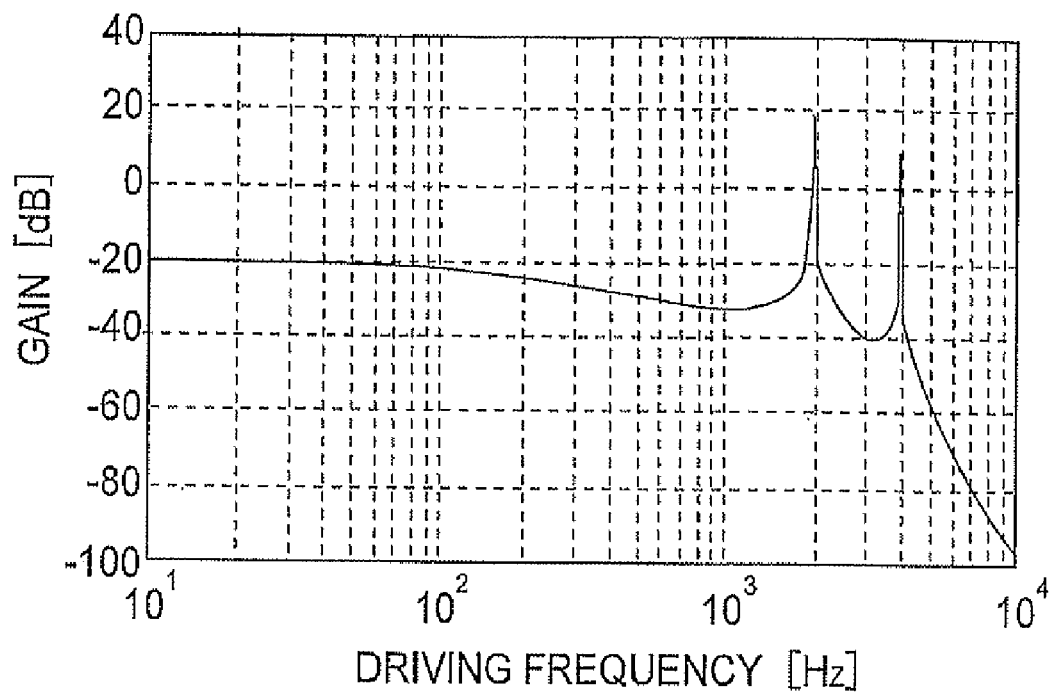
Figure 5B:
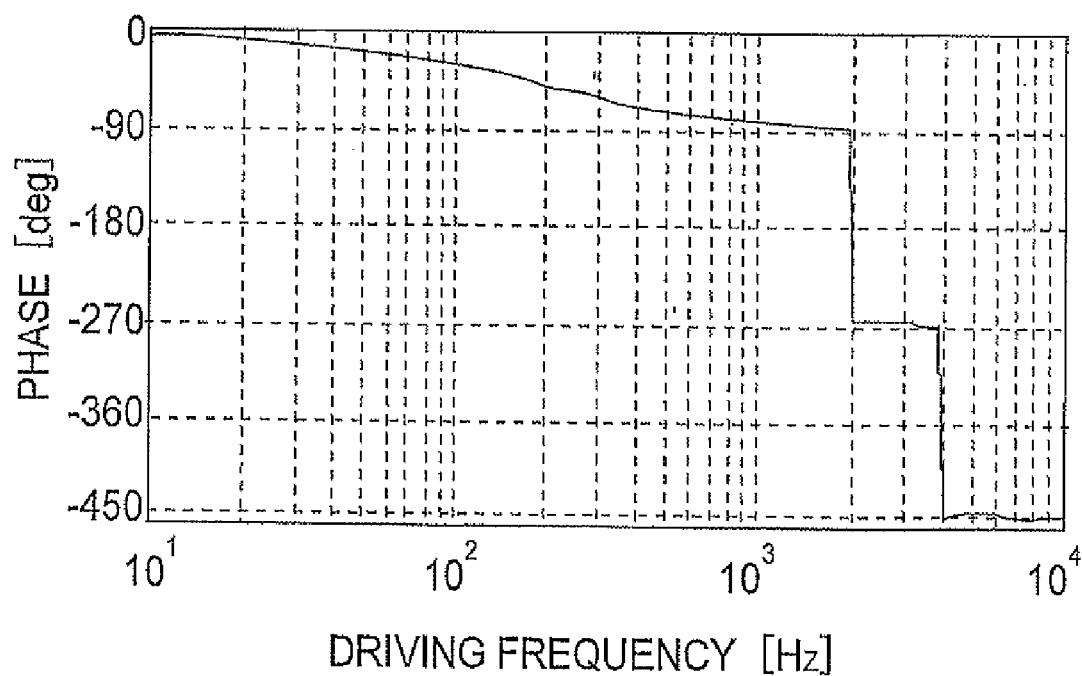

FIGS. 5A and 5B illustrate displacement angle transmission characteristic of the oscillator 301 responsive to the application of a voltage to the coil. FIG. 5A shows the relationship between gain ([displacement angle]/[applied voltage]) and driving frequency. FIG. 5B shows the relationship between phase difference of displacement angle and applied voltage versus driving frequency. As seen in FIG. 5A, as compared with the oscillation mode of $\omega_1$, the gain (efficiency) of the oscillation mode of $\omega_2$ is different and, as seen in FIG. 5B, the oscillation mode of $\omega_2$ has a phase delay of 180 deg. relative to the oscillation mode of $\omega_1$.

FIG. 4C illustrates a control system 150 of the optical deflector of this example. Denoted in this drawing at 351 and 352 are arbitrary-wave producing circuits for producing sinusoidal waves of 2000 Hz and 4000 Hz, respectively. The phase and amplitude of these sinusoidal waves can be changed as desired in response to a command from a computing unit 360. The two sinusoidal waves thus produced are added by an adder 370 and, subsequently, amplified by an amplifier 380. Then, a resultant voltage is applied to the coil 342, and an electric current flows therethrough. There are first and second light receiving elements 141 and 142 which are disposed such as shown in FIG. 3A. The outputs 391 and 392 of the first and second light receiving elements are applied to the computing unit 360. The computing unit 360 adjusts the phase and amplitude of the sinusoidal waves of the arbitrary-wave producing circuits 351 and 352 so that the outputs 391 and 392 of the first and second light receiving elements have a desired value, in other words, scanning light 133 can pass across the light receiving elements 141 and 142 at desired time moments.

In this example, the wave producing circuits 351 and 352 and adder 370 are used to combine two frequencies to produce a driving signal (see FIG. 6A). However, a voltage waveform of one period of a natural angular oscillation frequency $\omega_1$ may be divided in response to a command from the computing unit 360, so that a driving signal is provided by a series of large number of pulses (see FIG. 6B). Namely, PWM (Pulse Width Modulation) driving system wherein the amplitude component and phase of the natural angular oscillation frequencies $\omega_1$ and $\omega_2$ can be changed by adjusting the pulse number, pulse interval, pulse width and so on with respect to time, may be used.

In accordance with the optical deflecting device of this example, desired optical scan based on two frequency components (e.g., optical scan with its scan angle changing like a sawtooth-wave) is accomplished.

Example 2

An optical deflecting device according to Example 2 of this embodiment will be described. The block diagram of the optical deflecting device of this example is similar to that shown in FIG. 2A, and the structure is similar to that shown in FIG. 4.

The deflection angle θ of the optical deflecting device of this example can be expressed as follows. Now, the amplitude and angular frequency of the first oscillation motion are denoted by $A_1$ and $\omega_1$, the amplitude and angular frequency of the second oscillation motion are denoted by $A_2$ and $\omega_2$, and the phases of the two frequencies are denoted by $\phi_1$ and $\phi_2$. If the time with respect to the origin or reference time being taken at an arbitrary time within one cycle of the first oscillation motion is denoted by t, then the deflection angle θ can be expressed by Equation (3-1) mentioned hereinbefore, that is:

$$\theta(t)=A_1\sin(\omega_1 t+\phi_1)+A_2\sin(\omega_2 t+\phi_2)$$

Figure 7A:
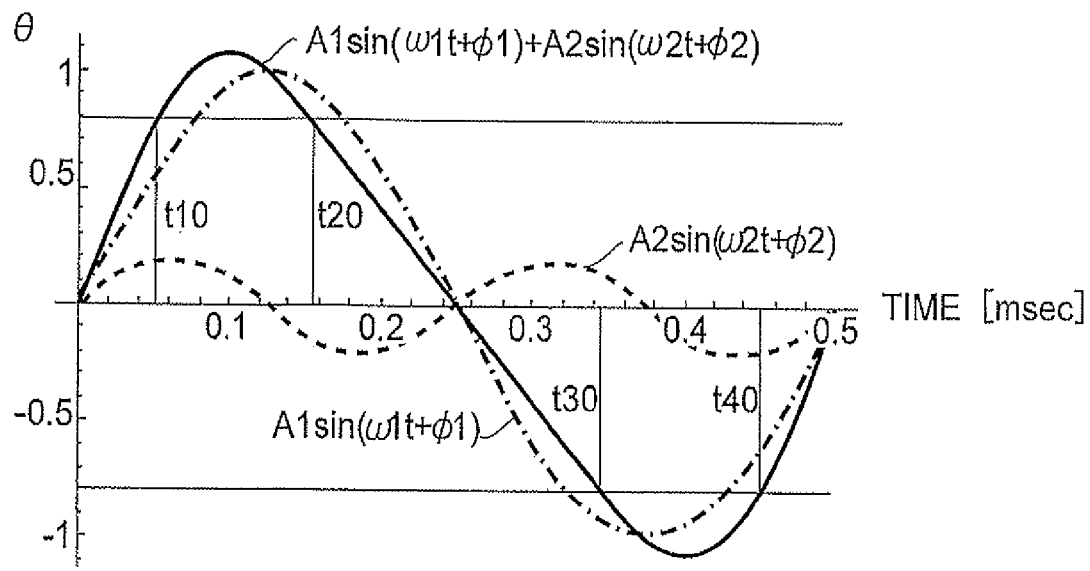
FIG. 7A is a graph showing a change in the deflection angle of the optical deflecting device of FIG. 1 with respect to time.
Figure 7B:
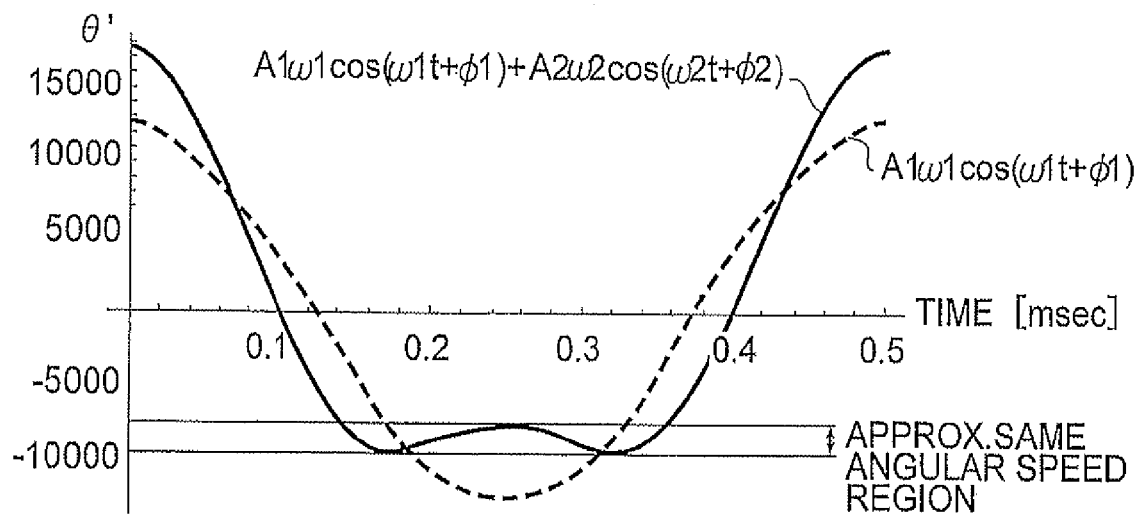
FIG. 7B is a graph showing a change in the angular speed with respect to time.

Here, if $A_1=1$, $A_2=0.2$, $\phi_1=0$, $\phi_2=0$, $\omega_1=2\pi\times 2000$ and $\omega_2=2\pi\times 4000$, the changes in deflection angle θ and angular speed θ', with respect to time, of the optical deflecting device of this example are such as shown in FIGS. 7A and 7B. The deflection angle θ shown at a solid line in FIG. 7A is more alike a sawtooth wave than the sinusoidal wave (broken line) is. The angular speed θ' shown at a solid line in FIG. 7B less changes in an approximately constant angular speed region, as compared with the sinusoidal wave (broken line). In FIGS. 7A and 7B, the unit of the axis of ordinate is arbitrary.

Although this example uses a condition $A_1=1$, $A_2=0.2$, $\phi_1=0$, $\phi_2=0$, $\omega_1=2\pi\times 2000$ and $\omega_2=2\pi\times 4000$, desired values may be chosen for $A_1$, $A_2$, $\phi_1$, $\phi_2$, $\omega_1$ and $\omega_2$ as long as the amount of change in angular speed θ' can be made smaller in the approximately constant angular speed region as compared with sinusoidal waves. Preferably, in a continuous time period not less than 20% of one cycle of the first frequency, the largest value θ'max and smallest value θ'min of the angular speed θ' of the reflection mirror satisfy the following relationship.

$$(\theta'\text{max}-\theta'\text{min})/(\theta'\text{max}+\theta'\text{min})<0.1$$

This is general condition required for the optical deflecting device, and it applies to other examples to be described below.

If the first and second light receiving elements 141 and 142 are disposed at symmetrical positions with respect to the center of scan of the optical deflecting device, corresponding to 80% $A_1$ position, namely, at a position where the deflection angle θ becomes equal to 0.8 (taking the largest deflection angle as 1), the result is as follows. Namely, desired target time moments $t_{10}$, $t_{20}$, $t_{30}$ and $t_{40}$ (see FIG. 7A) whereat the scanning light 133 should pass across the first and second light receiving elements 141 and 142 are 0.052 msec, 0.154 msec, 0.346 msec and 0.448 msec, respectively. These target time moments may be determined beforehand and stored. This is also the case with the other examples to be described below. Hence, the control system 150 adjusts the driving signal (FIG. 6A or 6B) so that the time moments $t_1$, $t_2$, $t_3$ and $t_4$ for passage of the scanning light across the first and second light receiving elements 141 and 142 should take the desired values mentioned above. By this, the deflection angle θ shown in FIG. 7 is accomplished.

Although in this example the first and second light receiving elements 141 and 142 are disposed at symmetrical positions with respect to the scan center of the optical deflecting device where the deflection angle θ=0.8, these may be disposed at any other positions providing arbitrary deflection angle θ. Preferably, to avoid optical interference in the approximately constant speed region, the first and second light receiving elements may be disposed within a range of not less than 0.6 to less than 1.0 in terms of the absolute value of deflection angle θ. Here, the range of absolute value of θ from not less than 0.6 to less than 1.0 means a range in which the deflection angle θ is less than +1.0 and not less than 0.6, as well as a range in which θ is not greater than −0.6 and greater than −1.0.

The center of deflection of the reflection mirror is at zero, and a desired largest deflection angle is ±1. This is also the case with the other examples.

Figure 8:
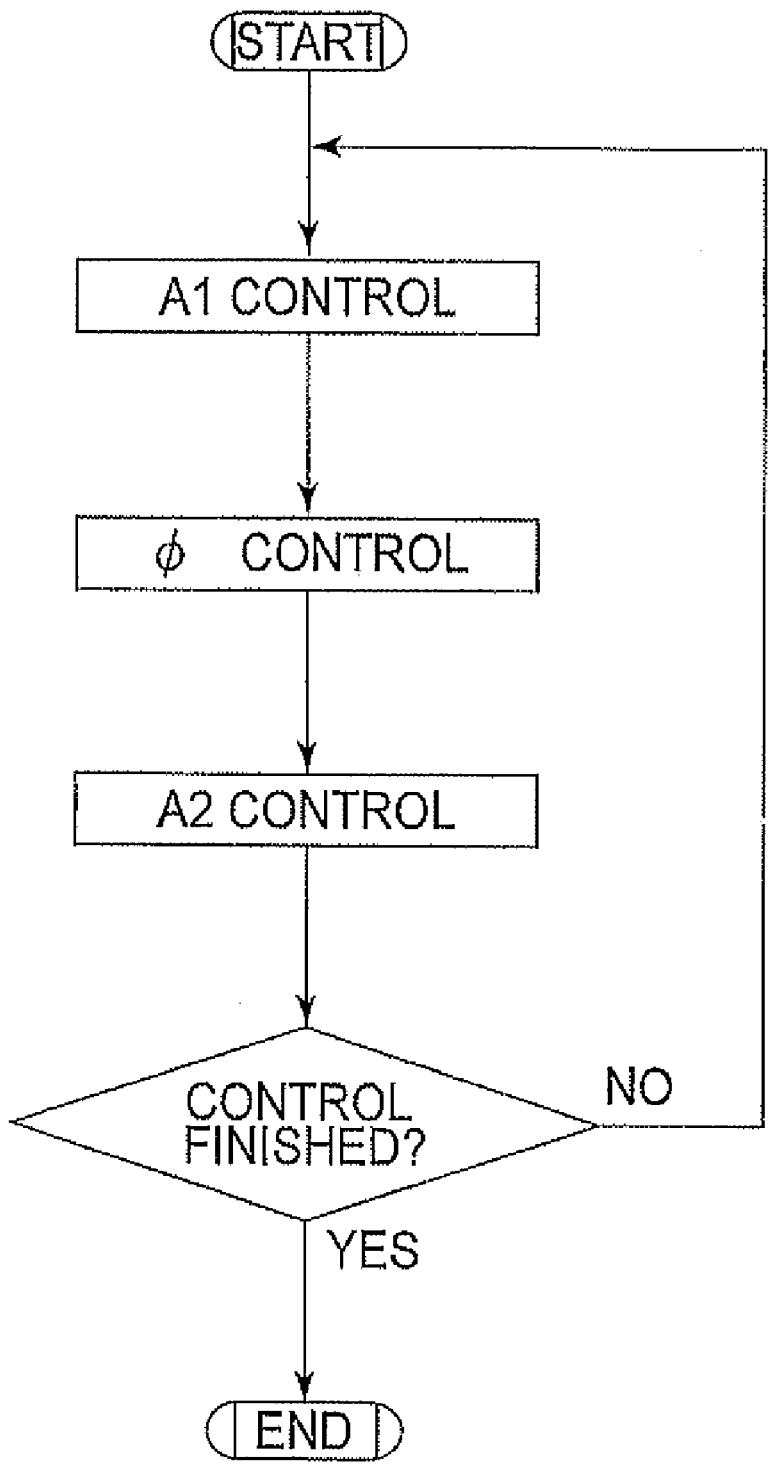
FIG. 8 is a flow chart for explaining the control sequence in an optical deflecting device according to Example 2, etc. of the present invention.

Next, details of the method of controlling the deflection angle in this example will be explained. FIG. 8 illustrates the control sequence.

<$A_1$ Control>

First, $A_1$ is controlled. In order to perform the optical scan only in accordance with the first oscillation motion moving with a fundamental frequency, the frequency of the arbitrary-wave producing circuit 351 is set to an angular frequency of 2000 Hz, while the frequency of the arbitrary-wave producing circuit 352 is set to an arbitrary angular frequency other than 2000 Hz and 4000 Hz and containing zero. This results in that the second oscillation motion produces no resonance oscillation. Here, the deflection angle θ of the optical deflecting device can be expressed as follows.

$$\theta(t) = A_1 \sin(\omega_1 t) \tag{16}$$

Then, the time moments $t_1$, $t_2$, $t_3$ and $t_4$ are set as follows.

$$\theta(t_1) = \theta(t_2) = \theta_{BD1} \tag{17}$$

$$\theta(t_3) = \theta(t_4) = \theta_{BD2} \tag{18}$$

Then the amplitude of the arbitrary-wave producing circuit 351 is adjusted so that the value of at least one of $t_2 - t_1$ and $t_4 - t_3$ becomes equal to 0.102 msec (this value can be determined beforehand on the basis of changes in desired deflection angle θ shown in FIG. 7). By this, $A_1$ can be made equal to a desired value $A_1$. Since the number of unknown value to be determined is 1, $A_1$ can be determined with this procedure.

The procedure described above is the procedure for determining the amplitude of the first oscillation motion of the reflection mirror on the oscillator. This procedure is carried out when the second oscillation motion is stopped and the optical scan is being carried out only by the first oscillation motion, so as to perform the following adjustment while taking a certain time within one cycle of the first frequency as zero or a reference. Namely, the amplitude of the first oscillation motion is adjusted so that the time moments of at least one of (i) a set of two different time moments whereat the scanning light passes across the first light receiving element and (ii) a set of two different time moments whereat the scanning light passes across the second light receiving element, can be made coincident with desired target time moments.

After this, the frequency of the arbitrary-wave producing circuit 352 is turned back to 4000 Hz. Here, in this example, for optical scan only with the first oscillation motion moving at the fundamental frequency, the frequency of the arbitrary-wave producing circuit 352 is set to an arbitrary frequency other than 2000 Hz or 4000 Hz and containing zero. That is, in order to stop the second oscillation motion, the periodic driving force of the second frequency, among the driving force to be transmitted to the oscillating system from the driving system, is interrupted and, furthermore, a periodic driving force of a third frequency other than the first and second frequencies is added. However, in this procedure, the amplitude $A_2$ of the arbitrary-wave producing circuit 352 may be made equal to zero.

<ø Control>

Subsequently, the phase difference ø of the first and second oscillation motions is adjusted to zero. Here, both of the following relations should be satisfied.

$$t_2 - t_1 = t_4 - t_3 \tag{19}$$

$$t_3 - t_2 > t_{30} - t_{20} \tag{20}$$

Equation (19) is required because the first and second light receiving elements 141 and 142 are disposed at positions which are symmetrical with respect to the center of scan of the optical deflecting device. By adjusting the phase difference of the arbitrary-wave producing circuits 351 and 352 so as to satisfy this relation, the phase difference of the first and second oscillation motions is made equal to zero. In this case as well, since the number of unknown value to be determined is 1, ø can be determined with this procedure. Equation (20) is the condition for avoiding reverse of the phase of the oscillation motion.

The procedure described above is the procedure for determining the relative phase difference between the first and second oscillation motions of the reflection mirror. Here, the phase of at least one of the first and second oscillation motions is adjusted so that (i) the difference between two different time moments whereat the scan light passes across the first light receiving element and (ii) the difference between two different time moments whereat the scan light passes across the second light receiving element, become equal to each other.

<$A_2$ Control>

Subsequently, A2 is controlled. Now, the time moment whereat the scanning light 133 passes across the first and second light receiving elements 141 and 142 is denoted by $t_1$, $t_2$, $t_3$ and $t_4$. Then, the amplitude of the arbitrary-wave producing circuit 352 is adjusted so that at least one of them satisfies the relation $t_1 = 0.052$ msec, $t_2 = 0.154$ msec, $t_3 = 0.346$ msec or $t_4 = 0.448$ msec. By this, $A_2$ can be made equal to a desired value $A_2$. In this case as well, since the number of unknown value to be determined is 1, $A_2$ can be determined with this procedure.

The procedure described above is the procedure for determining the amplitude of the second oscillation motion of the reflection mirror, and it is the procedure for adjusting the amplitude of the second oscillation motion so that at least one of the time moments whereat the scanning light passes across the first and second light receiving elements is made equal to a desired value.

<Checking Completion of Control>

If $t_1$, $t_2$, $t_3$ and $t_4$ are in a predetermined tolerable range, the control is terminated. If not so, the sequence goes back to the $A_1$ control, and the above-described control procedure is carried out-again.

With the operations described above, a desired deflection angle θ of the optical deflecting device is accomplished. Although in this example $t_1$, $t_2$, $t_3$, $t_4$, $t_{10}$, $t_{20}$, $t_{30}$ and $t_{40}$ are considered as the time moment, these may be counts (numbers) measured with reference to a certain clock. Furthermore, although in this example $t_1$, $t_2$, $t_3$, $t_4$, $t_{10}$, $t_{20}$, $t_{30}$ and $t_{40}$ are considered as determined values, these may be values having certain error range. This is also the case with the other examples.

Example 3

An optical deflecting device according to Example 3 of this embodiment will be described. The block diagram of the optical deflecting device of this example is similar to that shown in FIG. 2A, and the structure is similar to that shown in FIG. 4.

In this example as well, the amplitude and angular frequency of the first oscillation motion are denoted by $A_1$ and $\omega_1$, and the amplitude and angular frequency of the second oscillation motion are denoted by $A_2$ and $\omega_2$, and the phases of the two frequencies are denoted by $\phi_1$ and $\phi_2$. If the time with respect to the origin (0) determined by taking an arbitrary reference time within one cycle of the first oscillation motion is denoted by t, the deflection angle θ of the optical deflecting device of this example can be expressed by Equation (3-1) mentioned hereinbefore, that is:

$$\theta(t)=A_1 \sin(\omega_1 t+\phi_1)+A_2 \sin(\omega_2 t+\phi_2)$$

Here, if $A_1=1$, $A_2=0.2$, $\phi_1=0$, $\phi_2=0$, $\omega_1=2\pi\times2000$ and $\omega_2=2\pi\times4000$, the deflection angle θ of the optical deflecting device of this example is such as shown in FIGS. 7A and 7B.

Although this example uses a condition $A_1=1$, $A_2=0.2$, $\phi_1=0$, $\phi_2=0$, $\omega_1=2\pi\times2000$ and $\omega_2=2\pi\times4000$, desired values may be chosen for $A_1$, $A_2$, $\phi_1$, $\phi_2$, $\omega_1$ and $\omega_2$ as long as the amount of change in angular speed θ' can be made smaller in the approximately constant angular speed region as compared with sinusoidal waves.

If the first and second light receiving elements 141 and 142 are disposed at symmetrical positions with respect to the center of scan of the optical deflecting device, corresponding to 80% $A_1$ position, namely, at a position where the deflection angle θ becomes equal to 0.8, and also if the time whereat the deflection angle θ is equal to zero (scan center) is denoted by 0, the result is as follows. Namely, desired target time moments $t_{10}$, $t_{20}$, $t_{30}$ and $t_{40}$ whereat the scanning light 133 should pass across the first and second light receiving elements 141 and 142 are 0.052 msec, 0.154 msec, 0.346 msec and 0.448 msec, respectively. Hence, the control system adjusts the driving signal so that the measured four time moments $t_1$, $t_2$, $t_3$ and $t_4$ for passage of the scanning light 133 across the first and second light receiving elements 141 and 142 should take the desired values mentioned above. By this, the deflection angle θ of the optical deflecting device shown in FIG. 7 is accomplished.

Although in this example the first and second light receiving elements 141 and 142 are disposed at symmetrical positions with respect to the scan center of the optical deflecting device where the deflection angle θ=0.8, any other arbitrary deflection angle θ may be used. Furthermore, although in this example the time whereat the deflection angle θ is zero is taken as zero, an arbitrary time within one period of the angular frequency of the first oscillation motion may be used as the origin (0).

The control method in this example will now be explained in detail.

Coefficients and matrix M thereof representing changes in detection time moments $t_1$, $t_2$, $t_3$ and $t_4$ whereat the scanning light 133 passes across the first and second light receiving elements 141 and 142, caused when the control parameters X including any of $A_1$, $A_2$, $\phi_1$ and $\phi_2$ of the optical deflecting device shift minutely from respective target values, are detected beforehand. These can be expressed as follows.

$$\left.\frac{\partial t}{\partial X}\right|_{t1}, (X = A1, \phi1, A2, \phi2), (i = 1, 2, 3, 4) \tag{21}$$

$$M = \begin{bmatrix} \left.\frac{\partial t}{\partial A1}\right|_{t1} & \left.\frac{\partial t}{\partial A2}\right|_{t1} & \left.\frac{\partial t}{\partial \phi1}\right|_{t1} & \left.\frac{\partial t}{\partial \phi2}\right|_{t1} \\ \left.\frac{\partial t}{\partial A1}\right|_{t2} & \left.\frac{\partial t}{\partial A2}\right|_{t2} & \left.\frac{\partial t}{\partial \phi1}\right|_{t2} & \left.\frac{\partial t}{\partial \phi2}\right|_{t2} \\ \left.\frac{\partial t}{\partial A1}\right|_{t3} & \left.\frac{\partial t}{\partial A2}\right|_{t3} & \left.\frac{\partial t}{\partial \phi1}\right|_{t3} & \left.\frac{\partial t}{\partial \phi2}\right|_{t3} \\ \left.\frac{\partial t}{\partial A1}\right|_{t4} & \left.\frac{\partial t}{\partial A2}\right|_{t4} & \left.\frac{\partial t}{\partial \phi1}\right|_{t4} & \left.\frac{\partial t}{\partial \phi2}\right|_{t4} \end{bmatrix} \tag{22}$$

Thus, the control amounts $\Delta A_1$, $\Delta A_2$, $\Delta\phi_1$ and $\Delta\phi_2$ for the amplitude and phase of the reflection mirror can be determined on the basis of time differences $\Delta t_1$, $\Delta t_2$, $\Delta t_3$ and $\Delta t_4$ between the four detection time moments $t_1$, $t_2$, $t_3$ and $t_4$ and the four target time moments $t_{10}$, $t_{20}$, $t_{30}$ and $t_{40}$, and in accordance with the following equation.

$$\begin{bmatrix} \Delta A1 \\ \Delta A2 \\ \Delta\phi1 \\ \Delta\phi2 \end{bmatrix} = M^{-1} \begin{bmatrix} \Delta t1 \\ \Delta t2 \\ \Delta t3 \\ \Delta t4 \end{bmatrix} \tag{23}$$

Based on this equation, the control amounts $\Delta A_1$, $\Delta A_2$, $\Delta\phi_1$ and $\Delta\phi_2$ can be calculated from the time difference $\Delta t_1$, $\Delta t_2$, $\Delta t_3$ and $\Delta t_4$ with respect to the target time moments $t_{10}$, $t_{20}$, $t_{30}$ and $t_{40}$. Then, the outputs of the arbitrary-wave producing circuits 351 and 352 are changed. By repeating the above-described control procedure, the detection time moment is converged to the target time moments $t_{10}$, $t_{20}$, $t_{30}$ and $t_{40}$, whereby a desired deflection angle θ of the optical deflecting device is accomplished.

Figure 9:
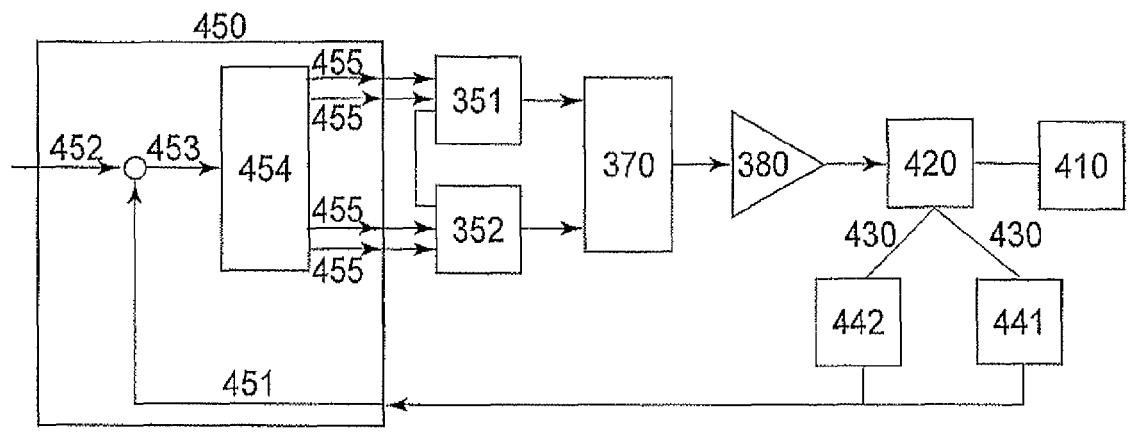
FIG. 9 is a block diagram for explaining a control method for an optical deflecting device according to Example 3, etc. of the present invention.

FIG. 9 is a block diagram for the above-described procedure. Light from a light source 410 is deflected by an optical deflecting device (reflection mirror) 420, and the deflected light 430 passes across first and second light receiving elements 441 and 442. Control unit 450 subtracts detection time moments 451 detected at the first and second light receiving elements 441 and 442 from target time moment 452, to calculate time difference 453. Then, by computing the matrix in accordance with Equation (23) based on the time difference 453, in a computing circuit 454, the control amount 455 is calculated. Then, by using arbitrary-wave producing circuits 351 and 352, an adder 370 and an amplifier 380, a signal to be inputted to the driving system of the optical deflecting device 420 is produced. In this example as well, a driving signal based on combining sinusoidal waves, such as shown in FIG. 6A, may be produced or, alternatively, a pulse-like driving signal such as shown in FIG. 6B may be produced. Any driving signal may be used as long as it ensures that the detection time moment to be detected by the light receiving element coincides with the target time moment.

The displacement angle transmission characteristic of the oscillator shown in FIG. 5 is changeable with a change in environment such as environmental temperature, or a change in oscillation characteristic of the oscillator with respect to time. Hence, the control system 150 performs control to renew the driving waveform every oscillation period of $\omega_1$ in the optical deflector, so that a desired deflection angle $\theta$ of the optical deflecting device is assured. Although in this example the driving waveform is renewed every oscillation frequency period of $\omega_1$, the waveform may be controlled at shorter period, for example, at the moment as a signal is inputted to the light receiving element. Alternatively, it may be controlled at a period longer than the oscillation period of $\omega_1$ of the optical deflecting device.

Example 4

An optical deflecting device according to Example 4 of the present invention will be described. The block diagram of the optical deflecting device of this example is similar to that shown in FIG. 2A, and the structure is similar to that shown in FIG. 4.

With regard to the deflection angle $\theta$ of the optical deflecting device of this example, now, the amplitude and angular frequency of the first oscillation motion are denoted by $A_1$ and $\omega_1$, the amplitude and angular frequency of the second oscillation motion are denoted by $A_2$ and $\omega_2$, the phase difference between the two frequencies is denoted by $\emptyset$, and time is denoted by t. Then, the deflection angle $\theta$ can be expressed by Equation (3-2) or Equation (3-3) mentioned hereinbefore. Here, $\emptyset$ should read $\emptyset_1 - \emptyset_2$ or $\emptyset_2 - \emptyset_1$ in these equations.

Now, it is assumed that $A_1=1$, $A_2=0.2$, $\emptyset=0$, $\omega_1=2\pi \times 2000$ and $\omega_2=2\pi \times 4000$. Although this example uses a condition $A_1=1$, $A_2=0.2$, $\emptyset=0$ ($\emptyset_1=0$, $\emptyset_2=0$), $\omega_1=2\pi \times 2000$ and $\omega_2=2\pi \times 4000$, desired values may be chosen for $A_1$, $A_2$, $\emptyset_1$, $\emptyset_2$, $\omega_1$ and $\omega_2$ as long as the amount of change in angular speed $\theta'$ can be made smaller in the approximately constant angular speed region as compared with sinusoidal waves. Here, the first and second light receiving elements 141 and 142 are disposed at positions corresponding to 80% $A_1$, namely, at positions where the deflection angle $\theta$ becomes equal to 0.8. Also, among the target time moments $t_{10}$, $t_{20}$, $t_{30}$ and $t_{40}$ whereat the scanning light 133 passes across the first and second light receiving elements 141 and 142, $t_{10}$ is chosen as the reference time. Then, relative target time $t_{20}-t_{10}$, $t_{30}-t_{10}$, $t_{40}-t_{10}$ from the reference time become equal to 0.102 msec, 0.294 msec and 0.396 msec, respectively. Hence, the deflection angle $\theta$ of the optical deflecting device of this example is such as shown in FIG. 7. Therefore, by adjusting the driving signal through the control system so that three relative detection times $t_2-t_1$, $t_3-t_1$ and $t_4-t_1$ for the passage of scanning light 133 across the first and second light receiving elements 141 and 142 take the aforementioned values, the deflection angle $\theta$ of the optical deflecting device as shown in FIG. 7 is accomplished. Here, $\emptyset_1$ and $\emptyset_2$ can be expressed by equations $\emptyset=\emptyset_1-\emptyset_2$ and $\emptyset=\emptyset_2-\emptyset_1$ and, therefore, Equation (3-1) in FIG. 7 can be rewritten as Equation (3-2) or Equation (3-3) mentioned above.

Although in this example the first and second light receiving elements 141 and 142 are disposed at symmetrical positions with respect to the scan center of the optical deflecting device where the deflection angle $\theta=0.8$, these may be disposed at any other positions corresponding to arbitrary deflection angle $\theta$.

The control method in this example will now be explained in detail. Coefficients and matrix M thereof representing changes in relative detection time $t_2-t_1$, $t_3-t_1$ and $t_4-t_1$ whereat the scanning light 133 passes across the first and second light receiving elements 141 and 142, caused when the control parameters X including any of $A_1$, $A_2$ and $\emptyset$ of the optical deflecting device shift minutely from respective target values, may be detected beforehand. These can be expressed as follows.

$$\left.\frac{\partial t}{\partial X}\right|_{ti} - \left.\frac{\partial t}{\partial X}\right|_{t1}, (X = A1, A2, \phi), (i = 2, 3, 4) \quad (24)$$

$$M = \begin{bmatrix} \left.\frac{\partial t}{\partial A1}\right|_{t2} - \left.\frac{\partial t}{\partial A1}\right|_{t1} & \left.\frac{\partial t}{\partial A2}\right|_{t2} - \left.\frac{\partial t}{\partial A2}\right|_{t1} & \left.\frac{\partial t}{\partial \phi}\right|_{t2} - \left.\frac{\partial t}{\partial \phi}\right|_{t1} \\ \left.\frac{\partial t}{\partial A1}\right|_{t3} - \left.\frac{\partial t}{\partial A1}\right|_{t1} & \left.\frac{\partial t}{\partial A2}\right|_{t3} - \left.\frac{\partial t}{\partial A2}\right|_{t1} & \left.\frac{\partial t}{\partial \phi}\right|_{t3} - \left.\frac{\partial t}{\partial \phi}\right|_{t1} \\ \left.\frac{\partial t}{\partial A1}\right|_{t4} - \left.\frac{\partial t}{\partial A1}\right|_{t1} & \left.\frac{\partial t}{\partial A2}\right|_{t4} - \left.\frac{\partial t}{\partial A2}\right|_{t1} & \left.\frac{\partial t}{\partial \phi}\right|_{t4} - \left.\frac{\partial t}{\partial \phi}\right|_{t1} \end{bmatrix} \quad (25)$$

Thus, the control amounts $\Delta A_1$, $\Delta A_2$ and $\Delta \emptyset$ for the amplitude and phase of the reflection mirror can be determined on the basis of time differences $\Delta t_2$, $\Delta t_3$ and $\Delta t_4$ between three relative detection times $t_2-t_1$, $t_3-t_1$ and $t_4-t_1$ as well as three target times $t_{20}-t_{10}$, $t_{30}-t_{10}$ and $t_{40}-t_{10}$, and in accordance with the following equation.

$$\begin{bmatrix} \Delta A1 \\ \Delta A2 \\ \Delta \phi \end{bmatrix} = M^{-1} \begin{bmatrix} \Delta t2 \\ \Delta t3 \\ \Delta t4 \end{bmatrix} \quad (26)$$

Based on this equation, the control amounts $\Delta A_1$, $\Delta A_2$ and $\Delta \emptyset$ can be calculated from the time differences $\Delta t_2$, $\Delta t_3$ and $\Delta t_4$ with respect to the target times $t_{20}-t_{10}$, $t_{30}-t_{10}$ and $t_{40}-t_{10}$. Then, the outputs of the arbitrary-wave producing circuits 351 and 352 are adjusted on the basis of these amounts. By repeating the above-described control procedure, the detection time moment is converged to the target time moments $t_{10}$, $t_{20}$, $t_{30}$ and $t_{40}$, whereby a desired deflection angle $\theta$ of the optical deflecting device is accomplished.

The procedure described above will be explained with reference to the block diagram of FIG. 9. Light from a light source 410 is deflected by an optical deflecting device (reflection mirror) 420, and the deflected light 430 passes across first and second light receiving elements 441 and 442. Control unit 450 subtracts detection time moments 451 detected at the first and second light receiving elements 441 and 442 from target time moments 452, to calculate the time difference 453. Then, by computing the matrix in accordance with Equation (26) based on the time difference 453, in a computing circuit 454, the control amount 455 is calculated. Then, by using arbitrary-wave producing circuits 351 and 352, an adder 370 and an amplifier 380, a signal to be inputted to the driving system of the optical deflecting device 420 is produced. In this example, since $t_{10}$ is used as the reference time, the control amount 455 for the arbitrary-wave producing circuit 351 is single (not dual) or, alternatively, the control amount 455 for the arbitrary-wave producing circuit 352 is single (not dual). This means that the difference $\emptyset$ of phase between the two frequencies can be adjusted either by the arbitrary-wave producing circuit 351 or the arbitrary-wave producing circuit 352.

In this example as well, a driving signal based on combining sinusoidal waves, such as shown in FIG. 6A, may be produced or, alternatively, a pulse-like driving signal such as shown in FIG. 6B may be produced. Any driving signal may be used as long as it ensures that the detection time moment to be detected by the light receiving element coincides with the target time moment.

Through the control procedure described above, a desired deflection angle θ of the optical deflecting device is accomplished. Although in this example as well, $t_{20}-t_{10}$, $t_{30}-t_{10}$ and $t_{40}-t_{10}$ are considered as determined values, these may be values having certain error range.

Example 5

An optical deflecting device according to Example 5 of the present invention will be described. The block diagram of the optical deflecting device of this example is similar to that shown in FIG. 2A, and the structure is similar to that shown in FIG. 4.

With regard to the deflection angle θ of the optical deflecting device of this example, now, the amplitude and angular frequency of the first oscillation motion are denoted by $A_1$ and $\omega_1$, the amplitude and angular frequency of the second oscillation motion are denoted by $A_2$ and $\omega_2$, the phase difference between the two frequencies is denoted by ø, and time is denoted by t. Then, the deflection angle θ can be expressed by Equation (3-2) or Equation (3-3) mentioned hereinbefore. Here, ø should read $ø_1-ø_2$ or $ø_2-ø_1$ in these equations.

Now, it is assumed that $A_1=1$, $A_2=0.2$, $ø=0$, $\omega_1=2\pi\times2000$ and $\omega_2=2\pi\times4000$. Although this example uses a condition $A_1=1$, $A_2=0.2$, $ø=0$ ($ø_1=0$, $ø_2=0$), $\omega_1=2\pi\times2000$ and $\omega_2=2\pi\times4000$, desired values may be chosen for $A_1$, $A_2$, $ø_1$, $ø_2$, $\omega_1$ and $\omega_2$ as long as the amount of change in angular speed θ' can be made smaller in the approximately constant angular speed region as compared with sinusoidal waves. Furthermore, although in this example as well the first and second light receiving elements 141 and 142 are disposed at symmetrical positions $θ_1$ and $θ_2$ with respect to the scan center of the optical deflecting device, these may be disposed at any other positions providing arbitrary deflection angle θ.

Figure 10:
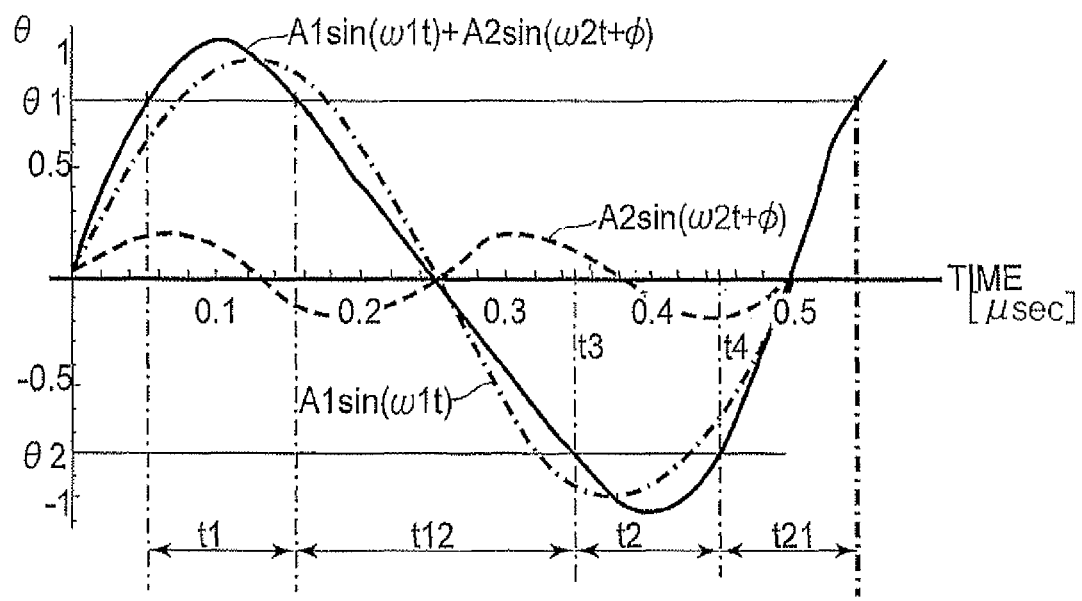
FIG. 10 is a graph showing a change in the deflection angle of an optical deflecting device according to Example 5 or 6 of the present invention, with respect to time.

The control method in this example will be described in detail. FIG. 10 illustrates the relationship between the time and deflection angle in the optical deflecting device (a case based on Equation (3-2)). As seen in FIG. 10, the time from the moment whereat the deflection angle of the optical deflecting device reaches $θ_1$ to the moment whereat, after turning back at the end of oscillation, it reaches $θ_1$ again, is denoted by $t_1$. Also, the time from the moment whereat the deflection angle reaches $θ_1$ to the moment whereat, after passing the center of oscillation, it reaches $θ_2$, is denoted by $t_{12}$. Furthermore, the time from the moment whereat the deflection angle reaches $θ_2$ to the moment whereat, after turning back at the end of oscillation, it reaches $θ_2$ again, is denoted by $t_2$. Also, the time from the moment whereat the deflection angle reaches $θ_2$ to the moment whereat, after passing the center of oscillation, it reaches $θ_1$, is denoted by $t_{21}$.

The drive control system 150 calculates error quantities related to the amplitude $A_1$ of the frequency $\omega_1$, amplitude $A_2$ of the frequency $\omega_2$, and phase difference ø between the frequencies $\omega_1$ and $\omega_2$, and based on these error quantities, it, produces a driving signal for the optical deflecting device.

The manner of calculating these error signals will be explained below.

First, calculation of ø error signal will be described.

It is now assumed that, in the equation shown in FIG. 10, that is, Equation (3-2), $A_1 \sin(\omega_1 t)$ is taken as a first component, and $A_2 \sin(\omega_2 t+ø)$ is taken as a second component. If the phase of the first and second components changes and it causes a decrease of $t_1$, then $t_2$ increases as a result of it. To the contrary, if the phase change causes an increase of $t_1$, then $t_2$ decreases as a result of it. In other words, $t_1$ and $t_2$ are changeable inversely in response to a change in phase of the first and second components.

On the other hand, if the amplitude $A_1$ of the first component changes and such change causes an increase of $t_1$, then $t_2$ increases as a result of it. On the other hand, if the amplitude change causes a decrease of $t_1$, then $t_2$ decreases as a result of it. Namely, $t_1$ and $t_2$ are changeable in the same way in response to a change in amplitude $A_1$ of the first component.

Hence, by subtracting $t_1$ and $t_2$, a change in amplitude $A_1$ of the first component can be cancelled and, thus, only the phase shift amount of the first and second components can be extracted.

Here, if the $θ_1$ and $θ_2$ are disposed at symmetrical positions with respect to the scan center of the optical deflecting device, the phase change amount of the first and second components can be extracted only by performing calculation of $t_1-t_2$. Furthermore, if $θ_1$ and $θ_2$ are not disposed symmetrically, a good signal is obtainable by adjusting the subtraction ratio of $t_1$ and $t_2$.

It is seen from the above that, if $ø_0$ is taken as a control target value, the error signal for ø that represents the error amount of ø component can be determined in accordance with the following equation.

$$ø \text{ error signal}=t_1-\delta \times t_2-ø_0 \ (\delta \geq 0) \qquad (27\text{-}1)$$

Next, calculation of an error signal for the amplitude $A_1$ of the first component will be described.

If the amplitude $A_1$ of the first component changes and it causes an increase of $t_{12}$, then $t_{21}$ increases as a result of it. If on the other hand $t_{12}$ decreases, it causes a decrease of $t_{21}$. Namely, in response to a change in amplitude $A_1$ of the first component, $t_{12}$ and $t_{21}$ changes in the same way.

On the other hand, if the amplitude $A_2$ of the second component changes and it causes an increase of $t_{12}$, then $t_{21}$ decreases as a result of it. If $t_{12}$ decreases to the contrary, $t_{21}$ increase as a result of it. Namely, in response to a change in the amplitude $A_2$ of the second component, $t_{12}$ and $t_{21}$ are changeable inversely.

Hence, by adding $t_{12}$ and $t_{21}$ at an appropriate ratio, a change in the amplitude $A_2$ of the second component can be cancelled.

Similarly, since $t_1$ and $t_{12}$ and $t_2$ and $t_{21}$ are in inversely changing relation with each other in response to a change in amplitude $A_1$ of the first component, by subtracting $t_1$ and $t_{12}$, and $t_2$ and $t_{21}$, the change of the amplitude $A_1$ of the first component can be cancelled and the error signal can be enlarged.

It is seen from the above that, if $A_{10}$ is taken as a control target value, the error signal for $A_1$ that represents the error amount of $A_1$ component can be determined in accordance with the following equation.

$$A_1 \text{ error signal}=t_1+\delta \times t_2-\alpha \times (t_{12}+\beta \times t_{21})-A_{10} \ (\alpha,\beta,\delta \geq 0) \qquad (27\text{-}2)$$

Next, calculation of an error signal for the amplitude $A_2$ of the second component will be described.

The error signal for amplitude $A_2$ of the second component can be calculated in accordance with a similar principle as the calculation of the error signal for the amplitude $A_1$ of the first component.

As described hereinbefore, in response to a change in amplitude $A_1$ of the first component, $t_{12}$ and $t_{21}$ are changeable in the same way. On the other hand, with a change in amplitude $A_2$ of the second component, $t_{12}$ and $t_{21}$ are changeable inversely. Therefore, by subtracting $t_{12}$ and $t_{21}$ at an appropriate ratio, the change of the amplitude $A_1$ of the first component can be cancelled.

It is seen from the above that, if $A_{20}$ is taken as a control target value, the error signal for $A_2$ that represents the error amount of $A_2$ component can be determined in accordance with the following equation.

$$A_2 \text{ error signal} = t_{12} - \gamma \times t_{21} - A_{20} \ (\gamma \geq 0) \tag{27-3}$$

Figure 11:
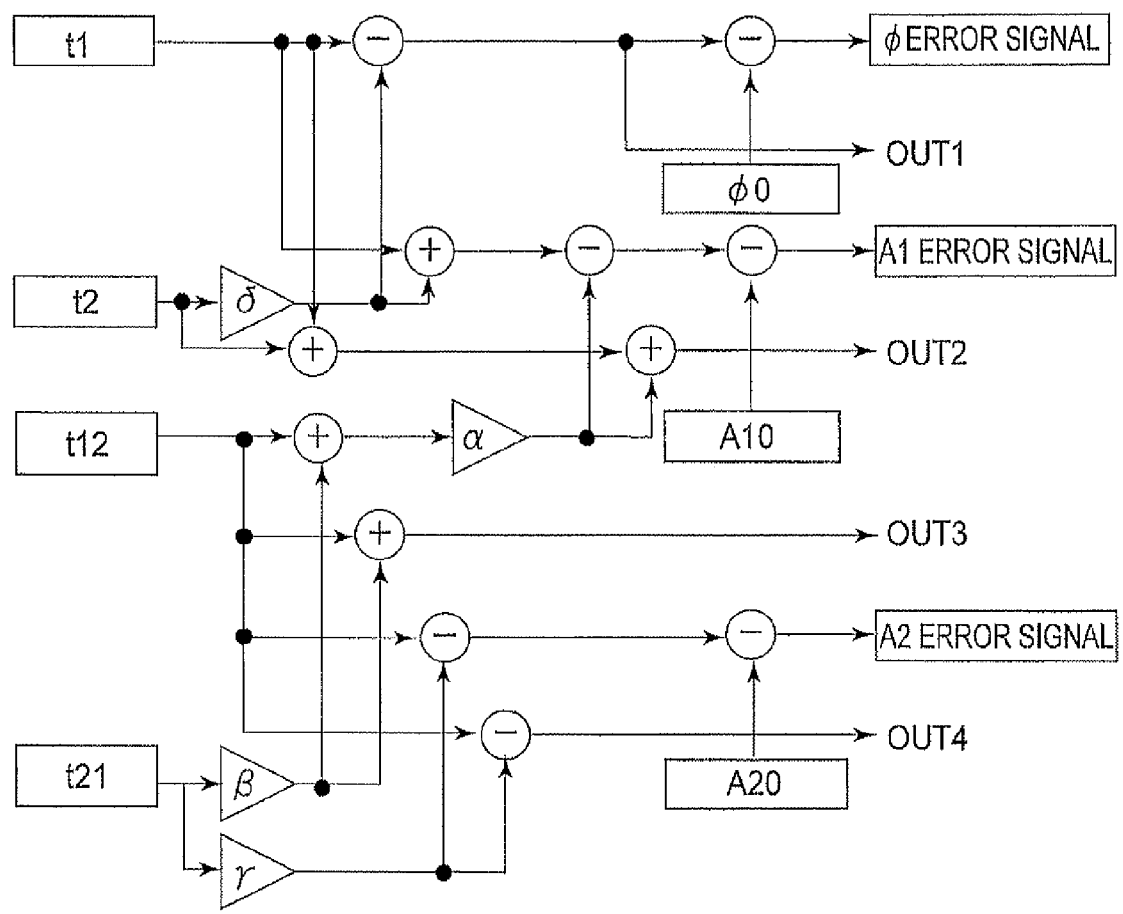
FIG. 11 is a block diagram of an error detecting circuit according to Example 5 of the present invention.

FIG. 11 shows an error detecting circuit for calculating these error signals in accordance with the equations mentioned above. This error detecting circuit is arranged to perform various computation to input signals $t_1$, $t_2$, $t_{12}$, $t_{21}$ as well as control objectives $ø_0$, $A_{10}$ and $A_{20}$ by using an adder and subtractor, thereby to calculate the ø error signal, $A_1$ error signal and $A_2$ error signal. For adjustment of the adding ratio and the subtraction ratio in terms of time, the time may be multiplied by $\alpha$, $\beta$, $\gamma$ or $\delta$, if necessary.

The values of $\alpha$, $\beta$, $\gamma$ and $\delta$ can be adjusted as follows.

As regards $\delta$, disturbance is inputted into the amplitude $A_1$ of the first component, and $\delta$ is adjusted so that the change of "Out1" (e.g. $t_1 - \delta \times t_2$) becomes smallest. As regards $\beta$, disturbance is inputted into the amplitude $A_2$ of the second component, and $\beta$ is adjusted so that the change of "Out3" (e.g. $t_{12} + \beta \times t_{21}$) becomes smallest. As regards $\alpha$, disturbance is inputted into the amplitude $A_1$ of the first component, and $\alpha$ is adjusted so that the change of "Out2" (e.g. $t_1 + t_2 + \alpha \times (t_{12} + \beta \times t_{21})$) becomes smallest. As regards $\gamma$, disturbance is inputted into the amplitude $A_1$ of the first component, and $\gamma$ is adjusted so that the change of "Out4" (e.g. $t_{12} - \gamma \times t_{21}$) becomes smallest.

The values of $\alpha$, $\beta$, $\gamma$ and $\delta$ may be detected by actually inputting disturbance into $A_1$, $A_2$ and ø or, alternatively, on the basis of calculation.

Figure 12:
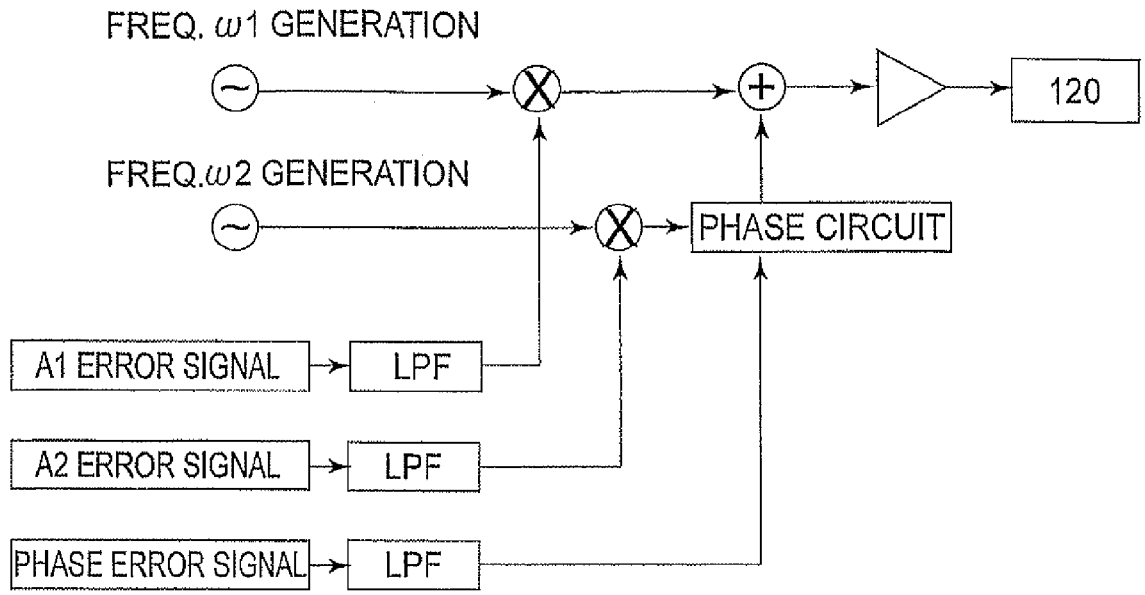
FIG. 12 is a block diagram of a control circuit according to Example 5 or 6 of the present invention.

FIG. 12 is a block diagram of the control circuit. It should be noted that the error detecting circuit shown in FIG. 11 and the control circuit shown in FIG. 12 may be provided in the drive control system 150 shown in FIG. 2A.

The control circuit of FIG. 12 is arranged to produce a driving signal effective to make the error signals of Equations (27-1), (27-2) and (27-3) equal to zero and, based on it, the control circuit drives the optical deflecting device. Each of the error signals for $A_1$, $A_2$ and ø calculated by the error detecting circuit of FIG. 11 passes through a corresponding low-pass filter LPF by which it is shaped. The amplitude component $A_2$ of a sinusoidal wave having a frequency $\omega_2$, generated by a generating circuit, is adjusted on the basis of the $A_2$ error signal produced by the error detecting circuit. Thereafter, on the basis of the phase ø error signal, the value of phase ø is adjusted. On the other hand, the amplitude component $A_1$ of a sinusoidal wave having a frequency $\omega_1$, generated by a generating circuit, is adjusted on the basis of the $A_1$ error signal produced by the error detecting circuit. Thereafter, the sinusoidal wave of frequency $\omega_1$ having been adjusted and the sinusoidal wave of frequency $\omega_2$ having been adjusted are added each other by the adder, whereby a driving signal is produced. This driving signal is applied to the driving system 120. Hence, the optical deflecting device is driven by the driving system on the basis of the thus added driving signal.

Although this example uses low-pass filters to remove noise, signal shaping may be done by using any other filter. Or, use of the filter may be omitted.

As regards the angle θ of the optical deflecting device, although this example uses a relation $\theta(t) = A_1 \sin(\omega_1 t) + A_2 \sin(\omega_2 t + ø)$, the relation may be changed to $A_1 \sin(\omega_1 t + ø) + A_2 \sin(\omega_2 t)$, for example, with essentially the same results. The control method and control circuit of this example are applicable in such case.

Example 6

An optical deflecting device according to Example 6 of this embodiment will be described. This example is similar to Example 5 except that the error detecting circuit has a structure shown in FIG. 13. In this example, first and second light receiving elements 141 and 142 are disposed at positions $\theta_1$ and $\theta_2$ which are symmetrical with respect to the center of scan of the optical deflecting device. Asymmetrical disposition is therefore excluded here. Hence, there is no necessity of considering parameters ($\alpha$, $\beta$, $\gamma$ and $\delta$) for adjustment of the subtraction ratio or adding ratio. Therefore, the error signal can be calculated more easily. The calculation methods for obtaining error signals are essentially the same as those of Example 5.

In Example 6, error signals for $A_1$, $A_2$ and ø are calculated as follows.

Figure 13:
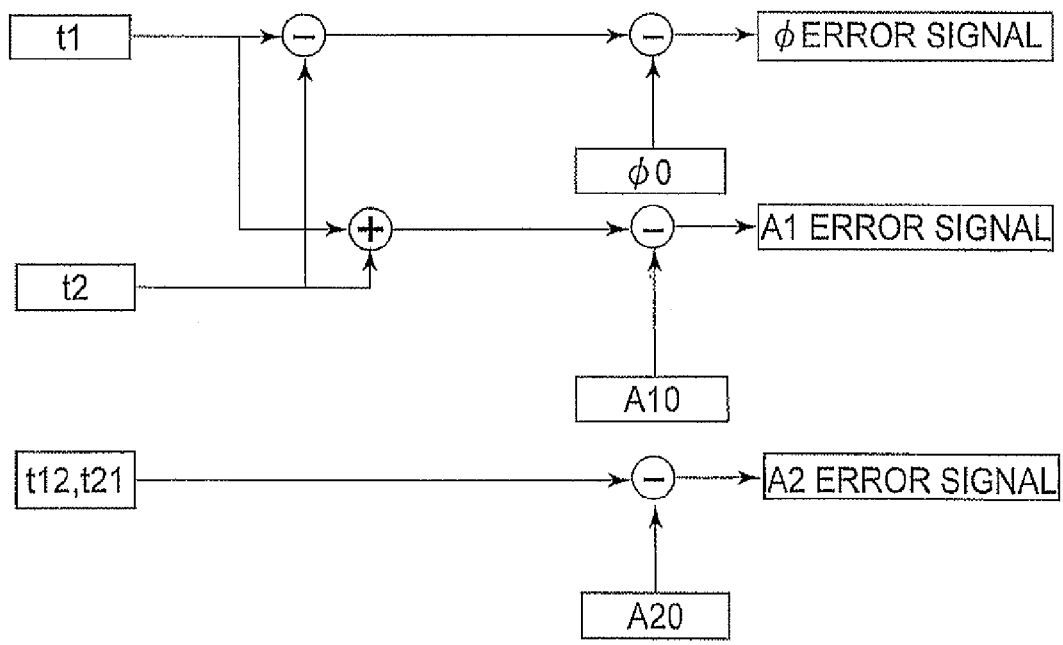
FIG. 13 is a block diagram of an error detecting circuit according to Example 6 of the present invention.

FIG. 13 is a block diagram of the error detecting circuit in this example. The error signal for $A_1$ can be detected by subtracting $A_1$ control target value $A_{10}$ from the signal that represents the $A_1$ error signal. This can be expressed as follows.

$$A_1 \text{ error signal} = t_1 + t_2 - A_{10} \tag{28-1}$$

The error signal for $A_2$ can be detected by subtracting $A_2$ control target value $A_{20}$ from the signal that represents the amplitude change of $A_2$. This can be expressed as follows.

$$A_2 \text{ error signal} = t_{12} - A_{20} \ (\text{or } t_{21} - A_{20}) \tag{28-2}$$

The error signal for ø can be detected by subtracting ø control target value $ø_0$ from the signal that represents the phase change of ø. This can be expressed as follows.

$$ø \text{ error signal} = t_1 - t_2 - ø_0 \tag{28-3}$$

By use of the error detecting circuit of this example, error signals for parameters can be calculated through simpler computations. These error signals are applied to the control circuit shown in FIG. 12, and the control circuits produces a driving signal for the optical deflecting device. The driving signal is then supplied to the driving system 120 shown in FIG. 2A, whereby the optical deflecting device is driven. The signals are processed in the control circuit essentially in the same manner as Example 5.

Example 7

Figure 16:
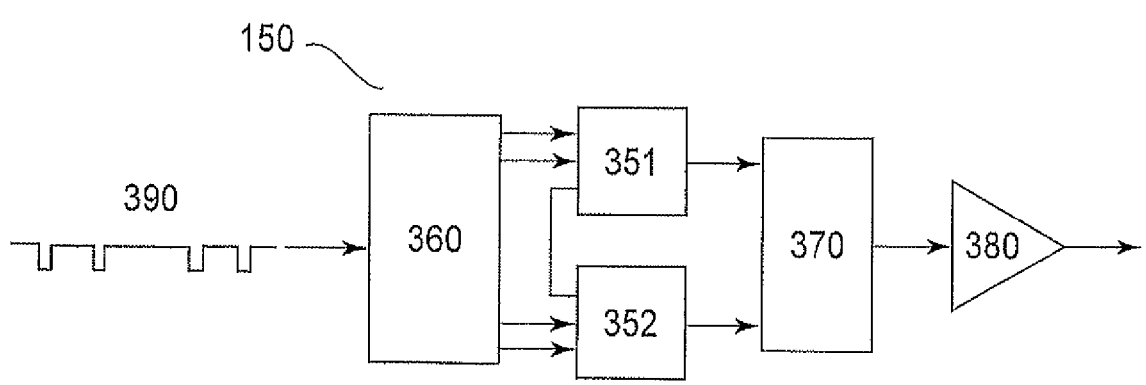
FIG. 16 is a block diagram showing an example of the drive control system in the optical deflecting device of FIG. 14.

An optical deflecting device according to Example 8 of the present invention will be described. The block diagram of the optical deflecting device according to Example 7 is similar to that shown in FIG. 14. FIGS. 4A and 4B and FIG. 16 illustrate the structure of this example, wherein FIGS. 4A and 4B have been explained with reference to Example 1.

In this example as well, oscillators 301 and 301 and torsion springs 311 and 312 have two oscillation modes, wherein adjustment is made to assure that the frequency of one mode is approximately two-fold (twice) of the other's. Furthermore, in this example as well, two natural angular oscillation frequencies (natural angular frequencies) are adjusted to $\omega_1=2\pi\times 2000$ [Hz] and $\omega_2=2\pi\times 4000$ [Hz].

FIG. 16 illustrates a control system of this optical deflection device. The structure of FIG. 16 is basically the same as that of FIG. 4C, except for the following points. The light receiving element 140 and the reflection plate 160 are disposed such as shown in FIG. 15, and the output 390 from the light receiving element 140 is supplied into a computation unit 360. The computation unit 360 then adjusts the phases and amplitudes of arbitrary-wave producing circuits 351 and 352 so that the output 390 of the light receiving element shows a desired value, more specifically, the scanning light 133 can pass across the light receiving element 140 and the reflection plate 160 at desired arbitrary set time.

With the optical deflecting device of this example, arbitrary optical scanning based on two frequency components (for example, optical scanning wherein the deflection angle changes like a sawtooth wave) is accomplished.

Example 8

An optical deflecting device according to Example 8 of the present invention will be described. The block diagram of the optical deflecting device according to this example is similar to that shown in FIG. 14. The structure is similar to that shown in FIGS. 4A and 4B and FIG. 16.

In this example, the deflection angle $\theta$ of the optical deflecting device can be expressed by Equation (3-1) mentioned hereinbefore, that is:

$$\theta(t)=A_1\sin(\omega_1 t+\varnothing_1)+A_2\sin(\omega_2 t+\varnothing_2)$$

Here, if $A_1=1$, $A_2=0.2$, $\varnothing_1=0$, $\varnothing_2=0$, $\omega_1=2\pi\times 2000$ and $\omega_2=2\pi\times 4000$, the changes in deflection angle $\theta$ and angular speed $\theta'$, with respect to time, of the optical deflecting device of this example are such as shown in FIGS. 7A and 7B. The deflection angle $\theta$ is more alike a sawtooth wave than the sinusoidal wave is. The angular speed $\theta'$ less changes in an approximately constant angular speed region, as compared with the sinusoidal wave.

Although this example uses a condition $A_1=1$, $A_2=0.2$, $\varnothing_1=0$, $\varnothing_2=0$, $\omega_1=2\pi\times 2000$ and $\omega_2=2\pi\times 4000$, desired values may be chosen for $A_1$, $A_2$, $\varnothing_1$, $\varnothing_2$, $\omega_1$ and $\omega_2$ as long as the amount of change in angular speed $\theta'$ can be made smaller in the approximately constant angular speed region as compared with sinusoidal waves.

In this example, as shown in FIG. 15, when the center of scan of the optical deflecting device is taken as the origin, the light receiving element 140 is disposed at a position $\theta_{BD}$ where the deflection angle $\theta$ of the optical deflecting device is equal to +0.85, and the deflection plate 160 is disposed at a position $\theta_{MIRROR}$ where the deflection angle $\theta$ is equal to −0.8. Namely, the light receiving element 140 and the deflection plate 160 are disposed asymmetrically with respect to the scan center of optical deflecting device. In the idealistic state, the target time moments $t_{10a}$, $t_{20a}$, $t_{30a}$ and $t_{40a}$ whereat the scanning light 133 and deflection light 134 pass across the light receiving element 140 are 0.057 msec, 0.154 msec, 0.346 msec and 0.448 msec, respectively. Hence, these time moments are set as four preset time moments. The control system (drive control system) adjusts the driving signal so that the detection time moments (light passage moments) $t_1$, $t_2$, $t_3$ and $t_4$ whereat the scanning light 133 and the deflection light 134 pass across the light receiving element 140 are brought into coincidence with the above-described preset values. By this, the deflection angle $\theta$ of the optical deflecting device as shown in FIG. 7A is accomplished.

Next, the method of adjusting the amplitude $A_1$ will be described. If the production of sinusoidal wave of frequency 4000 Hz from the arbitrary-wave producing circuit 352 is interrupted and the circuit produces only a sinusoidal wave of frequency 2000 Hz, the optical deflecting device performs oscillation only in the first oscillation motion. The deflection angle $\theta$ can be expressed by $\theta(t)=A_1\sin(\omega_1 t)$ as in Equation (16).

Here, if the detection time moment (passage time moment) whereat the scanning light 133 and the deflection light 134 pass across the light receiving element 140 is denoted by $t_a$, $t_b$, $t_c$ and $t_d$, the relationship between the deflection angle and the passage time can be expressed as follows.

$$\theta(t_a)=\theta(t_b)=\theta_{BD} \quad (29)$$

$$\theta(t_c)=\theta(t_d)=\theta_{MIRROR} \quad (30)$$

Figure 17A:
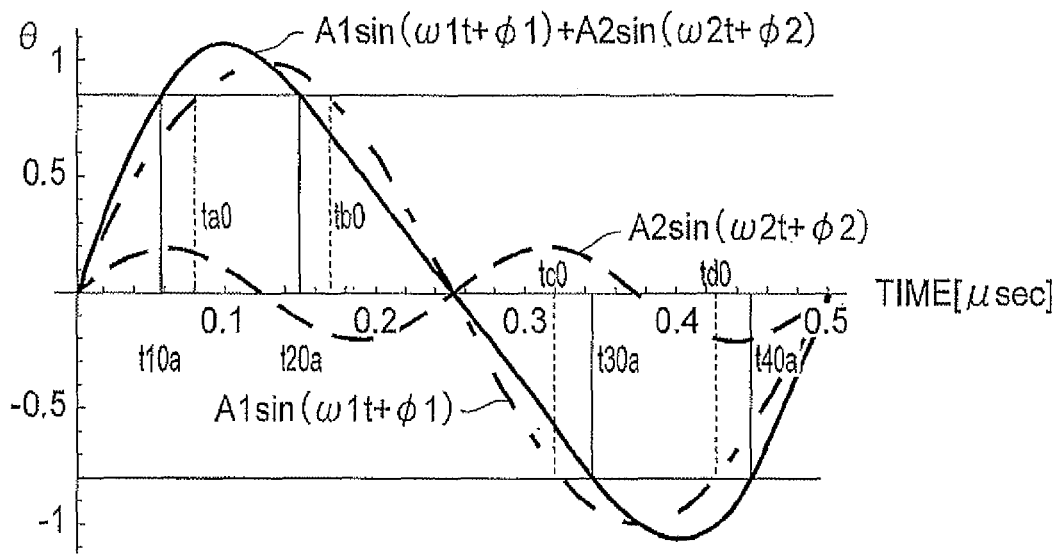
FIG. 17A is a graph showing an example of a change in the deflection angle of the optical deflecting device of FIG. 14 with respect to time.

In FIG. 17A, a broken line depicts the relationship between the time and the scanning angle where $A_1$ the target value. Here, idealistic time moment whereat the scanning light 133 and the deflection light 134 pass across the light receiving element 140 is denoted by $t_{a0}$, $t_{b0}$, $t_{c0}$ and $t_{d0}$. Since the value of $t_{b0}-t_{a0}$ is 0.095 msec (this is detectable beforehand), 0.095 msec is set as the preset time. In this manner, by adjusting the amplitude of the arbitrary-wave producing circuit 351 so that the value $t_b-t_a$ becomes equal to 0.095 msec, desired $A_1$ is obtainable.

After this, a sinusoidal wave of frequency 4000 Hz is superposedly produced from the arbitrary-wave producing circuit 352, and the optical deflecting device is driven in accordance with these two frequencies. In this case as well, in place of interrupting the production of sinusoidal wave of frequency 4000 Hz from the arbitrary-wave producing circuit 352, in addition to the sinusoidal wave of 2000 Hz a sinusoidal wave having an arbitrary frequency (third frequency) other than 4000 Hz and containing zero may be produced therefrom. Since in such occasion the frequency is out of the resonance frequency of the optical deflecting device, there is no possibility that the motion of the optical deflecting device with the third frequency caused thereby. Advantageous feature here is that, since signals of two frequencies are continuously supplied to the driving system of the optical deflecting device, any change in supplied energy is well suppressed. This effectively reduces a change in temperature of the optical deflecting device which might be caused if the actual drive in the device is changed. This applies to other examples.

In this example, the light receiving element 140 is disposed at a position $\theta_{BD}$ where the deflection angle $\theta$ of the optical deflecting device is equal to +0.85, and the deflection plate 160 is disposed at a position $\theta_{MIRROR}$ where the deflection angle $\theta$ is equal to −0.8. However, these members may be disposed with any deflection angle $\theta$. Preferably, to avoid optical interference in the approximately constant speed region, the light receiving element and the deflection plate may be disposed within a range in which the deflection angle $\theta$ is less than +1.0 and not less than +0.6, as well as a range in which $\theta$ is not greater than −0.6 and greater than −1.0.

In this example, the amplitude of the arbitrary-wave producing circuit 351 is adjusted so that the value of $t_b-t_a$ become equal to 0.095 msec. However, the amplitude of the arbitrary-wave producing circuit 351 may be adjusted so that the value of one or more of $t_d-t_c$ and any other time intervals may be made equal to a desired value. Since however there is a relation $|\theta_{BD}|>|\theta_{MIRROR}|$ in this example, the value of $t_b-t_a$ is most sensitive to the amplitude. Therefore, adjusting the amplitude of the arbitrary-wave producing circuit 351 so as to make $t_b-t_a$ equal to an arbitrary value is preferable. If $|\theta_{MIRROR}|>|\theta_{BD}|$ on the other hand, since the value of $t_d-t_c$ is most sensitive to the amplitude, adjusting the amplitude of the arbitrary-wave producing circuit 351 so as to make $t_d-t_c$ equal to a an arbitrary value is preferable.

The procedure described above is the procedure for determining the amplitude of the first oscillation motion of the reflection mirror. In this procedure, while the second oscillation motion is interrupted and the optical scan is being carried out only by the first oscillation motion, the following operation is done. Namely, while taking a certain time within one cycle of the first frequency as zero, the amplitude of the first oscillation motion is adjusted so that at least two different time moments whereat the scanning light passes across one light receiving element are brought into coincidence with the target time moments. In this procedure, in this example, the amplitude of the first oscillation motion is adjusted so that, among plural time intervals of passage of the scanning light across the light receiving element, the shortest time interval is brought into coincidence with the desired target time.

Example 9

An optical deflecting device according to Example 9 of the present invention will be described. The block diagram of the optical deflecting device according to this example is similar to that shown in FIG. 14. The structure is similar to that shown in FIGS. 4A and 4B and FIG. 16. Disposition of the optical deflecting device (reflection mirror 101) shown in FIG. 15 as well as the light receiving element 140 and the reflection plate 160 is essentially the same as that of Example 8. Further, the deflection angle θ of the optical deflecting device of this example is the same as that of Example 8, shown in FIG. 17.

Figure 17B:
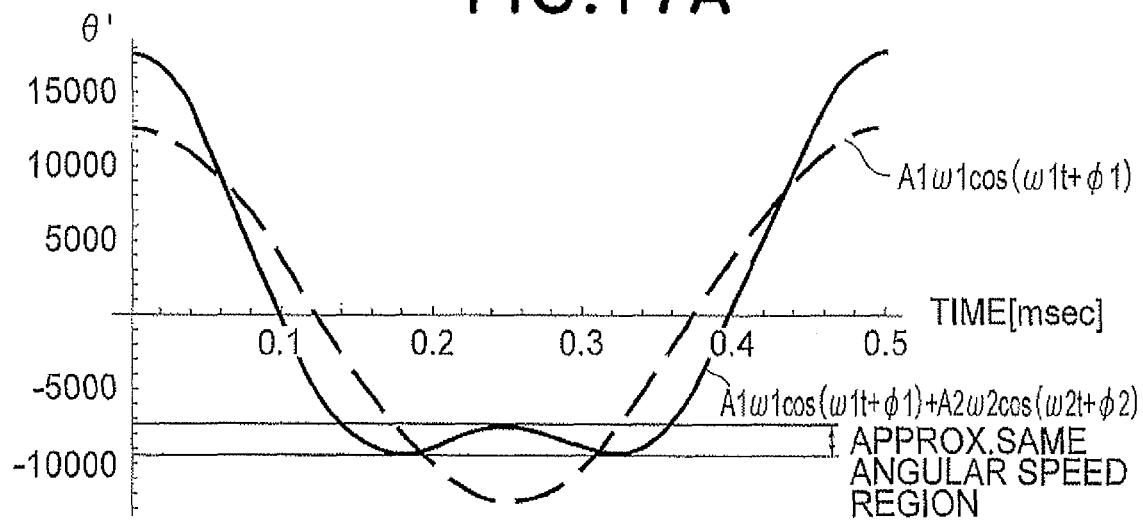
FIG. 17B is a graph showing an example of a change in the angular speed with respect to time.

Here, taking the time "zero" in one cycle of the first frequency shown in FIG. 17 as the reference time, the target time moment whereat the scanning light 133 and the deflected light 134 pass across the light receiving element 140 is denoted by $t_{10a}, t_{20a}, t_{30a}$ and $t_{40a}$. Then, $t_{10a}, t_{20a}, t_{30a}$ and $t_{40a}$ become equal to 0.057 msec, 0.154 msec, 0.346 msec and 0.448 msec, respectively. These target time moments are detectable beforehand. Therefore, these moments are set as four preset time moments. By adjusting the driving signal through the control system so that the four detection time moments (i.e. passage time moments) $t_1, t_2, t_3$ and $t_4$ whereat the scanning light 133 and the deflected light 134 pass across the light receiving element 140 become equal to the aforementioned target values, respectively, the deflection angle θ of the optical deflecting device shown in FIG. 17 is accomplished.

The control method in this example will now be explained in detail. Coefficients that represent changes in detection time moments $t_1, t_2, t_3$ and $t_4$ whereat the scanning light 133 and deflection light 134 pass across the light receiving element, which changes are caused when the control parameters X including any of $A_1, A_2$ and $ø_1$ and $ø_2$ of the optical deflecting device shift minutely from respective target values, may be expressed by Equation (21) mentioned hereinbefore. Matrix M may be expressed by Equation (22) also mentioned hereinbefore. These quantities may be detected beforehand and stored.

The control amounts $\Delta A_1, \Delta A_2, \Delta ø_1$ and $\Delta ø_2$ for the amplitude and phase of the reflection mirror 101 are determined from the time differences $\Delta t_1, \Delta t_2, \Delta t_3$ and $\Delta t_4$ between the four detection time moments $t_1, t_2, t_3$ and $t_4$ and the four target time moments $t_{10a}, t_{20a}, t_{30a}$ and $t_{40a}$, and in accordance with Equation (23) mentioned hereinbefore.

By using these equations, the control amounts $\Delta A_1, \Delta A_2, \Delta ø_1$ and $\Delta ø_2$ can be calculated from the time differences $\Delta t_1$, $\Delta t_2, \Delta t_3$ and $\Delta t_4$ with respect to the target time moments $t_{10a}, t_{20a}, t_{30a}$ and $t_{40a}$. Based on these quantities, the outputs of the arbitrary-wave producing circuits 351 and 352 are adjusted. By repeating the above-described control procedure, the detection time moment is converged to the target time moments $t_{10a}, t_{20a}, t_{30a}$ and $t_{40a}$, whereby a desired deflection angle θ of the optical deflecting device is accomplished. This is basically the same as that described with reference to Example 3.

Figure 19:
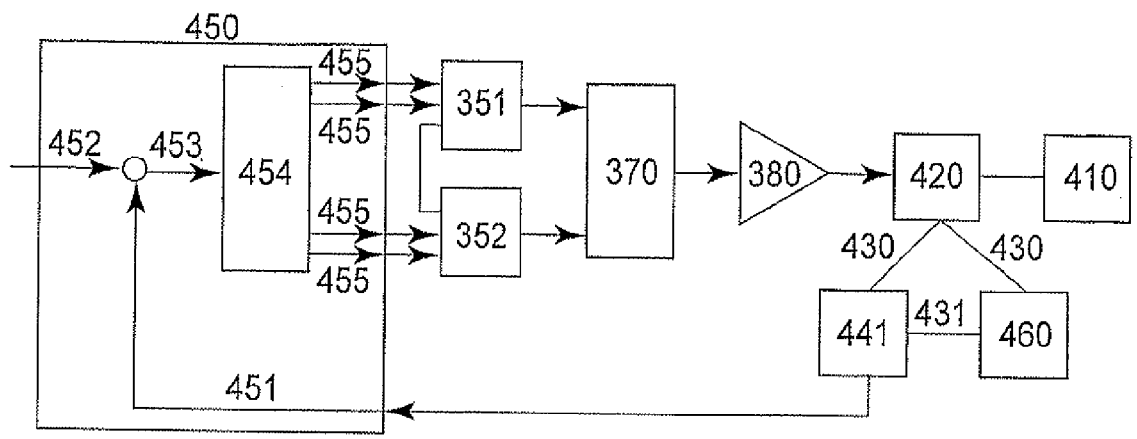
FIG. 19 is a block diagram for explaining a control method for an optical deflecting device according to Example 3, etc. of the present invention.

The procedure described above will be explained with reference to the block diagram of FIG. 19. Light from a light source 410 is deflected by an optical deflecting device (reflection mirror) 420, and scanning light 430 passes across a light receiving element 441. Also, the scanning light 430 is deflected by a deflection plate 460, and deflected light 431 is incident on the light receiving element 441. Control system 450 subtracts detection time moment 451 detected by the light receiving element 441 from target time moment 452, to calculate the time difference 453. Then, by computing the matrix in accordance with Equation (15) based on the time difference 453, in a computing circuit 454, the control amount 455 is calculated. Then, by using arbitrary-wave producing circuits 351 and 352, an adder 370 and an amplifier 380, a signal to be inputted to the driving system of the optical deflecting device 420 is produced.

Example 10

An optical deflecting device according to Example 10 of the present invention will be described. The block diagram of the optical deflecting device according to this example is similar to that shown in FIG. 14. The structure is similar to that shown in FIGS. 4A and 4B and FIG. 16. Disposition of the optical deflecting device (reflection mirror 101) shown in FIG. 15 as well as the light receiving element 140 and the reflection plate 160 is essentially the same as that of Example 8. Further, the deflection angle θ of the optical deflecting device of this example is the same as that shown in FIG. 17. Symbols $ø_1$ and $ø_2$ in FIG. 17 are expressed by equations $ø=ø_1-ø_2$ and $ø=ø_2-ø_1$, and Equation (3-1) in FIG. 7 is converted into Equation (3-2) or Equation (3-3) mentioned hereinbefore.

In this example, among the target time moments $t_{10b}, t_{20b}, t_{30b}$ and $t_{40b}$ whereat the scanning light 133 and the deflection light 134 pass across the light receiving element 140, $t_{10b}$ is chosen as the reference time. Relative target times $t_{20b}-t_{10b}$, $t_{30b}-t_{10b}$ and $t_{40b}-t_{10b}$, with respect to the reference time are equal to 0.097 msec, 0.289 msec and 0.391 msec (these are detectable beforehand), respectively, and the deflection angle θ is such as shown in FIG. 17. Hence, these times are set as three preset times. Therefore, by adjusting the driving signal through the control system so that three relative detection times $t_2-t_1, t_3-t_1$ and $t_4-t_1$ for the passage of scanning light 133 and deflected light 134 across the light receiving element 141 take the aforementioned set values, the deflection angle θ of the optical deflecting device as shown in FIG. 17 is accomplished.

The control method in this example will now be explained in detail. Both the scanning light 133 and the deflected light 140 are incident on the light receiving element 140, and thus four timings are detectable in one cycle of the first frequency. Therefore, it is necessary to identify which one of the four timings corresponds to the moment $t_{10b}$ that should be chosen in this example as the reference.

In order to identify the timing, in this example, generation of sinusoidal waves of a frequency 4000 Hz from the arbitrary-wave producing circuit 352 is interrupted, and only sinusoidal waves of a frequency 2000 Hz are produced. Then, the optical deflecting device operates only with the first oscillation motion. The deflection angle θ of the optical deflecting device can be expressed by θ(t)–$A_1 \sin(\omega_1 t)$ as in Equation (16) mentioned hereinbefore.

If the detection time moment (passage time moment) whereat the scanning light 133 and the deflected light 134 pass across the light receiving element 140 is denoted by $t_a$, $t_b$, $t_c$ and $t_d$ wherein $t_a<t_b<t_c<t_d$, the relationship between the deflection angle and the passage time moment can be expressed by the following equations, like Equation (29) and Equation (30) mentioned hereinbefore.

$$\theta(t_a)=\theta(t_b)=\theta_{BD}$$

$$\theta(t_c)=\theta(t_d)=\theta_{MIRROR}$$

Here, since the light receiving element 140 and the reflection plate 160 are disposed asymmetrically, the relationship among the time differences $t_b-t_a$, $t_c-t_b$, $t_d-t_c$ is expressed as follows.

$$t_b-t_a<t_d-t_c<t_c-t_b \quad (31)$$

In FIG. 17A, the broken line depicts the relationship between the time and the scanning angle where $A_1$ the target value. Here, idealistic time moment whereat the scanning light 133 and the deflection light 134 pass across the light receiving element 140 is denoted by $t_{a0}$, $t_{b0}$, $t_{c0}$ and $t_{d0}$. Since a relation $t_{b0}-t_{a0}<t_{d0}-t_{c0}<t_{c0}-t_{b0}$ is there, it can be discriminated that $t_a$ should be chosen as the reference time $t_{10a}$.

After this, a sinusoidal wave of frequency 4000 Hz is superposedly produced from the arbitrary-wave producing circuit 352, and the optical deflecting device is driven in accordance with these two frequencies.

Although in this example $t_{10a}$ is used as the reference time, any other reference time can be discriminated on the basis of the magnitude of the time difference mentioned above. The procedure described above is the procedure for determining the reference time. In this procedure, while the second oscillation motion is being interrupted and optical scan is being carried out only by the first oscillation motion, the reference time is determined on the basis of the magnitude of the time intervals concerning the passage of the scanning light across the light receiving element.

The control method of this example will be explained in more detail. Coefficients that represent changes in relative detection time $t_2-t_1$, $t_3-t_1$, $t_4-t_1$ for passage of scanning light 133 and deflection light 134 across the light receiving element, which changes are caused when the control parameters X including any of $A_1$, $A_2$ and ø of the optical deflecting device-shift minutely from respective target values, may be expressed by Equation (24) mentioned hereinbefore. Matrix M may be expressed by Equation (25) also mentioned hereinbefore. The control amounts $\Delta A_1$, $\Delta A_2$ and $\Delta ø$ for the amplitude and phase of the reflection mirror 101 are determined from the time differences $\Delta t_2$, $\Delta t_3$ and $\Delta t_4$ between the three relative detection times $t_2-t_1$, $t_3-t_1$, $t_4-t_1$ and the three target times $t_{20b}-t_{10b}$, $t_{30b}-t_{10b}$ and $t_{40b}-t_{10b}$, and in accordance with Equation (26) mentioned hereinbefore.

By using these equations, the control amounts $\Delta A_1$, $\Delta A_2$ and $\Delta ø$ can be calculated from the time differences $\Delta t_2$, $\Delta t_3$ and $\Delta t_4$ with respect to the target times $t_{20b}-t_{10b}$, $t_{30b}-t_{10b}$ and $t_{40b}-t_{10b}$. Based on these quantities, the outputs of the arbitrary-wave producing circuits 351 and 352 are adjusted. By repeating the above-described control procedure, the detection time moment is converged to the target time moments $t_{10b}$, $t_{20b}$, $t_{30b}$ and $t_{40b}$, whereby a desired deflection angle θ of the optical deflecting device is accomplished. This is basically the same as that described with reference to Example 4.

The procedure described above will be explained with reference to the block diagram of FIG. 19. Basically, the procedure is the same as has been explained with reference to Example 9. Here, the control amount 455 is calculated by computing the matrix in accordance with Equation (26) based on the time difference 453, in a computing circuit 454. Then, by using arbitrary-wave producing circuits 351 and 352, an adder 370 and an amplifier 380, a signal to be inputted to the driving system of the optical deflecting device 420 is produced. In this example, the control amount 455 for the arbitrary-wave producing circuit 351 is single (not dual) or, alternatively, the control amount 455 for the arbitrary-wave producing circuit 352 is single (not dual). This means that the difference ø of phase between the two frequencies can be adjusted either by the arbitrary-wave producing circuit 351 or the arbitrary-wave producing circuit 352.

Example 11

An optical deflecting device according to Example 11 of the present invention will be described. The block diagram of the optical deflecting device according to this example is similar to that shown in FIG. 14. The structure is similar to that shown in FIGS. 4A and 4B and FIG. 16. Disposition of the optical deflecting device (reflection mirror 101) shown in FIG. 15 and the light receiving element 140 and the reflection plate 160 is generally similar to that of Example 8. However, the position is as follows. Namely, when the center of scan of the optical deflecting device is taken as the origin, the light receiving element is disposed at a position $\theta_{BD}$ where the deflection angle θ of the optical deflecting device (mirror) is equal to +0.8. The deflection plate 160 is disposed at a position $\theta_{MIRROR}$ whereat the deflection angle θ is equal to –0.8. Namely, these members are disposed symmetrically with respect to the scan center.

Figure 18A:
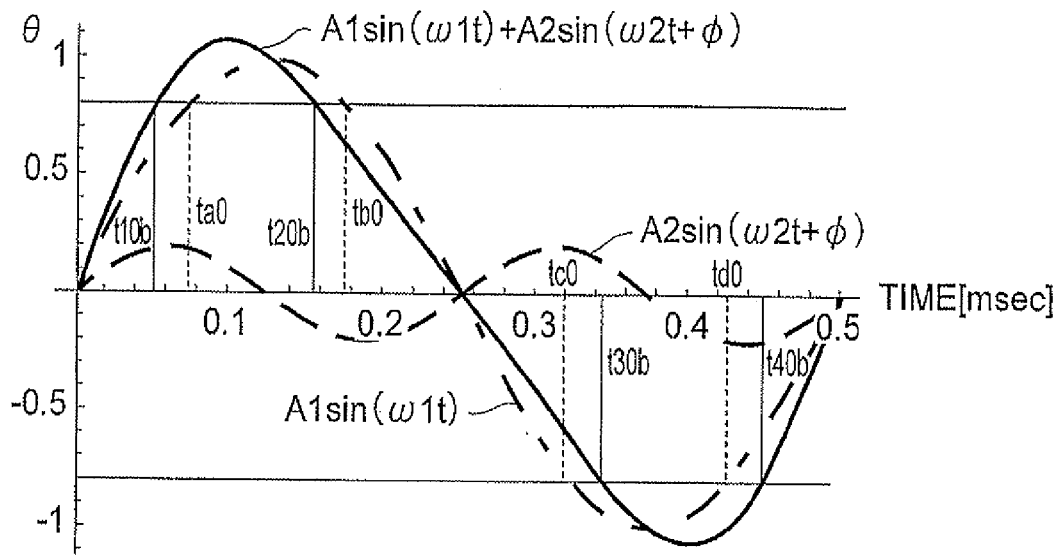
FIG. 18A is a graph showing another example of a change in the deflection angle of the optical deflecting device of FIG. 14 with respect to timer and FIG. 18B is a graph showing another example of a change in the angular speed with respect to time.
Figure 18B:
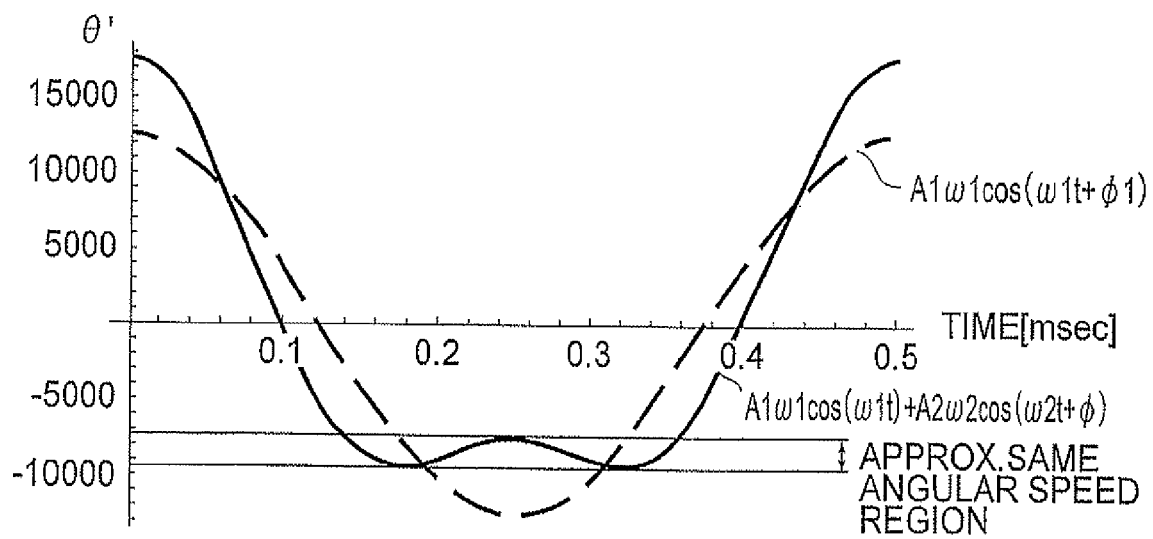

Among the target time moments $t_{10b}$, $t_{20b}$, $t_{30b}$ and $t_{40b}$ whereat the scanning light 133 and the deflected light 134 pass across the light receiving element 140, $t_{10b}$ is chosen as the reference time. Relative target times $t_{20b}-t_{10b}$, $t_{30b}-t_{10b}$ and $t_{40b}-t_{10b}$ with respect to the reference time are equal to 0.102 msec, 0.294 msec and 0.396 msec (there are detectable beforehand), respectively, and the deflection angle θ is such as shown in FIG. 18. Therefore, by adjusting the driving signal through the control system so that three relative detection times $t_2-t_1$, $t_3-t_1$ and $t_4-t_1$ for the passage of scanning light 133 and deflected light 134 across the light receiving element 141 can take the aforementioned target values, the deflection angle θ of the optical deflecting device as shown in FIG. 10 is accomplished.

The control method in this example will now be explained in detail. In this example as well, both the scanning light 133 and the deflected light 140 are incident on the light receiving element 140, and four timings are detectable in one cycle of the first frequency. Therefore, it is necessary to identify which one of the four timings corresponds to the moment $t_{10b}$ that should be chosen in this example as the reference.

In order to identify the timing, in this example as well, generation of sinusoidal waves of a frequency 4000 Hz from the arbitrary-wave producing circuit 352 is interrupted, and only sinusoidal waves of a frequency 2000 Hz are produced. Then, the optical deflecting device operates only with the first oscillation motion. The deflection angle θ of the optical deflecting device can be expressed by θ(t)=$A_1 \sin(\omega_1 t)$ in Equation (16) mentioned hereinbefore.

If the detection time moment (passage time moment) whereat the scanning light 133 and the deflected light 134 pass across the light receiving element 140 is denoted by $t_a$, $t_b$, $t_c$ and $t_d$ wherein $t_a<t_b<t_c<t_d$, the relationship between the deflection angle and the passage time moment can be expressed by the following equations, like Equation (29) and Equation (30) mentioned hereinbefore.

$$\theta(t_a)=\theta(t_b)=\theta_{BD}$$

$$\theta(t_c)=\theta(t_d)=\theta_{MIRROR}$$

Here, since the light receiving element 140 and the reflection plate 160 are disposed symmetrically, the relationship among the time differences $t_b-t_a$, $t_c-t_b$, $t_d-t_c$ is expressed as follows.

$$t_b-t_a=t_d-t_c$$

$$t_b-t_a<t_c-t_b \quad (32)$$

In addition to this, in this example, the light receiving element 140 and the reflection plate 160 are disposed so that the optical path length of scanning light extending from the reflection mirror 101 to the light receiving element 140 differs from the optical path length of scanning light that extends from the reflection mirror 101 via the reflection plate 160 to the light receiving element 140. Hence, the speed of light passing across the light receiving element 140 is different between the scanning light from the reflection mirror to the light receiving element and the scanning light from the reflection mirror to the light receiving element by way of the reflection plate. As a result, the duration in which light is being incident on the light receiving element is different. Time moments $t_{wa}$, $t_{wb}$, $t_{wc}$ and $t_{wd}$ where the scanning light 133 and the deflection light 134 pass across the light receiving element, having a finite area, in regard to the passage time moments $t_a$, $t_b$, $t_c$ and $t_d$, are in the following relation.

$$t_{wa}=t_{wb}$$

$$t_{wc}=t_{wd}$$

$$t_{wa}>t_{wc} \quad (33)$$

From these relations, it is seen that $t_a$ should be chosen as the reference time $t_{10b}$.

After this, a sinusoidal wave of frequency 4000 Hz is superposedly produced from the arbitrary-wave producing circuit 352, and the optical deflecting device is driven in accordance with these two frequencies.

The control method based on Equations (24), (25) and (26) is essentially the same as that having been described with reference to Example 10. The procedure to be done in the block diagram of FIG. 9 is substantially the same as that having been described with reference to Example 10.

In this example, the light receiving element 140 is disposed at a position $\theta_{BD}$ where the deflection angle $\theta$ of the optical deflecting device is equal to +0.8, and the deflection plate 160 is disposed at a position $\theta_{MIRROR}$ where the deflection angle $\theta$ is equal to −0.8. However, these members may be disposed with any deflection angle $\theta$. Preferably, to avoid optical interference in the approximately constant speed region, the light receiving element 140 and the deflection plate 160 may be disposed within a orange in which the deflection angle $\theta$ is less than +1.0 and not less than +0.6, as well as a range in which $\theta$ is not greater than −0.6 and greater than −1.0.

In this example, the optical path length for the scanning light that extends from the reflection mirror 101 to the light receiving element 140 by way of the reflection plate 160 is made longer. However, the optical path length of scanning light extending from the reflection mirror 101 to the light receiving element 140 by way of the reflection plate 160 may be made shorter. Anyway, discrimination of the reference time may be done on the basis of the relationship that the longer the optical path length is, the shorter the time in which light passes across the light receiving element is.

Although in this example $t_{10b}$ is used as the reference time, any other reference time can be discriminated on the basis of the time difference and the time in which the light passes across the light receiving element 140 as described above.

Example 12

An optical deflecting device (electrophotographic type image forming apparatus) according to Example 12 will be described. The block diagram of the optical deflecting device of this example is similar to that shown in FIG. 2A. The structure is similar to that shown in FIGS. 4A, 4B and 4C.

Figure 20:
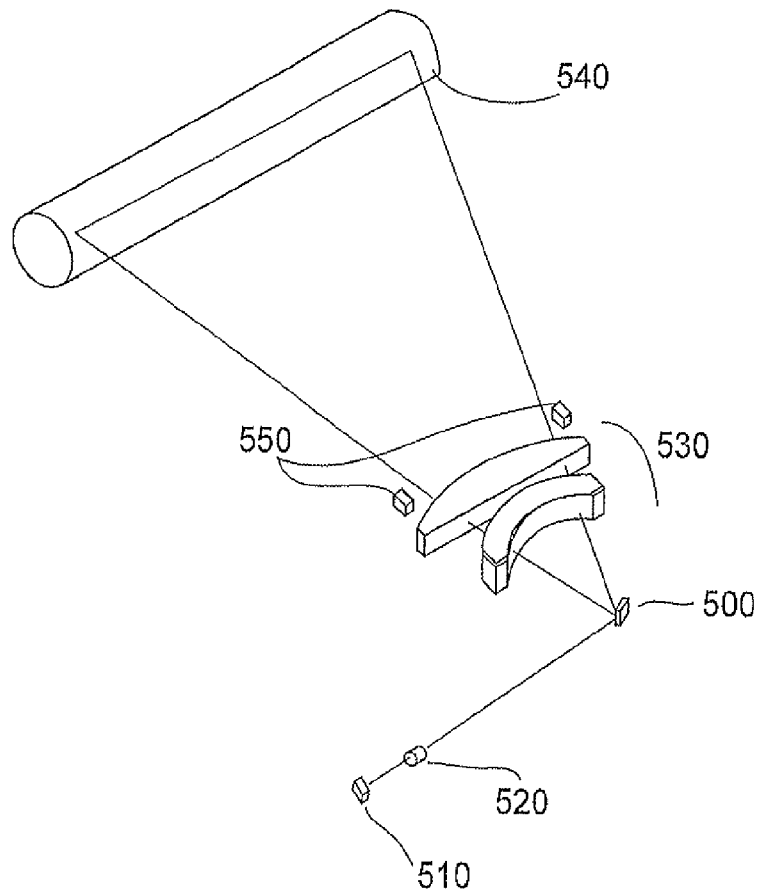
FIG. 20 is a perspective view, showing a general structure of an image forming apparatus according to Example 12 wherein an optical deflecting device based on the example of FIG. 1 is used.

FIG. 20 is a perspective view of a general structure according to this example. Light emitted from a light source 510 is shaped by a collimator lens 520, and thereafter it is deflected one-dimensionally by an optical deflecting device 500. The scanning light goes through a coupling lens 530, and it is imaged on a photosensitive drum 540. There are two light receiving elements 550 which are disposed at positions corresponding to the deflection angle of the optical deflecting device 500, which angle is out of the range in which the effective region of the photosensitive drum 540 is defined. Here, in accordance with the control method as has been explained with reference to any one of Examples 2, 3, 4, 5 and 6, for example, the angular speed of the deflection angle of the optical deflecting device is adjusted so that an approximately constant angular speed is provided in a predetermined region (approximately constant speed region shown in FIG. 7). As a result of it, and the coupling lens 530 has a what is called f-θ function, the effective region of the photosensitive drum 540 can be optically scanned at approximately constant speed. Thus, in this example, the angular speed less changes as compared with a case of sinusoidal wave drive and, therefore, better printing quality is assured.

Example 13

An optical deflecting device (electrophotographic type image forming apparatus) according to Example 13 will be described. The block diagram of the optical deflecting device of this example is similar to that shown in FIG. 14. The structure is similar to that shown in FIGS. 4A, 4B and 4C and in FIG. 16.

Figure 21:
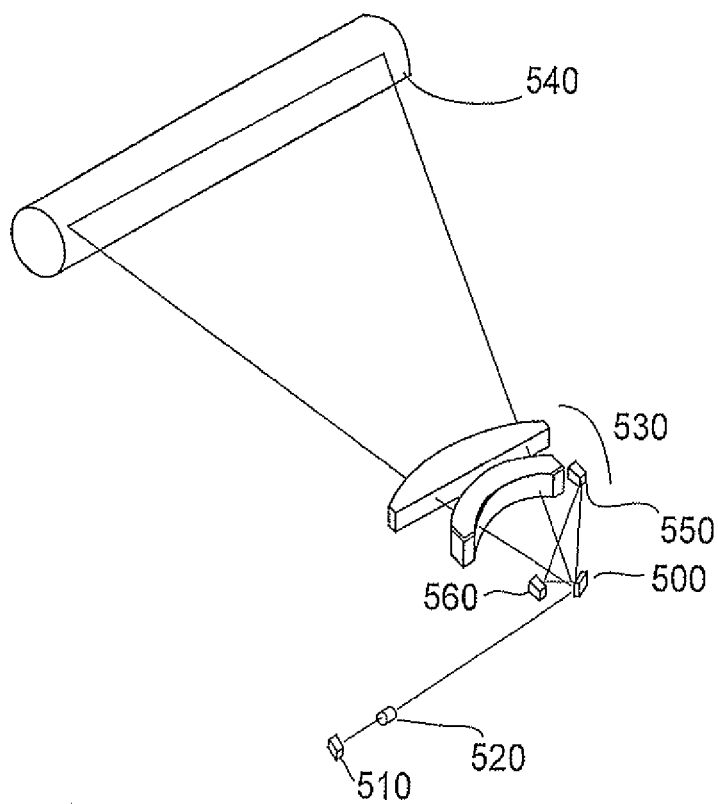
FIG. 21 is a perspective view; showing a general structure of an image forming apparatus according to Example 13 wherein an optical deflecting device based on the example of FIG. 14 is used.

FIG. 21 is a perspective view of a general structure according to this example. Basically it is similar to the structure shown in FIG. 20. The difference is as follows. There is a single light receiving element 550 and a reflection plate 550 which are disposed at positions corresponding to the deflection angle of the optical deflecting device 500, which angle is out of the range in which the effective region of the photosensitive drum 540 is defined. Here, in accordance with the control method as has been explained with reference to any one of Examples 8, 9, 10 and 11, for example, the angular speed of the deflection angle of the optical deflecting device is adjusted so that an approximately constant angular speed is provided in a predetermined region (approximately constant speed region shown in FIG. 17 or 18). As a result of it, and the coupling lens 530 has a what is called f-θ function, the effective region of the photosensitive drum 540 can be optically scanned at approximately constant speed. Thus, in this example as well, the angular speed less changes as compared with a case of sinusoidal wave drive and, therefore, better printing quality is assured.

Example 14

Example 1 through Example 13 described above relate to the first through fourth embodiments of the present invention described hereinbefore. Some examples to be described below concern the fifth embodiment of the present invention.

Example 14 relates to an optical deflecting device, and the bock diagram thereof is similar to that shown in FIG. 22.

The structure of this example is similar to that shown in FIGS. 4A and 4B. In this example as well, two natural angular oscillation frequencies are adjusted to provide $\omega_1=2\pi\times2000$ [Hz] and $\omega_2=2\pi\times4000$ [Hz].

The driving system in the optical deflecting device of this example is similar to that shown in FIG. 4C, except the following points. Since one light receiving element 140 is disposed in the manner shown in FIG. 23, the output of only the single light receiving element 140 is supplied to the computing unit 360. The computing unit 360 carries out adjustment so that the output of the single light receiving element shows a desired value. More specifically, it adjusts the phase and amplitude of the sinusoidal waves from the arbitrary-wave producing circuits 351 and 352 so that, during the drive based on first and second oscillation modes, the scanning light 133 passes across the light receiving element 140 at desired arbitrary time moment.

By use of the optical deflecting device of this example, desired optical scanning having two frequency components is accomplished.

Example 15

This example as well concerns the fifth embodiment of optical deflecting device according the present invention. The block diagram of the optical deflecting device of this example is similar to that shown in FIG. 22, and the structure is basically the same as Example 14. This example corresponds to Example 2 described hereinbefore, although the structure is a little different from it.

The deflection angle $\theta$ of the optical deflecting device of this example can be expressed as follows. Now, the amplitude and angular frequency of the first oscillation motion are denoted by $A_1$ and $\omega_1$, the amplitude and angular frequency of the second oscillation motion are denoted by $A_2$ and $\omega_2$, and the phases of the two frequencies are denoted by $\phi_1$ and $\phi_2$. If the time with respect to a desired time reference within one cycle of the first oscillation motion is denoted by t, then the deflection angle $\theta_a$ of the optical deflecting device in the first oscillation mode can be expressed by Equation (8) mentioned hereinbefore.

Figure 24A:
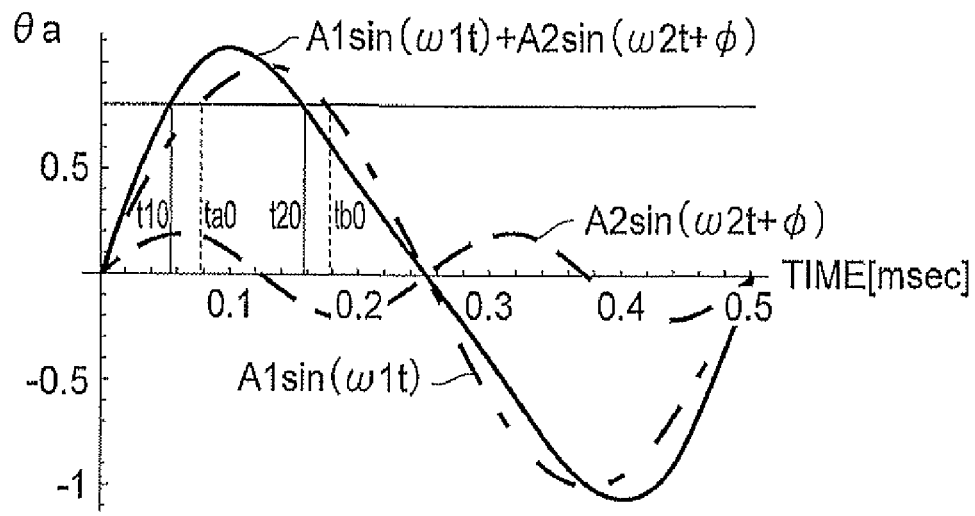
FIG. 24A is a graph showing an example of the change in deflection angle of the optical deflecting device of FIG. 22 driven in the first oscillation mode, with respect to time.

Here, if $A_1=1$, $A_2=0.2$, $\phi_1=0$, $\phi_2=0$, $\omega_1=2\pi\times2000$ and $\omega_2=2\pi\times4000$, the changes in deflection angle $\theta_a$ and angular speed $\theta_a'$, with respect to time, of the optical deflecting device are such as shown in FIG. 24 (in FIG. 14, it is illustrated in terms of phase difference $\phi$). It is seen that the deflection angle $\theta_a$ is more alike a sawtooth wave than the sinusoidal wave. The angular speed $\theta_a'$ less changes in an approximately constant angular speed region, as compared with the sinusoidal wave Although this example uses a condition $A_1=1$, $A_2=0.2$, $\phi_1=0$, $\phi_2=0$, $\omega_1=2\pi\times2000$ and $\omega_2=2\pi\times4000$, desired values may be chosen for $A_1$, $A_2$, $\phi_1$, $\phi_2$, $\omega_1$ and $\omega_2$ as long as the amount of change in angular speed $\theta_a'$ can be made smaller in the approximately constant angular speed region as compared with sinusoidal waves.

Here, if the light receiving element 140 is disposed at a position $\theta_{BD}$ where the deflection angle $\theta$ of the optical deflecting device becomes equal to +0.8 while taking the scan center of the optical deflecting device as the origin, as shown in FIG. 24, the result is as follows. Namely, target time moments $t_{10}$ and $t_{20}$ whereat the scanning light 133 should pass across the light receiving element 140 during the drive under the first oscillation mode, become equal to 0.052 msec and 0.154 msec, respectively.

Furthermore, the deflection angle $\theta_b$ of the optical deflecting device during the drive under the second oscillation mode, wherein a phase $\pi$ is applied to each of the first periodic driving force having a first frequency and the second periodic driving force having a second frequency, can be expressed as follows.

$$\theta_b(t)=A_1 \sin(\omega_1 t+\phi_1+\pi)+A_2 \sin(\omega_2 t+\phi_2+\pi) \quad (34)$$

Figure 25A:
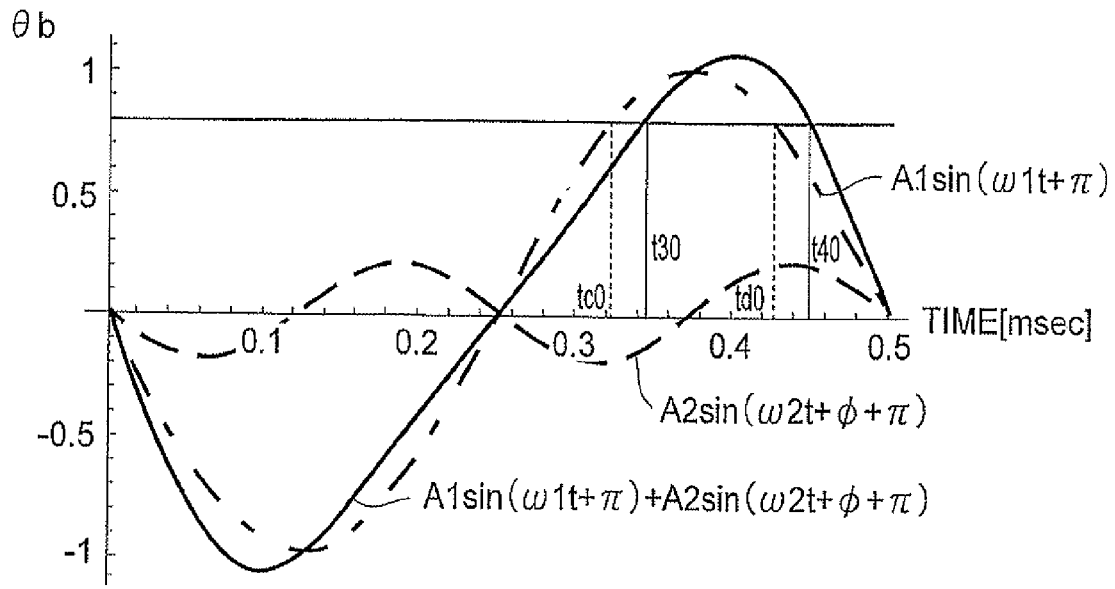
FIG. 25A is a graph showing an example of a change in deflection angle of the optical deflecting device of FIG. 22 driven in the second oscillation mode, with respect to time.

FIG. 25A shows the deflection angle $\theta_b$ of the optical deflecting device (in FIG. 25A as well, it is illustrated in terms of phase difference $\phi$). The target time moments $t_{30}$ and $t_{40}$ whereat the scanning light 133 should pass across the light receiving element 14 are equal to 0.346 msec and 0.448 msec, respectively. Here, the detection time moments $t_1$ and $t_2$ whereat the scanning light 133 corresponding to the deflection angle $\theta_a$ of the optical deflecting device passes across the light receiving element 140 as well as the detection time moments $t_3$ and $t_4$ whereat the scanning light 133 corresponding to the deflection angle $\theta_b$ of the optical deflecting device passes across the light receiving element 140, are controlled to be in coincidence with $t_{10}$, $t_{20}$, $t_{30}$ and $t_{40}$, respectively. Namely, the driving signal to the driving system is so adjusted by the control unit (drive control unit) to achieve this. By doing so, a desired deflection angle of the optical deflecting device is accomplished.

The method of controlling the deflection angle in this example will be explained in greater detail.

First of all, the amplitude $A_1$ is adjusted. In order that the optical scanning is performed only by the first oscillation motion moving with the fundamental frequency, generation of sinusoidal waves of a frequency 4000 Hz from the arbitrary-wave producing circuit 352 is interrupted, and only sinusoidal waves of a frequency 2000 Hz are produced. Then, the deflection angle $\theta$ of the optical deflecting device can be expressed by:

$$\theta(t)=A_1 \sin(\omega_1 t)$$

If the detection time moment whereat the scanning light 133 passes across the light receiving element 140 is denoted by $t_a$ and $t_b$, the relationship between the deflection angle and the passage time moment can be expressed by:

$$\theta(t_a)=\theta(t_b)=\theta_{BD}$$

Figure 24B:
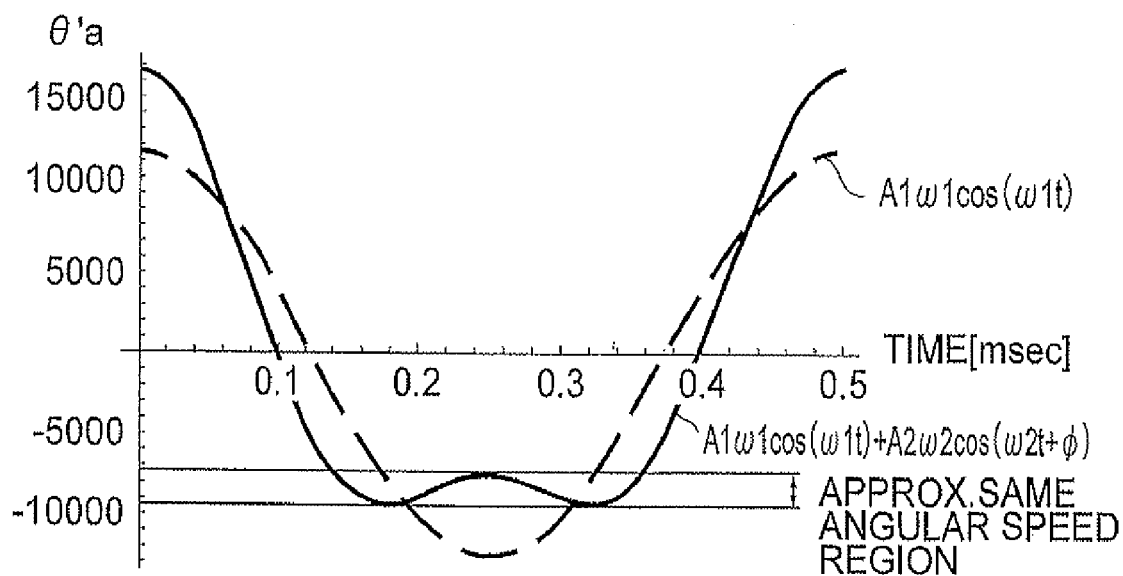
FIG. 24B is a graph showing an example of a change in the angular speed with respect to time.

In FIG. 24B, a broken line depicts the relationship between the time and the scanning angle where $A_1$ is the target value. Here, idealistic time moment whereat the scanning light 133 should pass across the light receiving element 140 is denoted by $t_{a0}$ and $t_{b0}$. Since the value of $t_{b0}-t_{a0}$ is 0.102 msec, 0.102 msec is set as the preset time. In this manner, by adjusting the amplitude of the arbitrary-wave producing circuit so that the value $t_{b0}-t_{a0}$ becomes equal to 0.102 msec, desired $A_1$ is obtainable.

After this, a sinusoidal wave of frequency 4000 Hz is superposedly produced from the arbitrary-wave producing circuit, and the optical deflecting device is driven in accordance with these two frequencies. In this case as well, driving under the first and second driving modes is carried out as described hereinbefore, and values of $A_2$, $ø_1$ and $ø_2$ are made equal to their target values, respectively.

In place of interrupting the production of sinusoidal wave of frequency 4000 Hz from the arbitrary-wave producing circuit, in addition to the sinusoidal wave of 2000 Hz a sinusoidal wave having an arbitrary frequency (third frequency) other than 4000 Hz and containing zero may be produced therefrom. Since in such occasion the frequency is out of the resonance frequency of the optical deflecting device, there is no possibility that the motion of the optical deflecting device with the third frequency is caused thereby. Advantageous feature here is that the temperature change in the optical deflecting device due to changing the drive is reduced.

In this example, a phase $\pi$ is added to each of the first periodic driving force having a first frequency and the second periodic driving force having a second frequency. However, a desired phase may be applied to the first periodic driving force having a first frequency and the second periodic driving force having a second frequency.

Example 16

This example as well concerns the fifth embodiment of optical deflecting device according the present invention. This example corresponds to Example 3 described hereinbefore, although the structure is a little different from it.

In this example, if the time zero in one cycle of the first frequency shown in FIG. 24 is taken as the reference timer the target time moments $t_{10}$ and $t_{20}$ whereat the scanning light 133 should pass across the light receiving element are 0.057 msec and 0.154 msec, respectively. The deflection angle $θ_c$ of the optical deflecting device during the drive under the second oscillation mode, wherein a phase $\pi$ is applied only to the second periodic driving force having a second frequency, can be expressed as follows.

$$θ_c(t) = A_1 \sin(ω_1 t + ø_1) + A_2 \sin(ω_2 t + ø_2 + \pi) \quad (35)$$

Figure 25B:
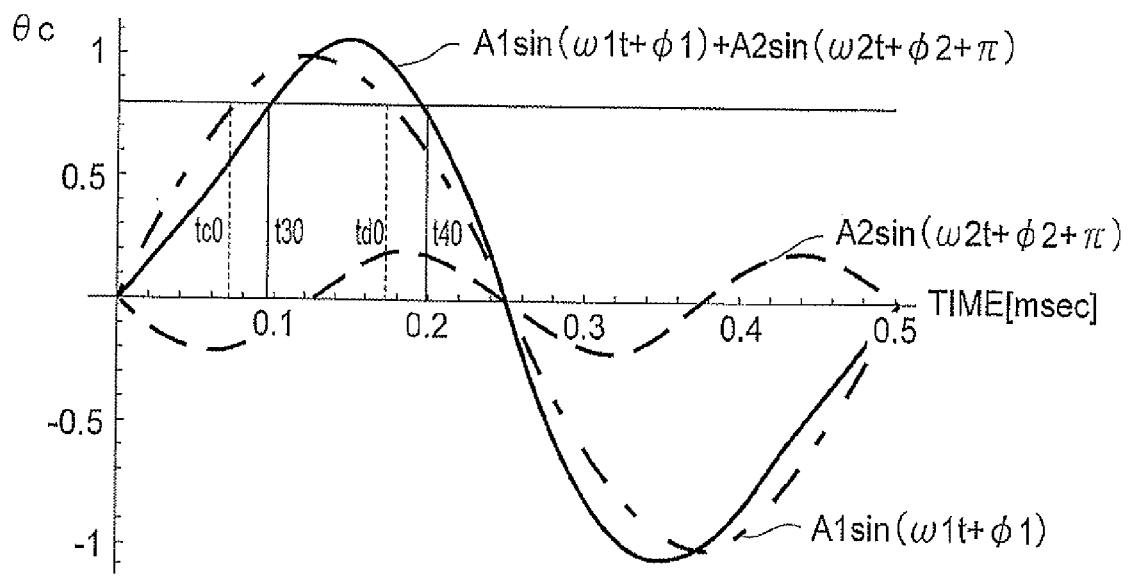
FIG. 25B is a graph showing another example of a change with respect to time.

FIG. 25B shows the deflection angle $θ_c$ of the optical deflecting device. The target time moments $t_{30}$ and $t_{40}$ whereat the scanning light 133 should pass across the light receiving element, wherein phase $\pi$ is added only to the second periodic driving force having the second frequency, are equal to 0.096 msec and 0.198 msec, respectively.

Hence, these time moments are set as four preset time moments (target values). Here, the detection time moments (passage moments) $t_1$ and $t_2$ whereat the scanning light 133 passes across the light receiving element 140 as well as the detection time moments (passage moments) $t_3$ and $t_4$ whereat the scanning light 133 passes across the light receiving element 140 with phase $\pi$ being added to the second periodic driving force of the second frequency, are adjusted. More specifically, the driving signal to the driving system is so adjusted by the control unit they coincide with $t_{10}$, $t_{20}$, $t_{30}$ and $t_{40}$, respectively. By doing so, a desired deflection angle of the optical deflecting device is accomplished.

In this example as well, as has been explained with reference to Example 3, coefficients and matrix M representing the changes of detection time moments $t_1$, $t_2$, $t_3$ and $t_4$ whereat the scanning light passes across the light receiving element 140 are determined beforehand. Then, control amounts $ΔA_1$, $ΔA_2$, $Δø_1$ and $Δø_2$ can be calculated on the basis of the time differences $Δt_1$, $Δt_2$, $Δt_3$ and $Δt_4$ with respect to the target time moments $t_{10}$, $t_{20}$, $t_{30}$ and $t_{40}$. The output of the arbitrary-wave producing circuit is subsequently changed in accordance with the calculated control amounts. By repeating the above-described procedure, the time moments are converged to the target time moments $t_{10}$, $t_{20}$, $t_{30}$ and $t_{40}$, whereby a desired deflection angle is accomplished.

Figure 26:
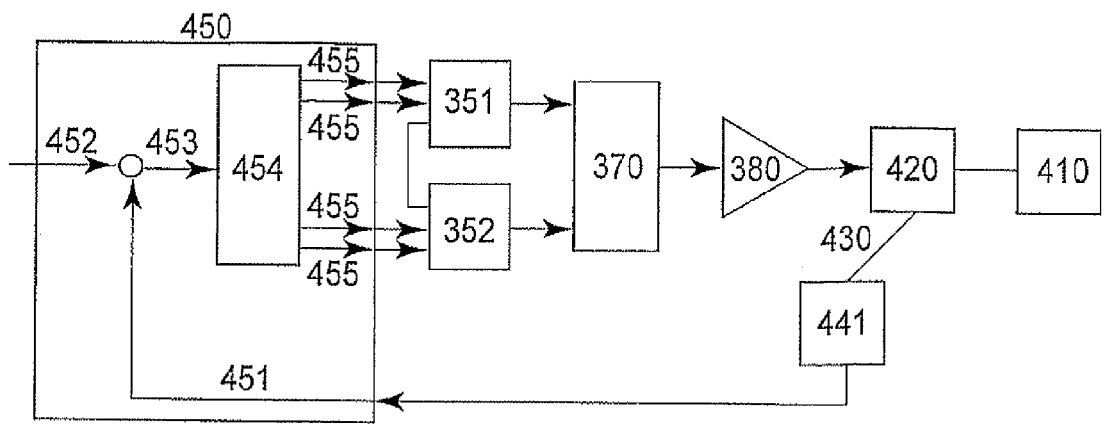
FIG. 26 is a block diagram for explaining a control method for an optical deflecting device according to Example 14, etc. of the present invention.

The procedure described above will be explained with reference to the block diagram of FIG. 26. Light from a light source 410 is deflected by an optical deflector 420, such that scanning light 430 passes across a light receiving element 440. Control unit 450 subtracts detection time moment 451 detected at the light receiving element 440 from target time moment 452, to calculate a time difference 453. Subsequently, a phase $\pi$ is added only to the second periodic driving force of second frequency and, similarly, the detection time moment 451 detected at the light receiving element 440 is subtracted from target time moment 452, whereby a time difference 453 is calculated. Then, by computing the matrix based on these time differences 453, in a computing circuit 454, a control amount 455 is calculated. Then, by using arbitrary-wave producing circuits 351 and 352, an adder 370 and an amplifier 380, a signal to be inputted to the driving system of the optical deflector 420 is produced.

In this example, phase $\pi$ is added only to the second periodic driving force of second frequency. However, a desired phase may be added to the first periodic driving force of first frequency and the second periodic driving force of second frequency.

Example 17

This example as well concerns the fifth embodiment of optical deflecting device according the present invention. This example corresponds to Example 4 described hereinbefore, although the structure is a little different from it.

In this example, the time zero in one cycle of the first frequency shown in FIG. 24 is taken as the reference time. In the driving of first oscillation mode, the target time moment whereat the scanning light 133 should pass across the light receiving element 140 is $t_{10}$ and $t_{20}$. Furthermore, in the driving of second oscillation mode, the target time moment whereat the scanning light 133 should pass across the light receiving element 140 with a phase $\pi$ being added to each of a first periodic driving force of first frequency and a second periodic driving force of second frequency, is $t_{30}$ and $t_{40}$. Among these four target time moments, $t_{10}$ is chosen as the reference time. Then, relative target times $t_{20}-t_{10}$, $t_{30}-t_{10}$ and $t_{40}-t_{10}$ become equal to 0.102 msec, 0.294 msec and 0.396 msec, respectively. The deflection angle $θ$ of the optical deflecting device is such as shown in FIG. 24.

Hence, these times are set as three preset times (target values). Now, the driving signal is adjusted by a control unit so that three relative detection times $t_2-t_1$, $t_3-t_1$ and $t_4-t_1$ whereat the scanning light 133 passes across the light receiving element 140, become equal to the aforementioned target values, respectively. By doing so, the deflection angle $θ$ of the optical deflecting device as shown in FIG. 24 is accomplished.

Although in this example too is chosen as the reference timer any other reference time can be discriminated on the basis of the magnitude of time difference.

The control method in this example will now be explained in detail. Coefficients and matrix M that represent changes in relative detection times $t_2-t_1$, $t_3-t_1$ and $t_4-t_1$ whereat the scanning light 133 passes across the light receiving element 140, which changes are caused when the control parameters X including any of $A_1$, $A_2$ and $ø$ of the optical deflecting device shifts minutely from respective target values, are determined beforehand in accordance with the procedure having been described with reference to Example 4. The control amounts $\Delta A_1$, $\Delta A_2$, $\Delta\emptyset$ for the amplitude and phase of the mirror are therefore determined from the time differences $\Delta t_2$, $\Delta t_3$ and $\Delta t_4$ between the three relative detection times $t_2-t_1$, $t_3-t_1$ and $t_4-t_1$ and three target times $t_{20}-t_{10}$, $t_{30}-t_{10}$ and $t_{40}-t_{10}$, like Example 4 described hereinbefore.

Thus, the control amounts $\Delta A_1$, $\Delta A_2$ and $\Delta\emptyset$ can be calculated from the time differences $\Delta t_2$, $\Delta t_3$ and $\Delta t_4$ with respect to the target time periods $t_{20}-t_{10}$, $t_{30}-t_{10}$ and $t_{40}-t_{10}$. Based on these quantities, the outputs of the arbitrary-wave producing circuits are adjusted. By repeating the above-described procedure, the time moments are converged to the target time moments $t_{10a}$, $t_{20a}$, $t_{30a}$ and $t_{40a}$, whereby a desired deflection angle $\theta$ is accomplished.

The procedure described above will be explained with reference to the block diagram of FIG. 26. Light from a light source 410 is deflected by an optical deflector 420, such that scanning light 430 passes across a light receiving element 440. Control unit 450 subtracts detection time moments 451 detected at the light receiving element 440 from target time moment 452, to calculate a time difference 453. Subsequently, a phase $\pi$ is added to each of the first periodic driving force of first frequency and the second periodic driving force of second frequency, and second oscillation mode driving is carried out. Similarly, the detection time moment 451 detected by the light receiving element 440 is subtracted from the target time moment 452, whereby a time difference 453 is calculated.

Then, by computing the matrix based on the time difference 453, in a computing circuit 454, as has been described with reference to Example 4, a control amount 455 is calculated. Then, by using arbitrary-wave producing circuits 351 and 352, an adder 370 and an amplifier 380, a signal to be inputted to the driving system of the optical deflector 420 is produced. In this example, the control amount 455 to be applied to either the arbitrary-wave producing circuit 351 or the arbitrary-wave producing circuit 352 is single.

Although in this example a phase $\pi$ is added to each of the first periodic driving force of first frequency and the second periodic driving force of second frequency, a desired phase may be added to the first periodic driving force of first frequency and the second periodic driving force of second frequency.

Example 18

Next, an image forming apparatus according to Example 18 of the present invention will be explained. In this example, an optical deflecting device of the type based on the fifth embodiments of the present invention is used. The block diagram of the optical deflecting device of this example is similar to that shown in FIG. 22.

The structure of this example corresponds to what is shown in FIG. 20, but one light receiving element 550 therein is omitted here.

Light emitted from a light source 510 is shaped by a collimator lens 520, and thereafter it is deflected one-dimensionally by an optical deflecting device 500. The scanning light goes through a coupling lens 530, and it is imaged on a photosensitive drum 540. There is a light receiving element 550 which is disposed at a position corresponding to the deflection angle of the optical deflecting device 500, which angle is out of the range of the effective region of the photosensitive drum 540. Here, in accordance with the control method as has been explained with reference to any one of Examples 14, 15, 16 and 17, the angular speed of the deflection angle of the optical deflecting device is adjusted so that an approximately constant angular speed is provided on the photosensitive drum 540. As a result of this, in this example, the angular speed less changes as compared with a case of sinusoidal wave drive and, therefore, better printing quality is assured.

Example 19

Next, an example of optical deflecting device which specifically concerns a technique for adjusting the timing of light beam emission to be done until a desired driving signal is produced.

The block diagram of the optical deflecting device of this example is similar to that shown in FIG. 2A. The basic structure is similar to that of the optical deflecting device of Example 1, etc. In this example, a light beam emission control system is used to adjust the light source so that it emits a light beam when an oscillator having a reflection mirror takes first and second, different displacement angles. There is a light receiving element which is provided to detect the scanning light as one oscillator takes the first and second, different displacement angles, to thereby measure the time moment whereat the one oscillator takes the first and second displacement angles. Here, the procedure for producing a desired driving signal is essentially the same as has been described with reference to Example 1, etc.

Figure 27:
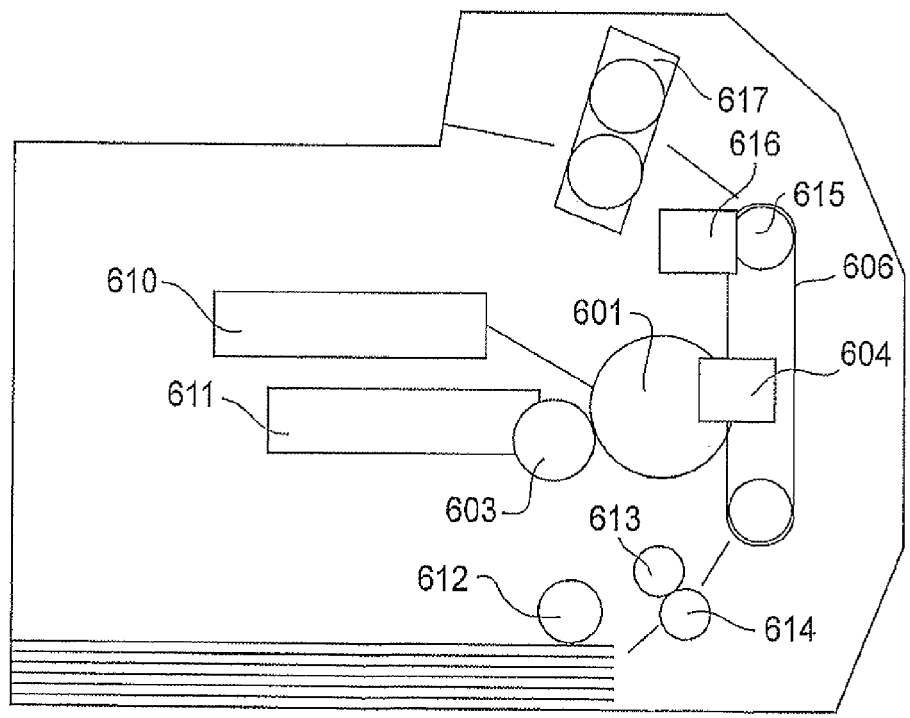
FIG. 27 is a schematic view of an image forming apparatus having an optical deflecting device according to Example 19, etc. of the present invention.

General structure and control method of the image forming apparatus of this example will be explained. FIG. 27 shows the structure of the image forming apparatus of this example. Denoted in the drawing at 601 is a photosensitive drum on which an electrostatic latent image is to be formed. Denoted at 604 is a motor for driving as associated photosensitive drum 601, and denoted at 610 is a laser scanner for performing an exposure process in accordance with an imagewise signal, to produce an electrostatic latent image on the photosensitive drum 601. Denoted at 611 is a developing device having toner particles contained therein, and denoted at 603 is a developing roller for supplying toner particles from the developing device 611 onto the photosensitive drum 601. Denoted at 606 is an endless conveying belt for conveying a paper sheet sequentially to image forming units of different colors. Denoted at 615 is a driving roller which is connected to a driving unit having a motor and gears, to drive the conveying belt 606. Denoted at 616 is a motor for driving the driving roller 615, and denoted at 617 is a fixing device for fusing the toner transferred onto the paper sheet and fixing it thereon. Denoted at 612 is a pickup roller for conveying paper sheets from a paper cassette, and denoted at 613 and 614 are conveying rollers for conveying paper sheets toward the conveying belt 606. The structure itself described above is quite conventional.

Figure 28:
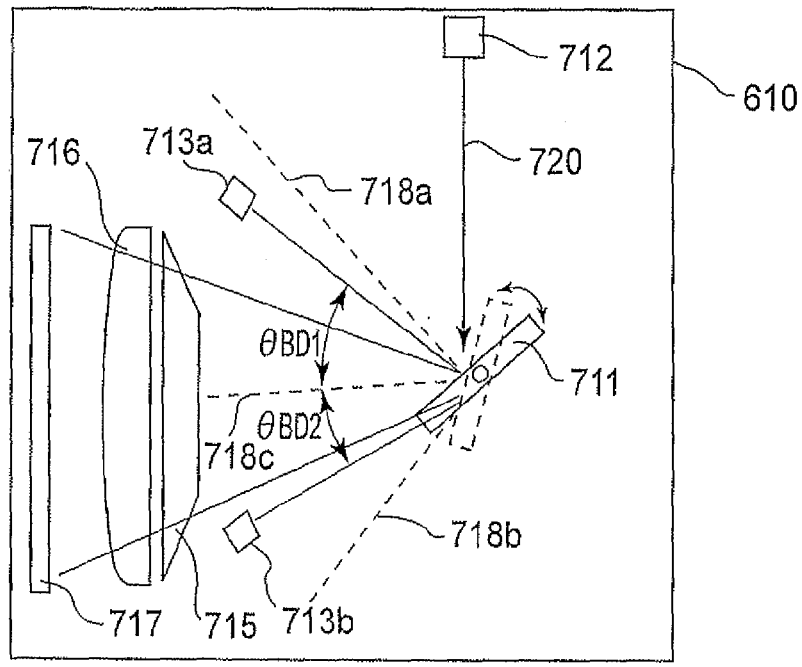
FIG. 28 is a schematic plan view for explaining an optical deflecting device according to Example 19, etc. of the present invention.

FIG. 28 is a top plan view of the laser scanner unit 610 having a light beam source that comprises a semiconductor laser. Denoted in the drawing at 712 is a semiconductor laser as the light source. Denoted at 711 is an optical deflector that includes an oscillating system described hereinbefore, for deflecting the light beam 720 emitted from the semiconductor laser 712. Denoted at 713a and 713b are light receiving elements for detecting irradiation with the deflected light beam 720. Denoted at 715 and 716 is an f-$\theta$ lens that functions to focus the light beam 720 deflected by the optical deflector 711 onto the photosensitive drum 601 and also to correct the scan speed to a constant speed. Denoted at 717 is a bending mirror for reflecting the speed-corrected light beam 720 toward the photosensitive drum 601 side. Reference numerals 718a and 718b denote the scan directions of the light beam 720 corresponding to the largest deflection angle of the optical deflector 711. Reference numeral 718c denotes the center of scan of the optical deflector 711.

As described hereinbefore, the first and second light receiving elements 713a and 713b are disposed at positions ($\theta_{BD1}$ and $\theta_{BD2}$) corresponding to a deflection angle which is smaller than the largest deflection angle of the optical deflector.

Figure 29:
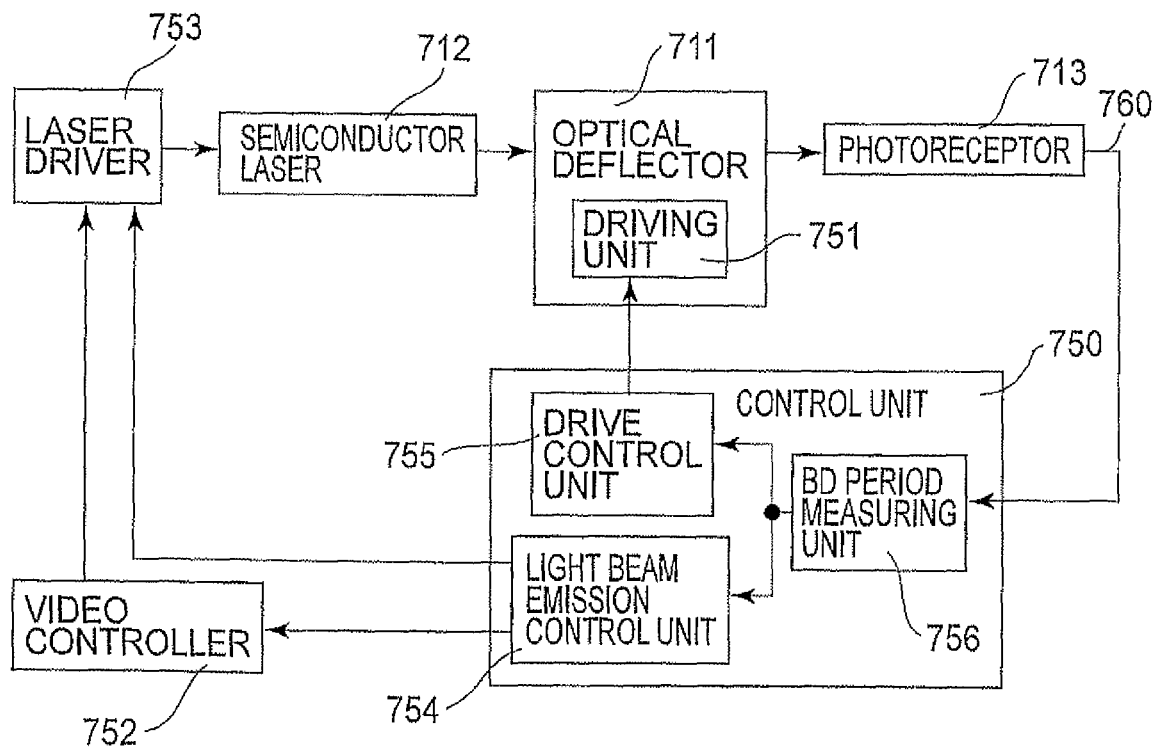
FIG. 29 is a block diagram for explaining scanner control in an optical deflecting device according to Example 19, etc. of the present invention.

FIG. 29 is a system block diagram of this example, concerning the image formation. Denoted in the drawing at 753 is a laser driver for performing light emission control of the semiconductor laser 712, and denoted at 751 is a scanner driver (driving unit) for performing drive control of the optical deflector 711. Denoted at 760 is a BD (Beam Detector) signal having a function for signaling the reception timing of light beam 720 as received by the light receiving element 713. Denoted at 756 is a BD period measuring unit for measuring the signal reception interval of BD signals 760, and denoted at 754 is a light beam emission control unit for producing a light-emission timing designating signal for the laser 712 as well as an imagewise data output timing signal. Denoted at 755 is a drive control unit which produces a start-up signal for the optical deflector 711 and is operable to adjust the driving force of the same. Denoted at 750 is a scanner control unit, and denoted at 752 is a video controller for transmitting imagewise data to the laser driver 753.

In operation of the structure described above, in response to a printing operation starting signal from a control unit arranged to control a printer (not shown) as a whole, the optical deflector 711 starts up and the light emission control of the laser 712 is initiated. The scanner control unit 750 adjusts oscillation of the optical deflector 711 and the light emission of the semiconductor laser 712 so that these components become ready for printing in response to the information of the BD signal 760 which is going to be supplied from the light receiving element 713. The adjustment of the state of oscillation of the optical deflector 711 is carried out in the manner as has been described with reference to the preceding examples.

Once it is ready for printing, a paper sheet is supplied from the paper cassette to the conveying belt 606 by which the paper sheet is conveyed sequentially to the image forming units of different colors. In synchronism with the paper sheet conveyance through the conveying belt 606, imagewise signals are supplied to respective laser scanners 610, whereby an electrostatic latent image is produced on the photosensitive drum 601. The electrostatic latent image thus formed on the photosensitive drum 601 is developed by the developing device 611 and the developing roller 603 being in contact with the photosensitive drum 601, and the toner image is transferred to the paper sheet at the image transfer station. Thereafter, the paper sheet is separated from the conveying belt 606 and, through the fixing device 617, the toner image is thermally fixed on the paper sheet. The paper sheet is then discharged outwardly of the machine. Through the procedure described above, the imagewise information supplied from an external machine is printed on the paper sheet.

The optical deflector 711 of this example is basically the same as has been described with reference to Example 1. The light emission of the light source 712 is adjusted by means of the light beam emission control unit 754, and the light beam 720 is scanningly deflected by the optical deflector 711. The light beam emission control unit 754 is arranged to adjust the light source so that it produces a tight beam 720 when one of the oscillators defines a predetermined displacement angle.

Figure 30:
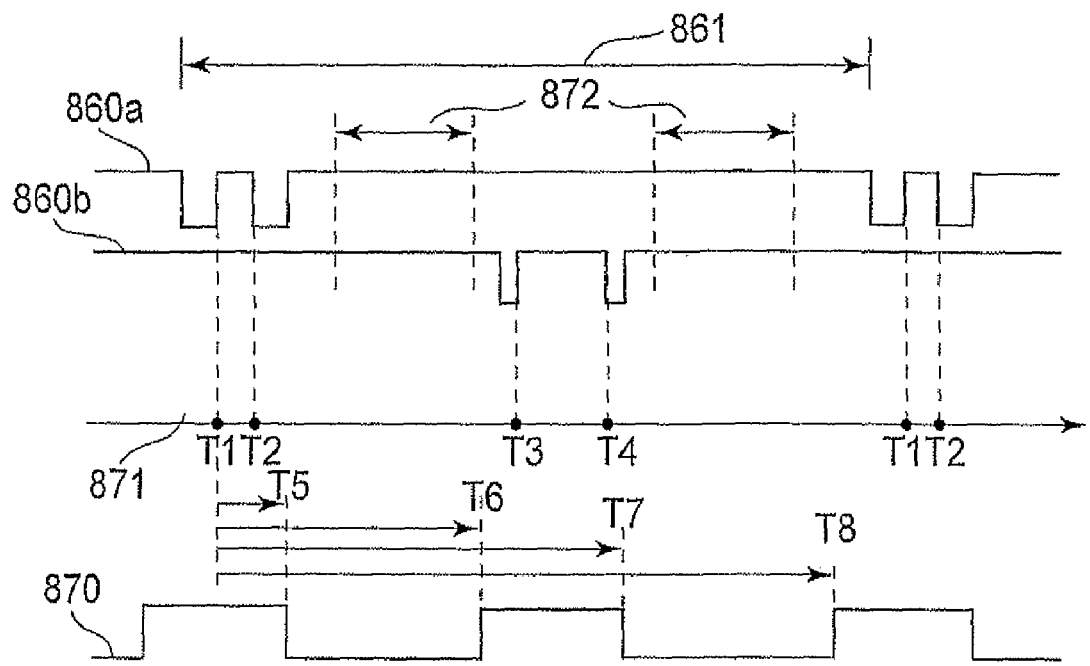
FIG. 30 is a timing chart for explaining laser control according to Example 19 of the present invention.

The light beam emission control unit 754 of this example will be explained in detail. FIG. 30 is a timing chart for the laser control according to this example. Denoted at 860a and 860b in the drawing are BD signals which are responsive to reception by the light receiving elements 713a and 713b, respectively. Here, the low level of the signal represents the state in which light is received, and the high level represents the state in which light is not received. Denoted at 861 is the oscillation period of the optical deflector 711 in the tuned oscillation state, and denoted at 870 is a signal that represents the light emission timing based on the automatic light-quantity-corrected light emission (hereinafter, "APC light emission") in the intermittent laser light emission operation. Denoted at 871 is the reference position with respect to which the emission control of the light beam 720 is carried out. Denoted at 872 is an image region in which the light beam 720 scans the photosensitive drum 601 surface. Denoted at $T_1$ to $T_4$ are time moments whereat BD signals are received, the moments being measured with reference to a desired time moment ($T_1$) in one cycle of the first oscillation motion described hereinbefore. Denoted at $T_5$ and $T_7$ are elapsed time, from the reference time moment ($T_1$) to the turning-off of light beam, and denoted at $T_6$ and $T_8$ are elapsed time from the reference time moment ($T_1$) to the turning-on of the light beam.

The light beam emission control unit 754 drives and adjusts the semiconductor laser 712 so that it emits a light beam 720 at the timing shown at 870, when the oscillator of the optical deflector 711, having a reflection mirror, takes first and second, different displacement angles. Here, as an example, the semiconductor laser 712 may be continuously exited at an initial stage and, after the light beam 720 starts passing across the light receiving element 713 in a certain state or under a certain effective condition, the semiconductor laser may be driven and adjusted in accordance with the emission timing 870. Although in this example the time moment $T_1$ is chosen as the reference time moment, any other moment may be used. Furthermore, although the light emission timing 870 is based on the APC light emission in this example, it may be based on forced light emission. Moreover, although in this example the time moments $T_1$ to $T_4$ are chosen at the rise and fall of the BD signal, the optical deflector 711 may be controlled in response to any of the signal rise and signal fall. Still further, although the foregoing description has been made with reference to a case where the light beam emission control unit 754 is incorporated into an example based on the second embodiment, it may be applied to an example based on any of the second to fifth embodiments of the present invention described hereinbefore, in accordance with the same principle. This is also the case with the examples to be described below.

Example 20

Figure 31:
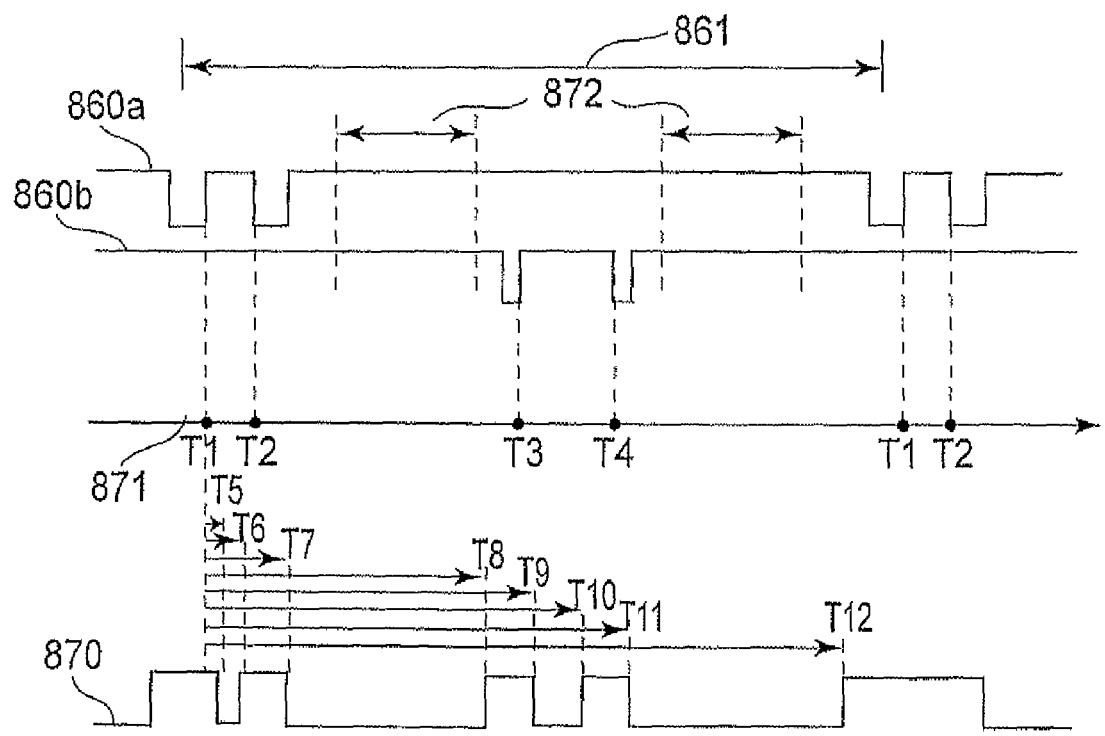
FIG. 31 is a timing chart for explaining laser control according to Example 20 of the present invention.

Example 20 of the present invention will be described. The structure of the image forming apparatus according to this example is similar to that of Example 19. In this example, as shown in FIG. 31, the light emission timing based on the APC light emission differs from Example 19. In accordance with the light emission timing of this example, the light beam 720 is turned off at the timing as the light beam, having passed across the light receiving element 713 in the scan end direction, comes back toward the scan center. This provides an advantage of shortening of light emission time of the light source.

In the timing chart of FIG. 31 for the laser control in this example, denoted at 870 is a signal that represents the light emission timing based on the APC light emission during the intermittent laser emission operation. Denoted at $T_5$, $T_7$, $T_9$ and $T_{11}$ are elapsed time, from the reference time moment ($T_1$) to the turning-off of the light beam, and denoted at $T_6$, $T_8$, $T_{10}$ and $T_{12}$ are elapsed time from the reference time moment ($T_1$) to the turning-on of the light beam. In this example as well, although $T_1$ is chosen as the reference time, any other time may be used.

Example 21

Figure 32:
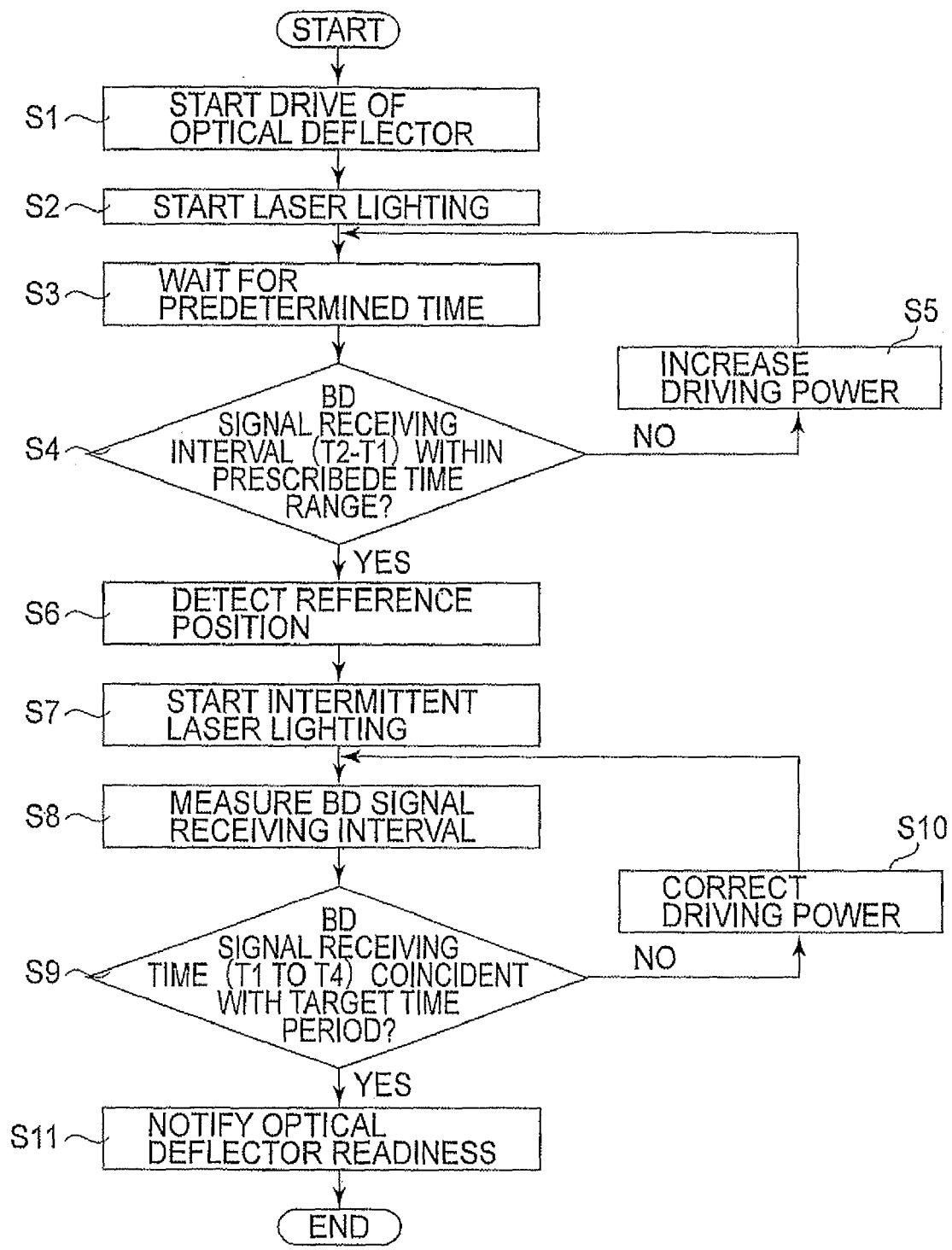
FIG. 32 is a sequence chart for explaining scanner starting control according to Example 21 of the present invention.

Example 21 of the present invention will be described. In this example as well, the structure of the image forming apparatus is similar to that of Example 19. This example is different in the process of controlling the image forming apparatus at the time of start-up. FIG. 32 is a sequence chart showing the control sequences made in this example. The timing chart for the laser control in this example is similar to that of FIG. 30, having been explained with reference to Example 19.

As shown in FIG. 32, in response to an optical deflector start-up command from a printing control unit, at first, the drive control unit 755 signals the driving unit 751 to drive the optical deflector 711 at a desired driving force (step S1). Here, oscillation may preferably be done on the basis of a driving force with the aforementioned second oscillation motion being excluded, namely, in accordance with a single sinusoidal wave.

Subsequently, the laser beam emission control unit 754 signals the laser-driver 753 to cause the APC light emission of the semiconductor laser 712 (step S2). After a predetermined time elapsed (step S3), discrimination is made as to whether the time to the time moment $T_2$ from the time moment $T_1$ whereat measurement is carried out by the BD period measuring unit 756, namely, time $T_2-T_1$, is within a predetermined time period range or not (in other words, it is an effectiveness condition for discriminating whether the time has become sufficiently long to meet this threshold range or not) (Step S4). If the BD signal reception interval is out of the predetermined time period range mentioned above, the drive control unit 755 signals the driving unit 751 to increase the driving force of the first oscillation motion described above (Step S5) and, following it, discrimination of the BD signal reception interval is carried out again after the lapse of a predetermined time. These procedures are repeated until the interval meets the predetermined-time period range. If the BD signal reception interval meets the predetermined time interval range, the laser beam emission control unit 754 then discriminates the laser beam scan position on the basis of the BD signal reception timing and the reception interval. In accordance with the discrimination result, it operates to set the reference time moment $T_1$ for the light beam emission control (Step S6).

Furthermore, the laser beam emission control unit 754 calculates the elapsed time from the reference position $T_1$ designating the laser 712 emission timing, and it signals the laser driver 753 to turn on and off the laser 712 at predetermined timing (Step S7). Here, the elapsed time $T_5$ to $T_8$ are set at such timing that they do not overlap the image region 872 from the reference timing $T_1$ and yet the BED signals of $T_1$ to $T_4$ can be detected by the light receiving element 713.

The BD period measuring unit 756 measures the BD signal reception time moments ($T_1$ to $T_4$) (Step S8). The laser beam emission control unit 754 then discriminates whether the moments $T_1$ to $T_4$ have become coincident with the BD signal reception time moments (target moments) for the image forming operation, having been determined beforehand (Step S9). If they are not coincident, the drive control unit 755 produces an appropriate driving signal so as to let the moments $T_1$ to $T_4$ coincide with the respective desired time moments, and applies it to the driving unit 620. Based on this, the amplitude and the phase (or phase difference) of the first and second oscillation motions are adjusted (Step S10). This procedure is the same as has been described with reference to the preceding examples. When the BD signal reception interval becomes equal to the BD signal reception interval for the image forming operation, the print-ready state is signaled to the printing control unit (Step S11), and the optical deflector start-up operation is finished.

The light beam emission control is carried out in this example with the procedure described above. Through this procedure, the continuous laser emission state can shift to the intermittent laser emission state quite smoothly. Furthermore, as a result of this, the intermittent laser emission control can be initiated before the optical deflector reaches the oscillation state for the image forming operation. Therefore, unnecessary laser irradiation of the photosensitive drum 601 can be avoided or reduced.

Although in this example the switching of the laser emission mode is discriminated on the basis of the moment of $T_1$, it may be discriminated on the basis of any of $T_2$, $T_3$ and $T_4$. Furthermore, whether more than one of $T_1$ to $T_4$ are all within a range with respect to respective predetermined time moments, may be used as a discrimination condition. Moreover, although in this example the start of $T_1$ is chosen as the reference position, the reference position may be set at the start of any other moments $T_2-T_4$. Furthermore, plural reference positions may be used, and $T_5$ and $T_6$ may be calculated from different reference positions. At Step S4, discrimination is made with regard to $T_2-T_1$. However, any other time interval or time moment may be used. The timing for turning off the laser during the intermittent laser emission control may be at the moment of completion of the detection of a desired BD signal or, alternatively, it may be after elapse of a predetermined time from the reference position.

In this example, a latency time is defined from the laser emission in the starting-up operation of the scanner to the measurement of the BD period reception interval. If the transition time to the tuned oscillation of the oscillation mirror is very short, the latency time may be set to zero. Furthermore, this example uses a timing chart for the laser control such as shown in FIG. 30 of Example 19. However, the timing chart such as shown in FIG. 31 of Example 20 may be used, and the elapsed time $T_5$ to $T_{12}$ may be set at the timing not overlapping the image region 71 from the reference time moment $T_1$ and yet allowing detection of the BD signals of $T_1$ to $T_4$ through the light receiving element 713. Similar advantageous results are obtainable by measuring the BD signal reception time moments (T1 to T4) (Step S8) through the BD period measuring unit 756.

In Examples 19 to 21 described above, the effectiveness condition concerns the set time moment or the time interval with respect to which at least two of the detection signals obtained at the light receiving element are different. The first drive control for satisfying this effectiveness condition is such that: the oscillating system is oscillated only by the first oscillation motion, and the first periodic driving force is adjusted on the basis of the detection signal at the light receiving element 713. On the other hand, the first light beam emission timing control for satisfying the effectiveness condition comprises a control procedure for causing the light beam to be emitted continuously from the start of oscillation drive of the oscillator until the effectiveness condition is satisfied.

However, the first light beam emission control may be such a control that the laser beam is caused to be emitted after elapse of a predetermined time, after the start of oscillation drive of the oscillator, until the effectiveness condition is satisfied. The predetermined time here may be, for example, the time until the oscillation motion of the oscillator shifts from the over-oscillation state to the tuned oscillation state.

In Examples 19 to 21, the second drive control operation to be done after the effectiveness condition is reached, may comprise a procedure for oscillating the oscillation system in accordance with the first and second oscillation motions and for adjusting the first periodic driving force and the second periodic driving force on the basis of the detection signals of the light receiving element 713. Furthermore, the second light beam emission timing control operation to be done after the effectiveness condition is reached, may comprise a control procedure for forcibly turning on and off the light beam twice or more, within the time period of one cycle of the fundamental frequency and yet out of the time period in which light is projected on the image region of the image visualizing means. The second light beam emission timing control operation may be the control procedure for forcibly turning on and off the light beam with reference to one of the detection signals of the light receiving element, within the time period of one cycle of the fundamental frequency.

In accordance with an image forming apparatus of any one of Examples 19 to 21, image formation through the image visualizing means as well as measurement of the time moment whereat one oscillator takes a predetermined displacement angle, for adjustment of the oscillation of the oscillating system, can be performed simultaneously. This does not require initial drive of an oscillation mirror based on a driving condition stored beforehand. Therefore, even if there is individual difference of oscillating characteristic of the oscillation mirror, environmental change or any change with respect to time, the oscillation mirror can be driven in accordance with such characteristic change. Furthermore, since the margin for scan angle of the oscillation mirror can be set on the basis of the oscillation characteristic of the oscillation mirror, the margin can be made smallest and, therefore, the scan angle of the light beam that can be used in the image formation can be made relatively large.

While the invention has been described with reference to the structures disclosed herein, it is not confined to the details set forth and this application is intended to cover such modifications or changes as may come within the purposes of the improvements or the scope of the following claims.

The invention claimed is:
1. An oscillator device, comprising:
an oscillating system having a first oscillator, a second oscillator, a first torsion spring for connecting the first and second oscillators to each other, and a second torsion spring connected to the second oscillator and having a common torsional axis with the first torsion spring;
a supporting system for supporting the oscillating system;
a driving system for driving the oscillating system so that the first oscillator produces oscillation as can be expressed by an equation that contains at least a term

$$A_1 \sin(\omega t) + A_2 \sin(n\omega t + \emptyset)$$

where n is an integer not less than 2, $A_1$ is an amplitude of oscillation of the first oscillator, $A_2$ is an amplitude of oscillation of the second oscillator, $\omega$ is an angular frequency of the oscillation of the first oscillator, $n\omega$ is an angular frequency of the oscillation of the second oscillator, $\emptyset$ is a phase difference between the oscillation of the first oscillator and the oscillation of the second oscillator, and t is time;

a signal producing system for producing an output signal at first and second displacement angles smaller than a maximum displacement angle of the first oscillator; and
a drive control system for controlling the driving system on the basis of the output signal of the signal producing system so that at least one of $A_1$, $A_2$ and $\emptyset$ in the aforementioned equation takes a predetermined value,
wherein the first oscillator is arranged for displacement beyond the first and second displacement angles, wherein the output signal of the signal producing system contains mutually different first and second moments of time information as the first displacement angle is reached, and contains mutually different third and fourth moments of time information as the second displacement angle is reached, and wherein the drive control system controls the driving system on the basis of the first to fourth moments of time information so that at least one of $A_1$, $A_2$ and $\emptyset$ takes the predetermined value.

2. An oscillator device according to claim 1,
wherein the first to fourth moments of time information respectively define four time periods $t_1$, $t_{12}$, $t_2$ and $t_{21}$, where
$t_1$ denotes a time period from a moment whereat the first displacement angle is reached by the at least one of the first and second oscillators to a moment whereat, after turning back at an end of oscillating motion, the first displacement angle is reached again by the at least one of the first and second oscillators;
$t_{12}$ denotes a time period from a moment whereat the first displacement angle is reached to a moment whereat, after passing through a center of oscillation, the second displacement angle is reached by the at least one of the first and second oscillators;
$t_2$ denotes a time period from a moment whereat the second displacement angle is passed to a moment whereat, after turning back at an end of the oscillation, the second displacement angle is reached again by the at least one of the first and second oscillators; and
$t_{21}$ denotes a time period from a moment whereat the second displacement angle is passed to a moment whereat, after passing the center of oscillation, the first displacement angle is reached.

3. An oscillator device according to claim 2, wherein the drive control system controls the driving system so that, for control of $\emptyset$, $t_1 - \delta \times t_2 (\delta \geq 0)$ takes the predetermined value.

4. An oscillator device according to claim 2, wherein the drive control system controls the driving system so that, for control of $A_1$, $t_1 + \delta \times t_2 - \alpha \times (t_{12} + \beta \times t_{21})(\alpha, \beta, \delta \geq 0)$ takes the predetermined value.

5. An oscillator device according to claim 2, wherein the drive control system controls the driving system so that, for control of $A_2$, $t_{12} - \gamma \times t_{21} (\gamma \geq 0)$ takes the predetermined value.

6. An optical deflecting device, comprising:
a light source for emitting a light beam; and
an oscillator device as recited in claim 1 and having a plurality of oscillators at least one of which has a reflection mirror formed thereon.

7. An optical deflecting device according to claim 6, wherein the signal producing system includes a light receiving element for receiving reflection light from the reflection mirror directly or through a reflection member.

8. An image forming apparatus, comprising:
a light source;
an optical deflecting device as recited in claim 6; and
an optical system,
wherein the optical deflecting device is arranged to deflect a light beam from the light source, and wherein the optical system is arranged to collect the scanning light beam toward a predetermined target position.

9. An image forming apparatus according to claim 8, further comprising a light beam emission control system for adjusting emission of a light beam from the light source, and image visualizing means disposed at a surface to be scanned by the light beam, wherein the signal producing system includes a light receiving element for receiving reflection light from the reflection mirror directly or through a reflection member, and wherein the light beam emission control system is arranged to adjust the light source so that the light beam is emitted at timings so that the reflection light from the reflection mirror is received by the light receiving element.

10. An image forming apparatus according to claim 9, wherein the light beam emission control system is arranged to continuously emit the light beam from start of the drive of the optical deflecting device to detection of the light beam by the light receiving element, and wherein, after the light beam is detected by the light receiving element, the light beam emission control system is arranged to turn on and off the light beam outside an image forming region.

11. An image forming apparatus according to claim 10, wherein the drive control system of the optical deflecting device is arranged to supply a first driving signal which consists of a single sinusoidal wave to the driving system, from start of the drive of the optical deflecting device to detection of the light beam by the light receiving element, and wherein, after the light beam is detected by the light receiving element, the drive control system is arranged to supply a second signal, which consists of a combination of at least two sinusoidal waves, to the driving system.

12. An oscillator device according to claim 1, wherein, where a displacement angle of the first oscillator when the same is held stationary is denoted by 0 and an absolute value of the maximum displacement angle of the first oscillator is denoted by 1, the signal producing system produces an output signal with the absolute value of displacement angle of the first oscillator being held in a range, from not less than 0.6 to less than 1.0.

13. An oscillator device according to claim 1, wherein the drive control system is arranged to selectively provide (i) a first driving signal based on a combination of a first signal having a fundamental frequency of the oscillating system and a second signal having a second frequency n-fold the fundamental frequency where n is an integer, and (ii) a second driving signal based on a combination of the first and second signals while a phase is applied to at least one of them, and wherein the drive control system controls the driving system on the basis of an output signal produced from the signal producing system in response to a drive based on the first driving signal and an output signal produced from the signal producing system in response to a drive based on the second driving signal.

14. An oscillator device according to claim 13, wherein the output signal produced from the signal producing system in response to the drive based on the first driving signal comprises mutually different two time moment information, wherein the output signal produced from the signal producing system in response to the drive based on the second driving signal comprises mutually different two time moment information, and wherein the drive control system controls the driving system on the basis of the four time moment information.

15. An optical deflecting device, comprising:
a light source for emitting a light beam;
an oscillating system having a first oscillator on which a reflection mirror is formed, a second oscillator, a first torsion spring for connecting the first and second oscillators to each other, and a second torsion spring connected to the second oscillator and having a common torsional axis with the first torsion spring;
a supporting system for supporting the oscillating system;
a driving system for driving the oscillating system so that the first oscillator produces oscillation as can be expressed by an equation that contains at least a term $$A_1 \sin(\omega t)+A_2 \sin(n\omega t+\varnothing)$$

where n is an integer not less than 2, $A_1$ is an amplitude of oscillation of the first oscillator, $A_2$ is an amplitude of oscillation of the second oscillator, $\omega$ is an angular frequency of the oscillation of the first oscillator, $n\omega$ is an angular frequency of the oscillation of the second oscillator, $\varnothing$ is a phase difference between the oscillation of the first oscillator and the oscillation of the second oscillator, and t is time;
a signal producing system for producing an output signal at first and second displacement angles smaller than a maximum displacement angle of the first oscillator, wherein the signal producing system includes at least one light receiving element for receiving reflection light from the reflection mirror directly or indirectly via a reflection member and produces the output signal based on the received reflection light; and
a drive control system for controlling the driving system on the basis of the output signal of the signal producing system so that at least one of $A_1$, $A_2$ and $\varnothing$ in the aforementioned equation takes a predetermined value,
wherein the first oscillator is arranged for displacement beyond the first and second displacement angles, wherein the output signal of the signal producing system contains mutually different first and second moments of time information as the first displacement angle is reached, and contains mutually different third and fourth moments of time information as the second displacement angle is reached, and wherein the drive control system controls the driving system on the basis of the first to fourth moments of time information so that at least one of $A_1$, $A_2$ and $\varnothing$ takes the predetermined value, and
wherein the signal producing system includes two light receiving elements.

16. An optical deflecting device, comprising:
a light source for emitting a light beam;
an oscillating system having a first oscillator on which a reflection mirror is formed, a second oscillator, a first torsion spring for connecting the first and second oscillators to each other, and a second torsion spring connected to the second oscillator and having a common torsional axis with the first torsion spring;
a supporting system for supporting the oscillating system;
a driving system for driving the oscillating system so that the first oscillator produces oscillation as can be expressed by an equation that contains at least a term $$A_1 \sin(\omega t)+A_2 \sin(n\omega t+\varnothing)$$

where n is an integer not less than 2, $A_1$ is an amplitude of oscillation of the first oscillator, $A_2$ is an amplitude of oscillation of the second oscillator, $\omega$ is an angular frequency of the oscillation of the first oscillator, $n\omega$ is an angular frequency of the oscillation of the second oscillator, $\varnothing$ is a phase difference between the oscillation of the first oscillator and the oscillation of the second oscillator, and t is time;

a signal producing system for producing an output signal at first and second displacement angles smaller than a maximum displacement angle of the first oscillator, wherein the signal producing system includes at least one light receiving element for receiving reflection light from the reflection mirror directly or indirectly via a reflection member and produces the output signal based on the received reflection light; and a drive control system for controlling the driving system on the basis of the output signal of the signal producing system so that at least one of $A_1$, $A_2$ and ø in the aforementioned equation takes a predetermined value, wherein the first oscillator is arranged for displacement beyond the first and second displacement angles, wherein the output signal of the signal producing system contains mutually different first and second moments of time information as the first displacement angle is reached, and contains mutually different third and fourth moments of time information as the second displacement angle is reached, and wherein the drive control system controls the driving system on the basis of the first to fourth moments of time information so that at least one of $A_1$, $A_2$ and ø takes the predetermined value, and wherein the signal producing system includes one light receiving element and one reflection member which is disposed at the same side as the light receiving element with respect to a reference position of the first and second oscillators.

17. An optical deflecting device, comprising:
a light source for emitting a light beam;
an oscillating system having a first oscillator on which a reflection mirror is formed, a second oscillator, a first torsion spring for connecting the first and second oscillators to each other, and a second torsion spring connected to the second oscillator and having a common torsional axis with the first torsion spring;
a supporting system for supporting the oscillating system;
a driving system for driving the oscillating system so that the first oscillator produces oscillation as can be expressed by an equation that contains at least a term $$A_1 \sin(\omega t) + A_2 \sin(n\omega t + \text{ø})$$

where n is an integer not less than 2, $A_1$ is an amplitude of oscillation of the first oscillator, $A_2$ is an amplitude of oscillation of the second oscillator, $\omega$ is an angular frequency of the oscillation of the first oscillator, $n\omega$ is an angular frequency of the oscillation of the second oscillator, ø is a phase difference between the oscillation of the first oscillator and the oscillation of the second oscillator, and t is time;

a signal producing system for producing an output signal at first and second displacement angles smaller than a maximum displacement angle of the first oscillator, wherein the signal producing system includes at least one light receiving element for receiving reflection light from the reflection mirror directly or indirectly via a reflection member and produces the output signal based on the received reflection light; and a drive control system for controlling the driving system on the basis of the output signal of the signal producing system so that at least one of $A_1$, $A_2$ and ø in the aforementioned equation takes a predetermined value, wherein the first oscillator is arranged for displacement beyond the first and second displacement angles, wherein the output signal of the signal producing system contains mutually different first and second moments of time information as the first displacement angle is reached, and contains mutually different third and fourth moments of time information as the second displacement angle is reached, and wherein the drive control system controls the driving system on the basis of the first to fourth moments of time information so that at least one of $A_1$, $A_2$ and ø takes the predetermined value, and wherein the signal producing system includes two reflection members disposed at the same side as the light source with respect to a reference position of the plurality of oscillators, and one light receiving element disposed at a side opposite to the light source with respect to the plurality of oscillators, for receiving reflection light from both of the two reflection members.

18. An oscillator device, comprising:
an oscillating system having a first oscillator, a second oscillator, a first torsion spring for connecting the first and second oscillators to each other, and a second torsion spring connected to the second oscillator and having a common torsional axis with the first torsion spring;
a supporting system for supporting the oscillating system;
a driving system for driving the oscillating system so that the first oscillator produces oscillation as can be expressed, in regard to displacement θ(t) thereof, by an equation $$\theta(t) = A_1 \sin(\omega t) + \Sigma A_n \sin(n\omega t + \text{ø}_{n-1})$$

where n is an integer not less than 2, $A_1$ is an amplitude of oscillation of the first oscillator, $A_n$ is an amplitude of oscillation of an nth oscillator, $\omega$ is an angular frequency of the oscillation of the first oscillator, $n\omega$ is an angular frequency of the oscillation of the nth oscillator, $\text{ø}_{n-1}$ is a phase difference between the oscillation of the first oscillator and the oscillation of the nth oscillator, and t is time;

a signal producing system for producing an output signal at first and second displacement angles smaller than a maximum displacement angle of the first oscillator; and a drive control system for controlling the driving system on the basis of the output signal of the signal producing system so that at least one of $A_1$, $A_2$, ... and $A_n$ and $\text{ø}_1$, $\text{ø}_2$, ... and $\text{ø}_{n-1}$ in the aforementioned equation takes a predetermined value, wherein the first oscillator is arranged for displacement beyond the first and second displacement angles, wherein the output signal of the signal producing system contains mutually different first and second moments of time information as the first displacement angle is reached, and contains mutually different third and fourth moments of time information as the second displacement angle is reached, and wherein the drive control system controls the driving system on the basis of the first to fourth moments of time information so that at least one of $A_1$, $A_2$, ... and $A_n$ and $\text{ø}_1$, $\text{ø}_2$, ... and $\text{ø}_{n-1}$ takes the predetermined value.

* * * * *